April 30, 1963     L. J. LAPOINTE     3,087,673
DECIMAL POINT MECHANISM FOR CALCULATORS
Original Filed Nov. 19, 1953     42 Sheets-Sheet 1

INVENTOR.
LLOYD J. LAPOINTE
BY
Beau, Brooks, Buckley & Beau
ATTORNEYS

INVENTOR.
LLOYD J. LAPOINTE
BY
Beau, Brooks, Buckley & Beau
ATTORNEYS

April 30, 1963     L. J. LAPOINTE     3,087,673
DECIMAL POINT MECHANISM FOR CALCULATORS Original Filed Nov. 19, 1953     42 Sheets-Sheet 4

INVENTOR.
LLOYD J. LAPOINTE
BY
Beau, Brooks, Buckley & Beau
ATTORNEYS

April 30, 1963 L. J. LAPOINTE 3,087,673
DECIMAL POINT MECHANISM FOR CALCULATORS
Original Filed Nov. 19, 1953 42 Sheets-Sheet 5

INVENTOR.
LLOYD J. LAPOINTE
BY
Beau, Brooks, Buckley & Beau.
ATTORNEYS

FIG. 9
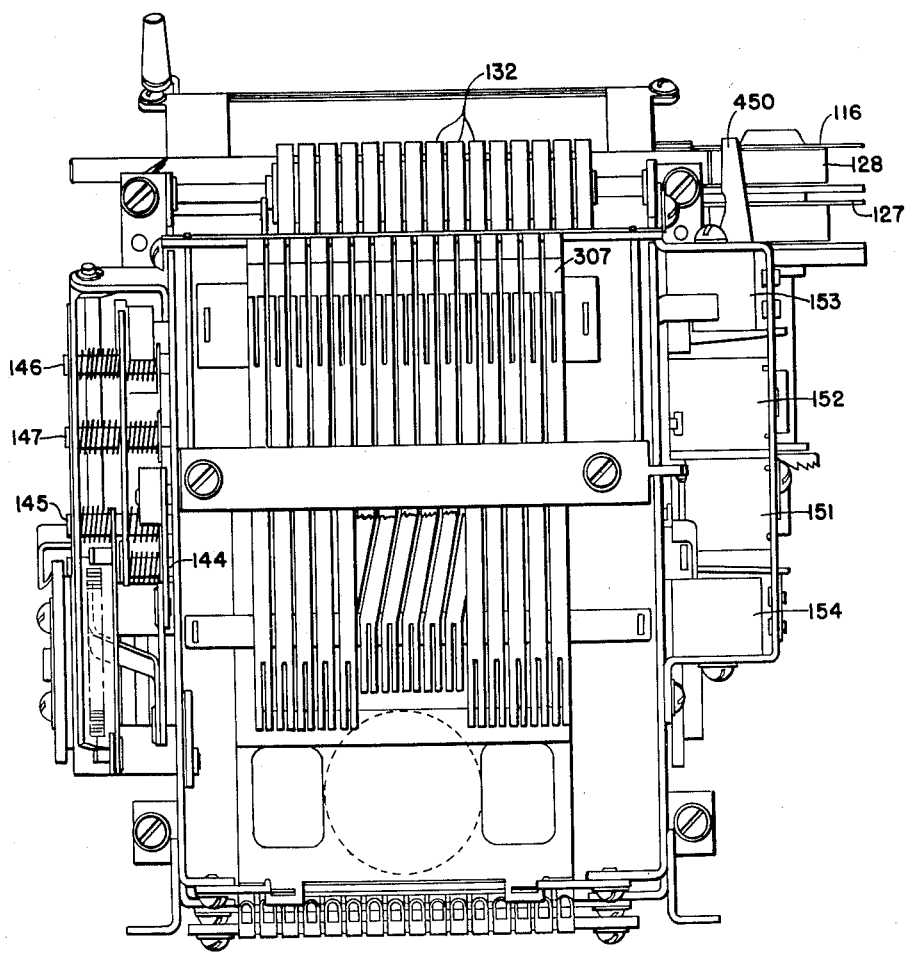
FIG. 8A
adding at 9
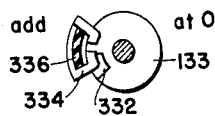
FIG. 8B
add    at 0
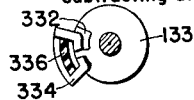
FIG. 8C
subtracting at 9
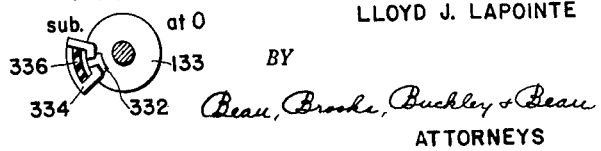
FIG. 8D
sub.   at 0
INVENTOR.
LLOYD J. LAPOINTE
BY
ATTORNEYS

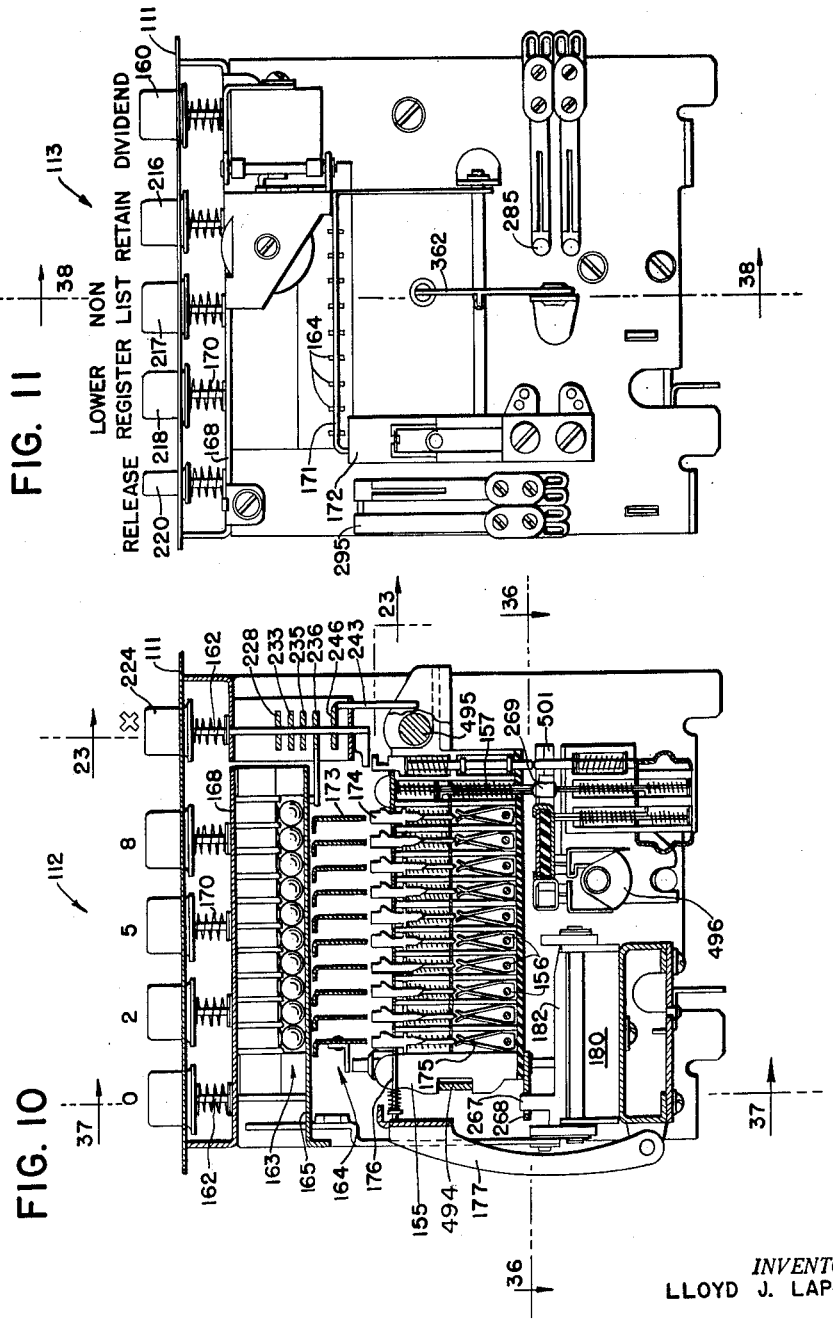

April 30, 1963 L. J. LAPOINTE 3,087,673
DECIMAL POINT MECHANISM FOR CALCULATORS
Original Filed Nov. 19, 1953 42 Sheets-Sheet 11

*INVENTOR.*
LLOYD J. LAPOINTE
BY
Beau, Brooks, Buckley & Beau.
ATTORNEYS

April 30, 1963  L. J. LAPOINTE  3,087,673
DECIMAL POINT MECHANISM FOR CALCULATORS
Original Filed Nov. 19, 1953  42 Sheets-Sheet 12

INVENTOR.
LLOYD J. LAPOINTE
BY
*Beau, Brooks, Buckley & Beau*
ATTORNEYS

April 30, 1963 L. J. LAPOINTE 3,087,673
DECIMAL POINT MECHANISM FOR CALCULATORS
Original Filed Nov. 19, 1953 42 Sheets-Sheet 13
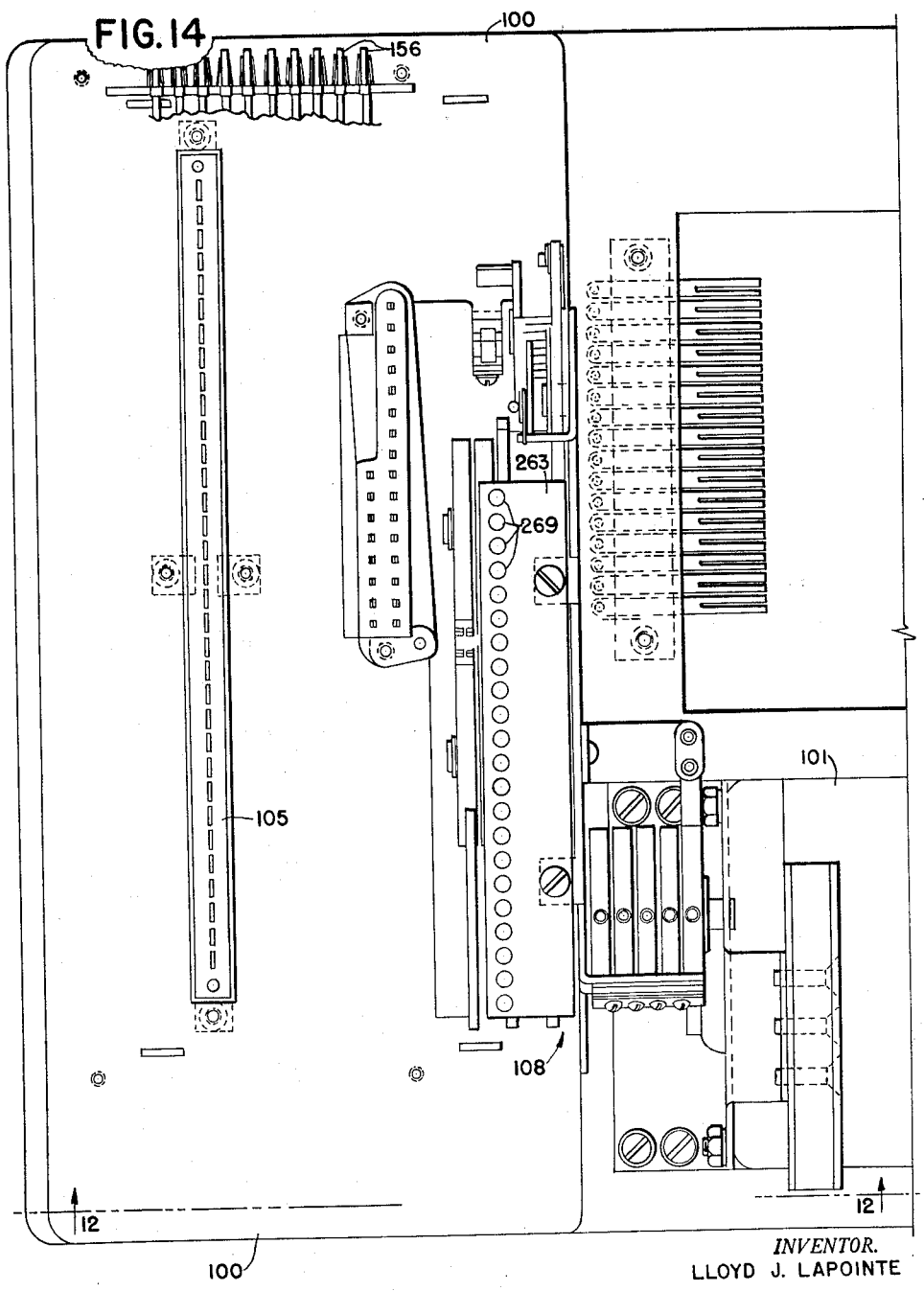
INVENTOR.
LLOYD J. LAPOINTE
BY
ATTORNEYS

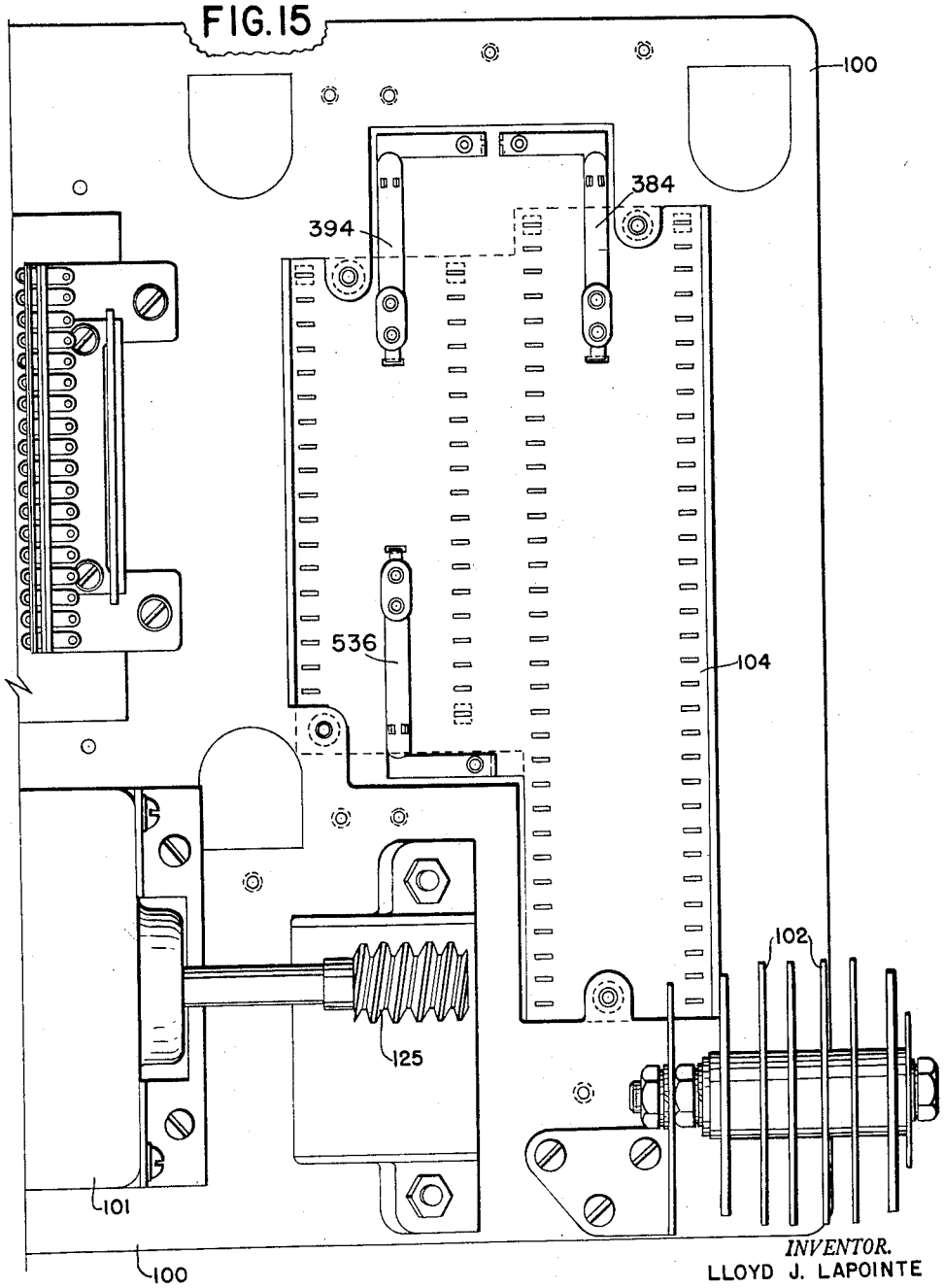

April 30, 1963 L. J. LAPOINTE 3,087,673
DECIMAL POINT MECHANISM FOR CALCULATORS
Original Filed Nov. 19, 1953 42 Sheets-Sheet 15
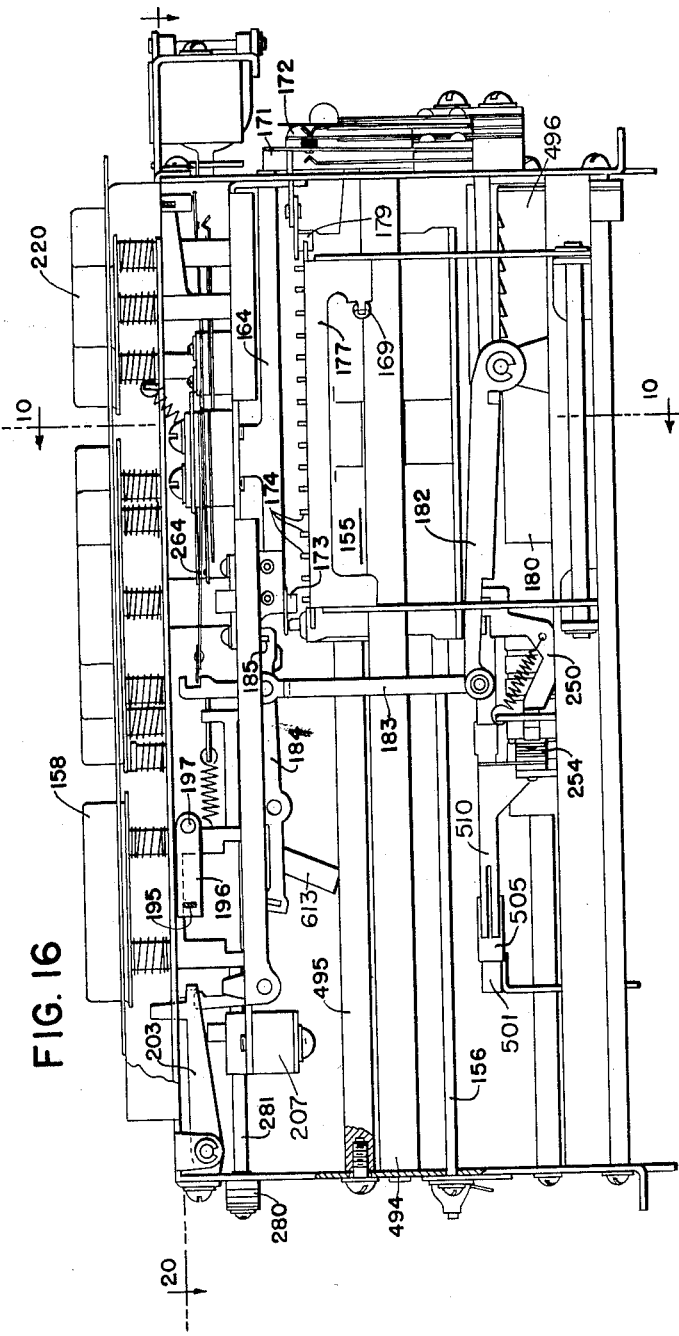
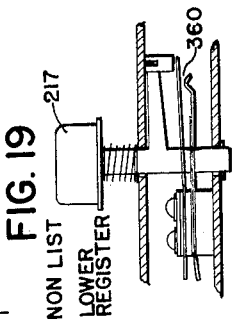
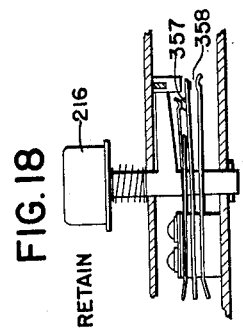
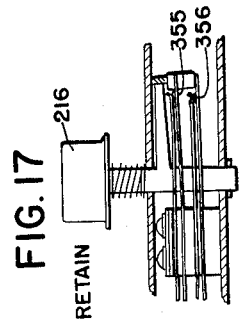
INVENTOR.
LLOYD J. LAPOINTE
BY
Beau, Brooks, Buckley & Beau,
ATTORNEYS April 30, 1963 L. J. LAPOINTE 3,087,673
DECIMAL POINT MECHANISM FOR CALCULATORS
Original Filed Nov. 19, 1953 42 Sheets-Sheet 16

INVENTOR.
LLOYD J. LAPOINTE
BY
Beau, Brooks, Buckley & Beau
ATTORNEYS

April 30, 1963  L. J. LAPOINTE  3,087,673
DECIMAL POINT MECHANISM FOR CALCULATORS
Original Filed Nov. 19, 1953  42 Sheets-Sheet 17
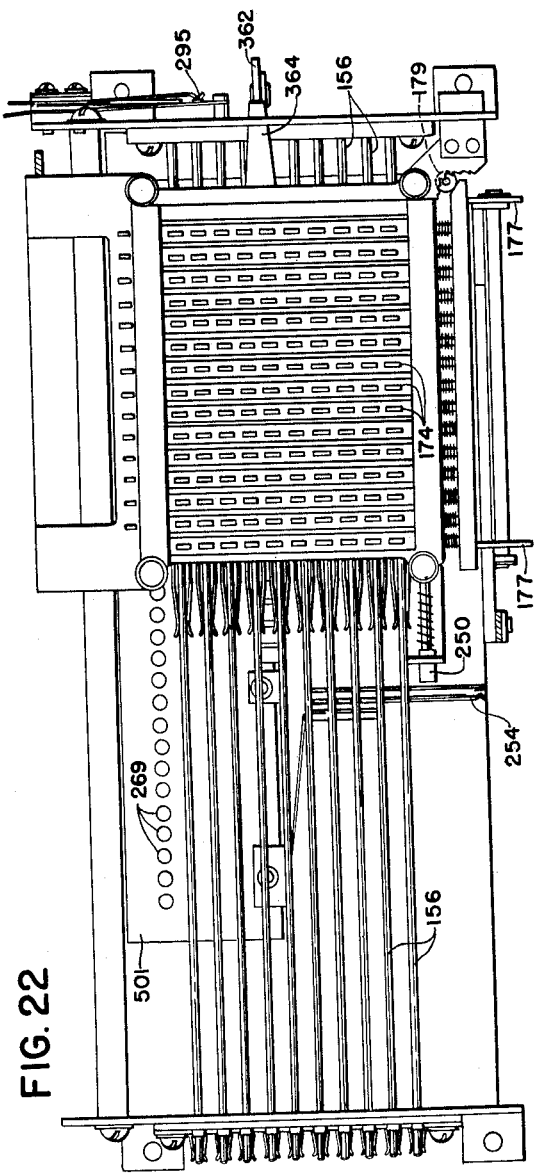
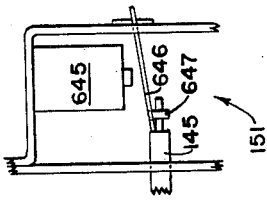
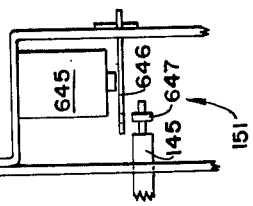
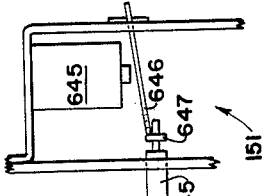
INVENTOR.
LLOYD J. LAPOINTE
BY
Beau, Brooks, Buckley & Beau.
ATTORNEYS.

April 30, 1963  L. J. LAPOINTE  3,087,673
DECIMAL POINT MECHANISM FOR CALCULATORS
Original Filed Nov. 19, 1953  42 Sheets-Sheet 18
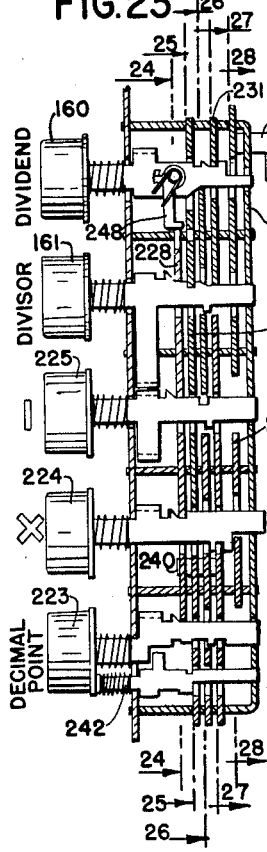
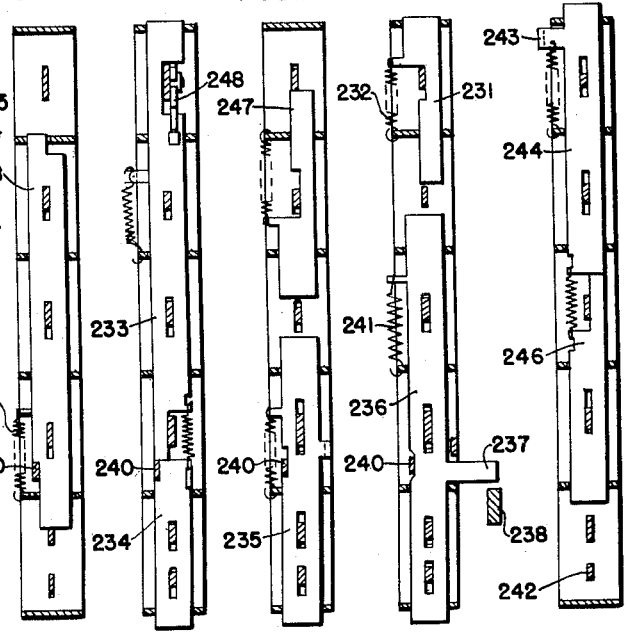
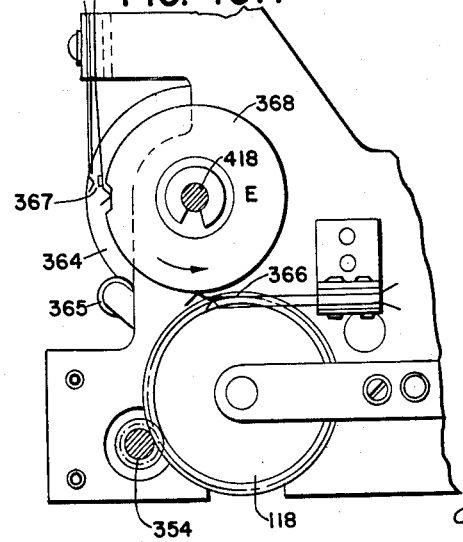
INVENTOR.
LLOYD J. LAPOINTE
BY
Beau, Brooks, Buckley & Beau
ATTORNEYS April 30, 1963 L. J. LAPOINTE 3,087,673
DECIMAL POINT MECHANISM FOR CALCULATORS
Original Filed Nov. 19, 1953 42 Sheets-Sheet 19

LOWER TO UPPER

UPPER TO LOWER

CLEAR KEYBOARD

SUB-TOTAL

ENTER & START

TOTAL

INVENTOR.
LLOYD J. LAPOINTE
BY
Beau, Brooks Buckley & Beau
ATTORNEYS

April 30, 1963    L. J. LAPOINTE    3,087,673
DECIMAL POINT MECHANISM FOR CALCULATORS
Original Filed Nov. 19, 1953    42 Sheets-Sheet 20

INVENTOR.
LLOYD J. LAPOINTE
BY
Beau, Brooks, Buckley & Beau.
ATTORNEYS

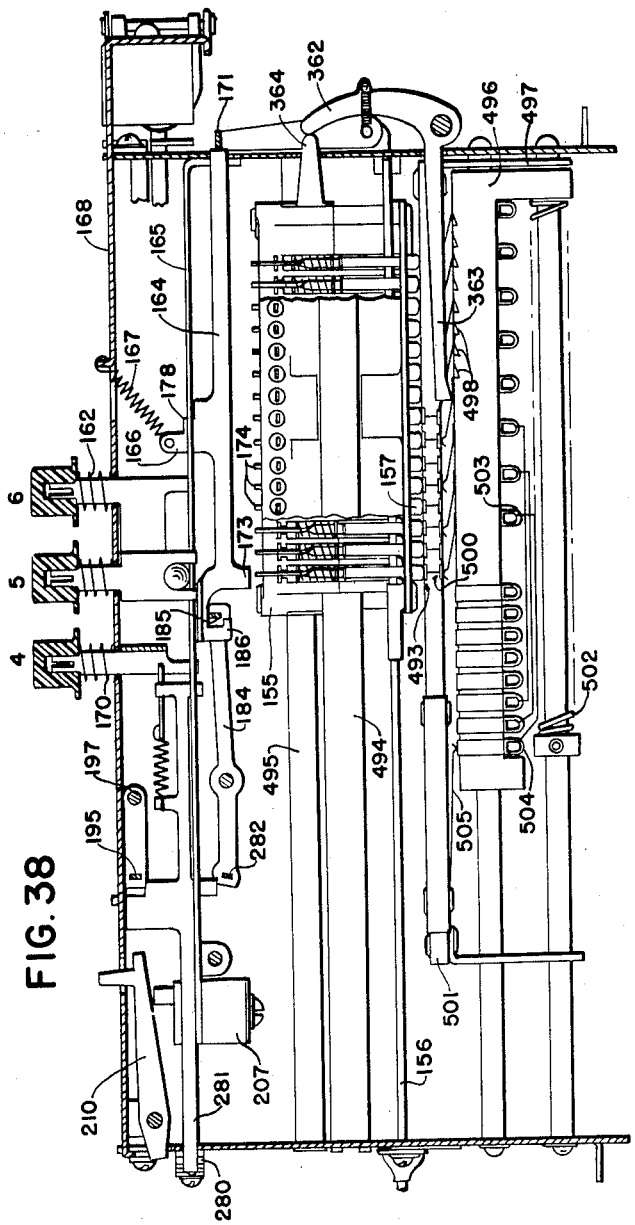

April 30, 1963  L. J. LAPOINTE  3,087,673
DECIMAL POINT MECHANISM FOR CALCULATORS
Original Filed Nov. 19, 1953  42 Sheets-Sheet 22

INVENTOR.
LLOYD J. LAPOINTE
BY
Beau, Brooks, Buckley & Beau,
ATTORNEYS

INVENTOR
LLOYD J. LAPOINTE

BY

Beau, Brooks, Buckley & Beau
ATTORNEYS

April 30, 1963     L. J. LAPOINTE     3,087,673

DECIMAL POINT MECHANISM FOR CALCULATORS

Original Filed Nov. 19, 1953     42 Sheets-Sheet 25

*INVENTOR.*
LLOYD J. LAPOINTE

BY

*Beau, Brooks Buckley & Beau*
ATTORNEYS

April 30, 1963
L. J. LAPOINTE
3,087,673
DECIMAL POINT MECHANISM FOR CALCULATORS
Original Filed Nov. 19, 1953
42 Sheets-Sheet 26
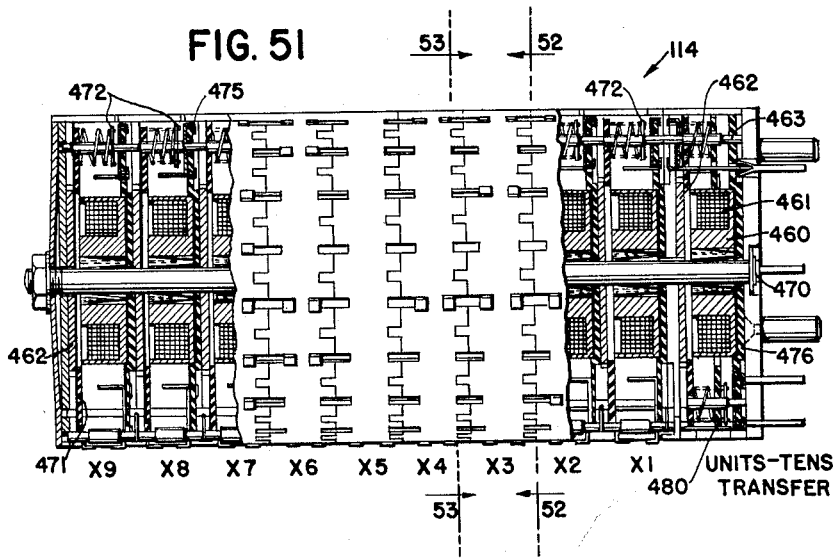
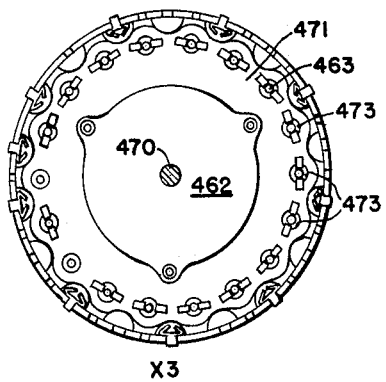
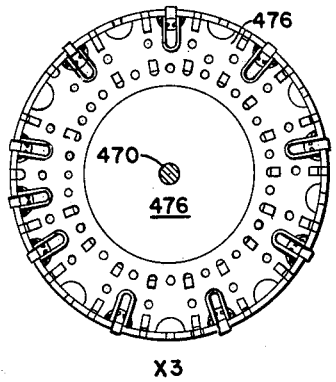
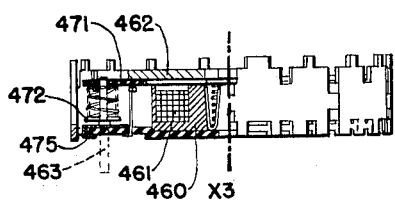
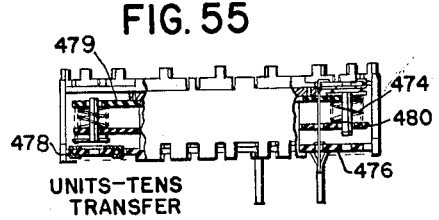
INVENTOR.
LLOYD J. LAPOINTE
BY
*Beau, Brooks, Buckley & Beau,*
ATTORNEYS April 30, 1963  L. J. LAPOINTE  3,087,673
DECIMAL POINT MECHANISM FOR CALCULATORS
Original Filed Nov. 19, 1953  42 Sheets-Sheet 27

INVENTOR.
LLOYD J. LAPOINTE
BY
Bean, Brooks, Buckley & Bean.
ATTORNEYS

April 30, 1963 L. J. LAPOINTE 3,087,673
DECIMAL POINT MECHANISM FOR CALCULATORS
Original Filed Nov. 19, 1953 42 Sheets-Sheet 28

X4

X3

*INVENTOR.*
LLOYD J. LAPOINTE
BY
Beau, Brooks, Buckley & Beau.
ATTORNEYS

April 30, 1963 L. J. LAPOINTE 3,087,673
DECIMAL POINT MECHANISM FOR CALCULATORS
Original Filed Nov. 19, 1953 42 Sheets-Sheet 29
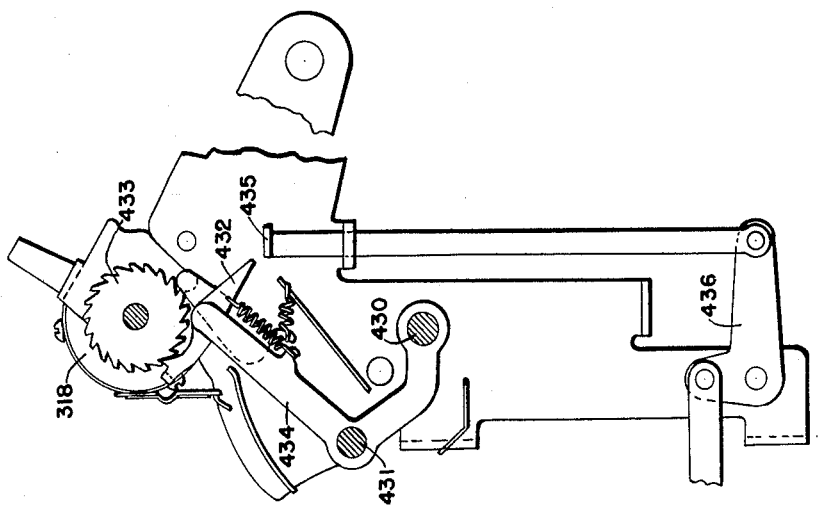
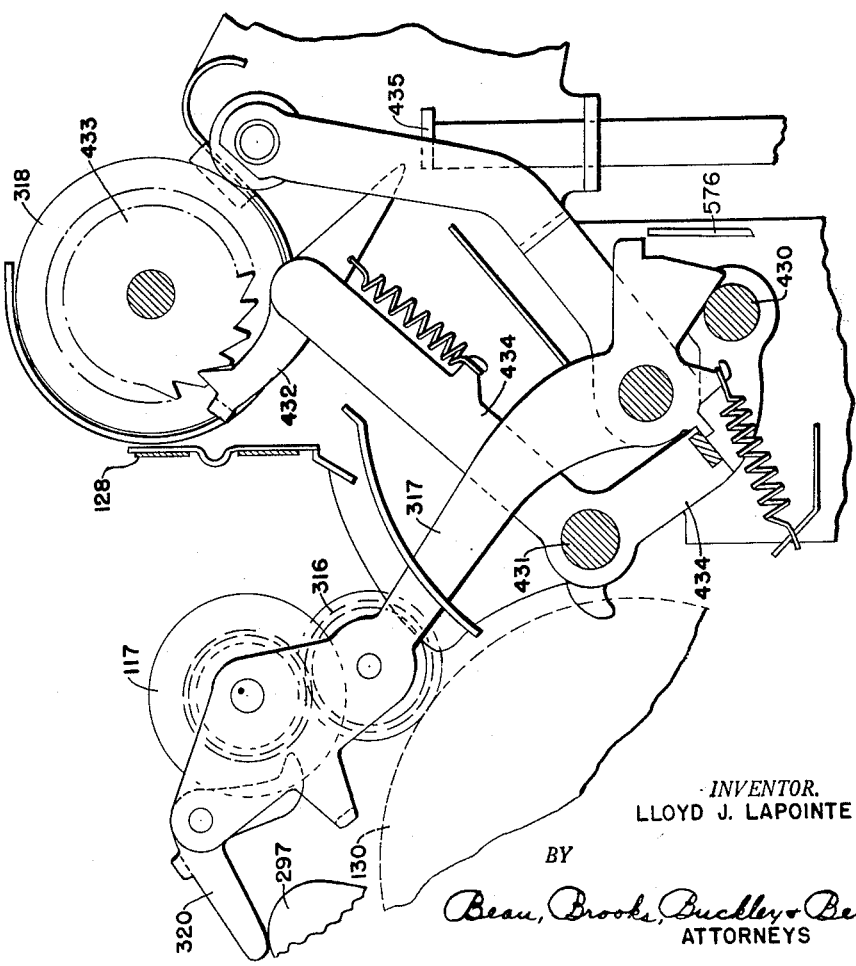
INVENTOR.
LLOYD J. LAPOINTE
BY
Bean, Brooks, Buckley & Bean
ATTORNEYS

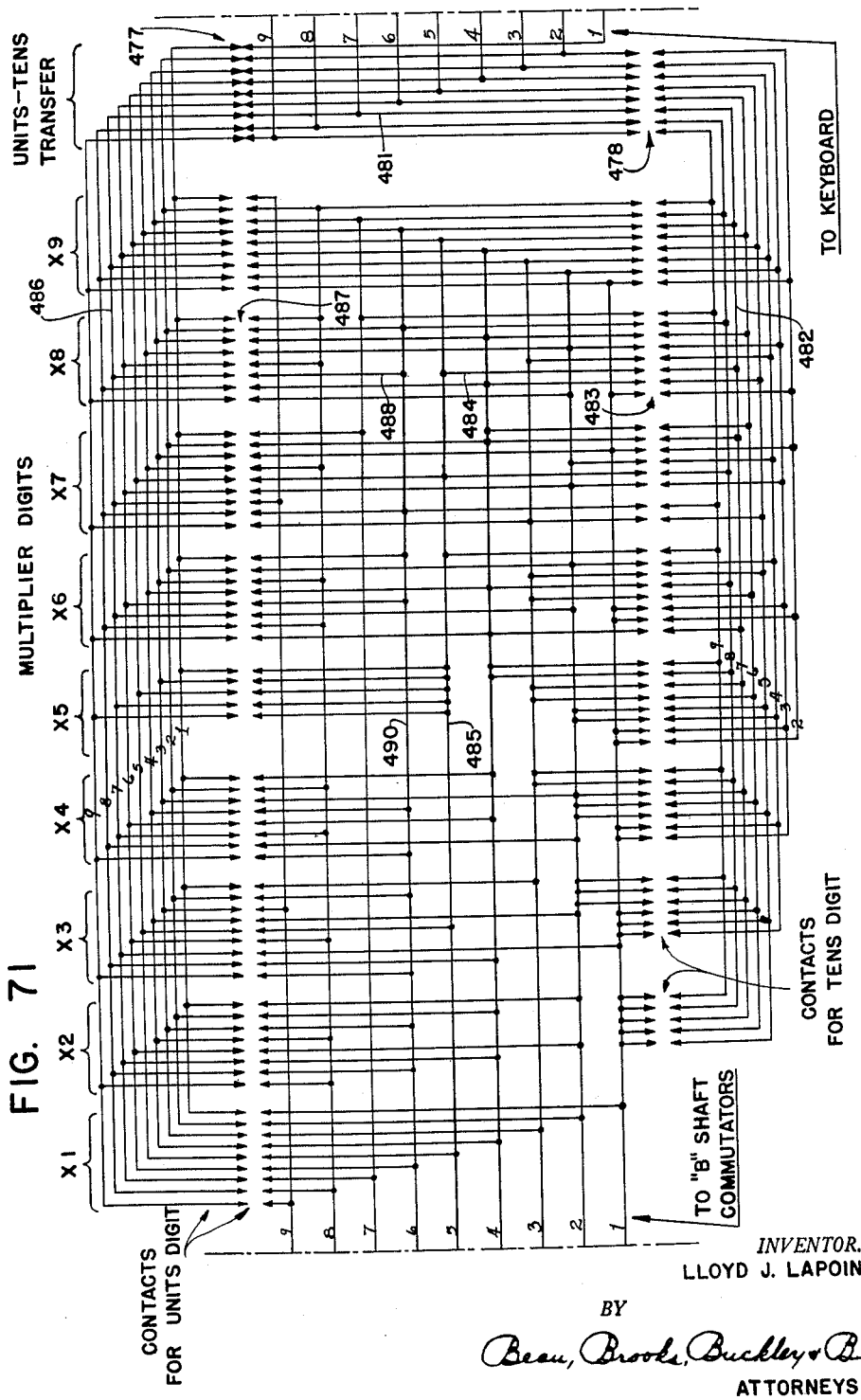

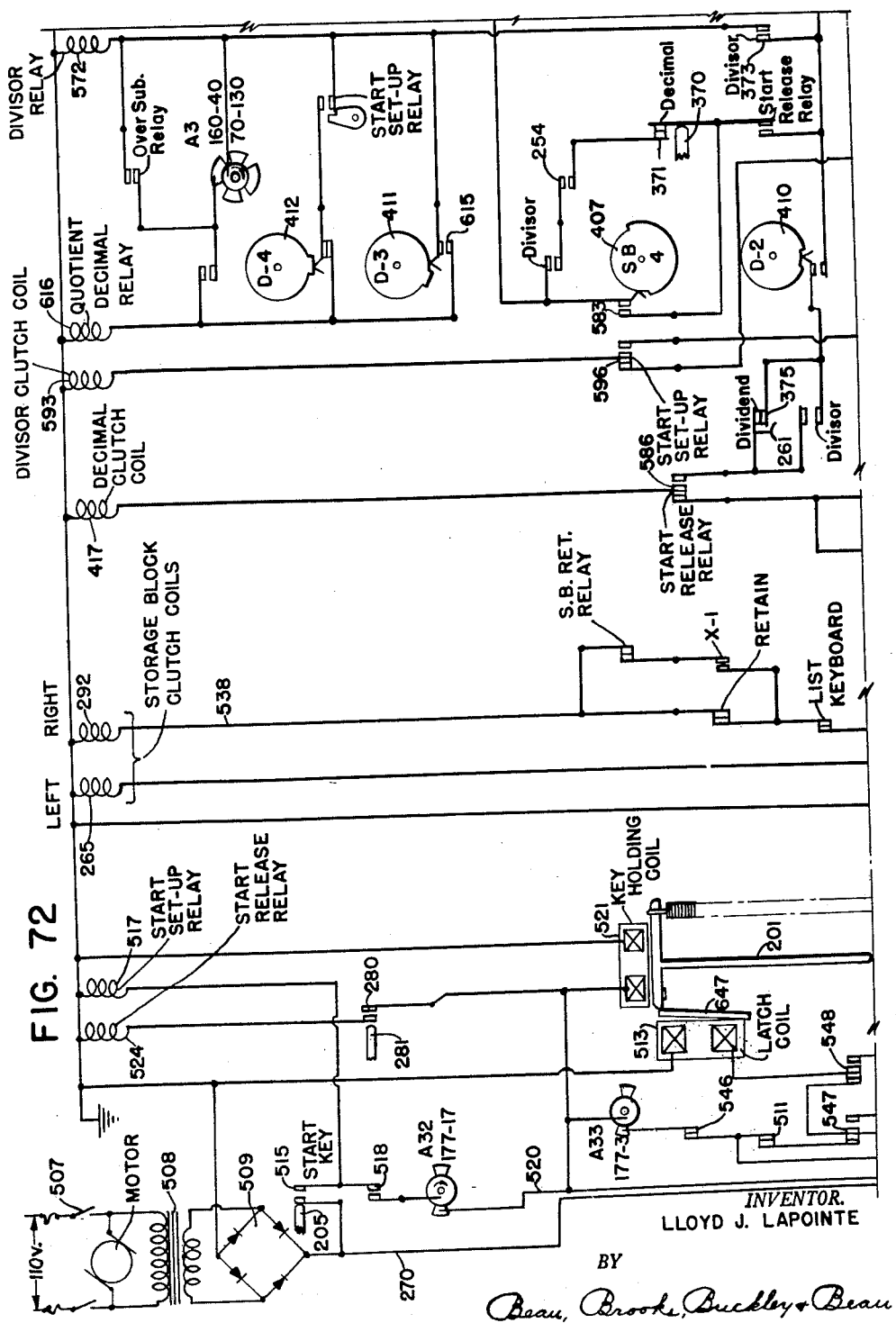

April 30, 1963  L. J. LAPOINTE  3,087,673
DECIMAL POINT MECHANISM FOR CALCULATORS
Original Filed Nov. 19, 1953  42 Sheets-Sheet 32

INVENTOR
LLOYD J. LAPOINTE
BY
Bean, Brooks, Buckley & Bean,
ATTORNEYS

April 30, 1963 L. J. LAPOINTE 3,087,673
DECIMAL POINT MECHANISM FOR CALCULATORS
Original Filed Nov. 19, 1953 42 Sheets-Sheet 34

INVENTOR.
LLOYD J. LAPOINTE
BY
Beau, Brooks, Buckley & Beau.
ATTORNEYS

April 30, 1963     L. J. LAPOINTE     3,087,673
DECIMAL POINT MECHANISM FOR CALCULATORS

FIG. 76

INVENTOR.
LLOYD J. LAPOINTE
BY
Beau, Brooks, Buckley & Beau.
ATTORNEY

April 30, 1963 L. J. LAPOINTE 3,087,673
DECIMAL POINT MECHANISM FOR CALCULATORS
Original Filed Nov. 19, 1953 42 Sheets-Sheet 36
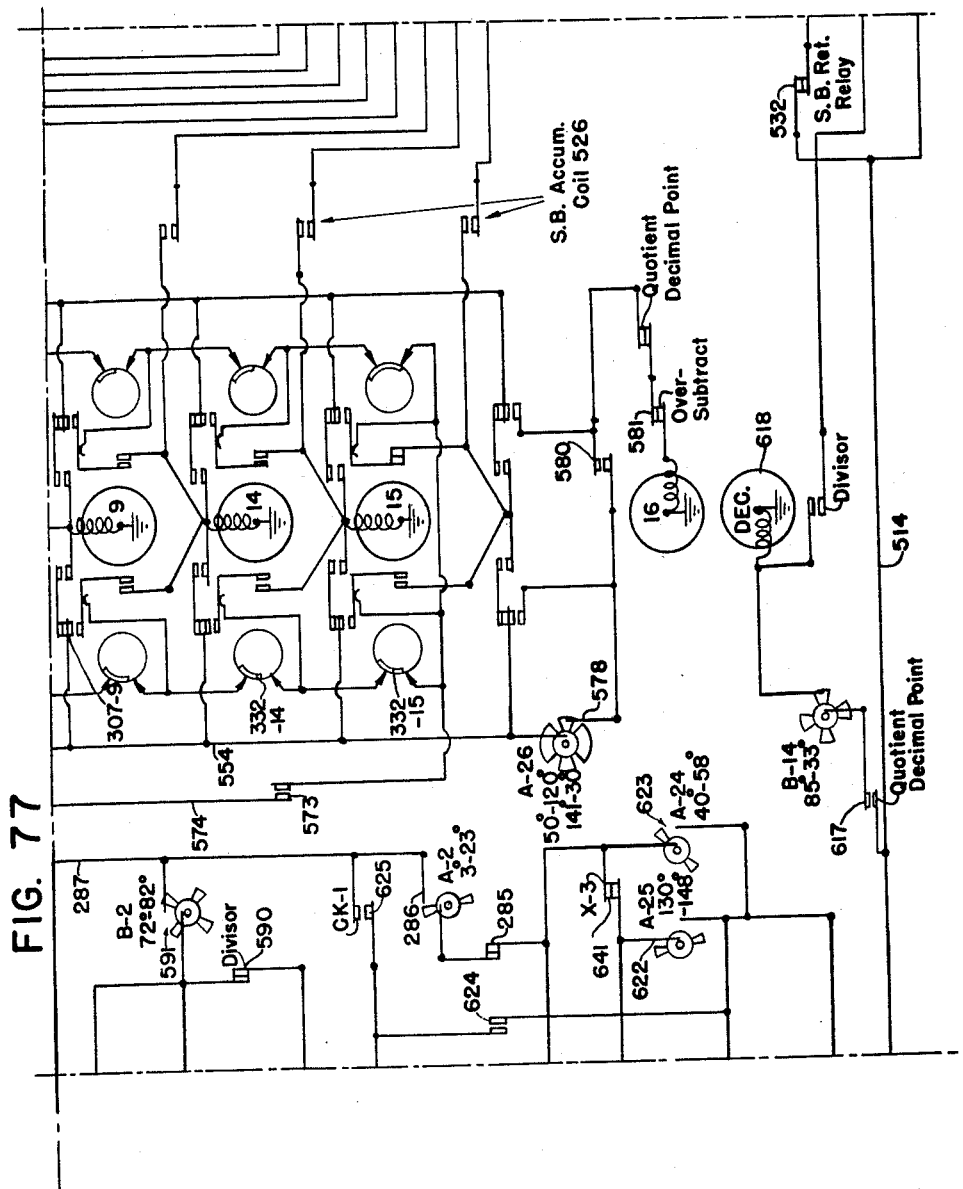
INVENTOR
LLOYD J. LAPOINTE
BY
Beau, Brooks, Buckley & Beau.
ATTORNEYS

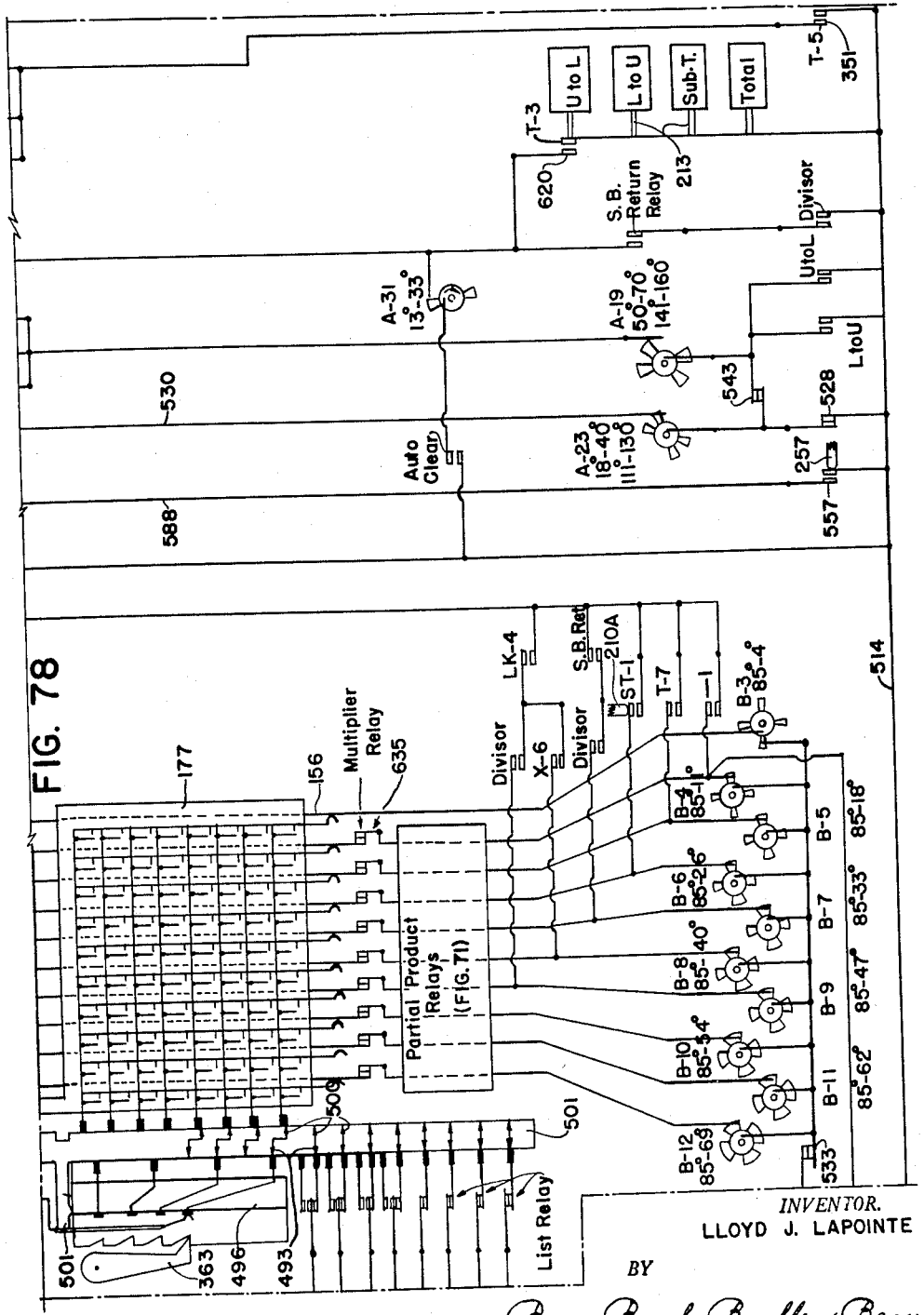

April 30, 1963   L. J. LAPOINTE   3,087,673
DECIMAL POINT MECHANISM FOR CALCULATORS
Original Filed Nov. 19, 1953   42 Sheets-Sheet 38
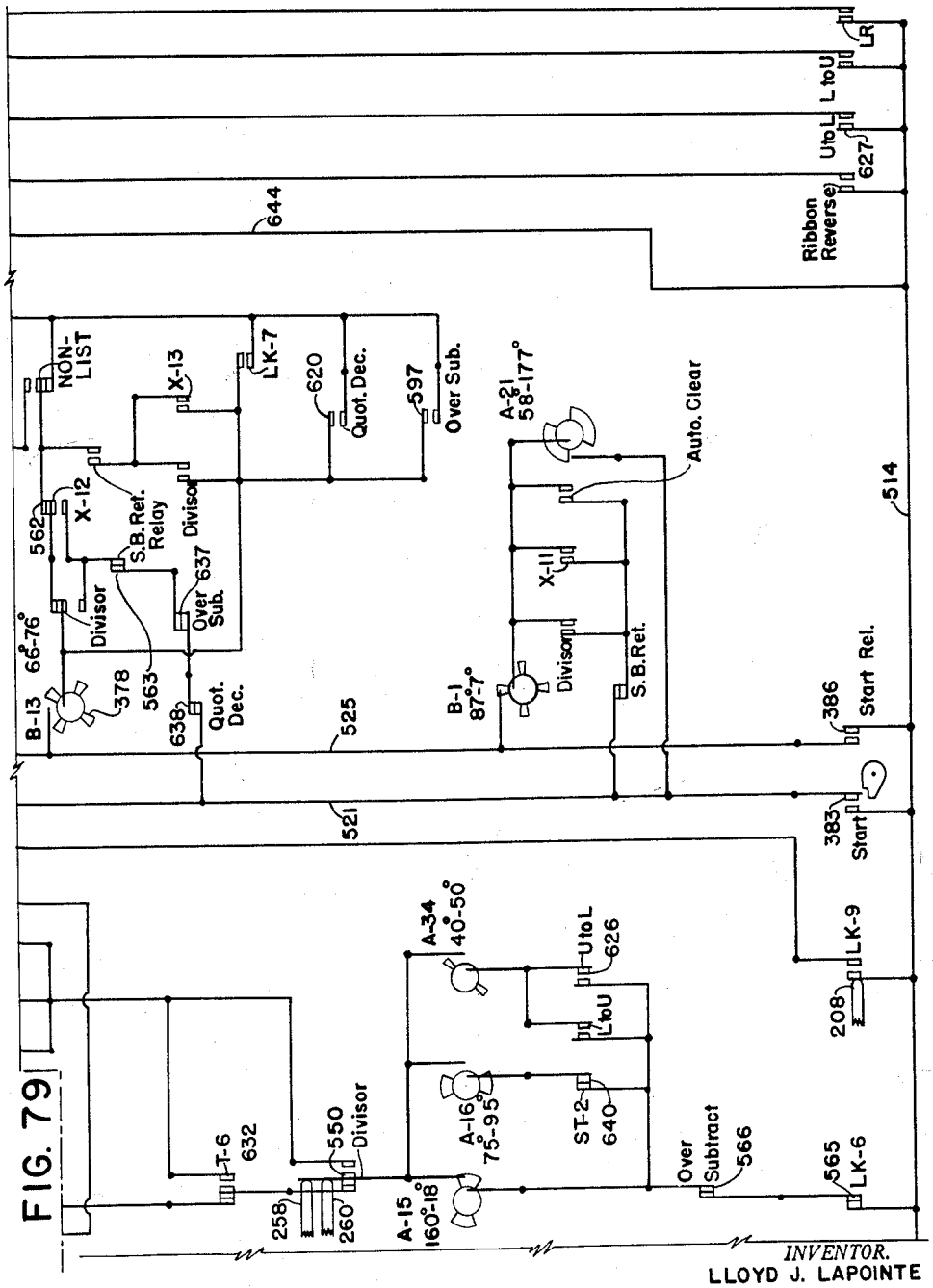
INVENTOR.
LLOYD J. LAPOINTE
BY
Beau, Brooks, Buckley & Beau.
ATTORNEYS April 30, 1963 L. J. LAPOINTE 3,087,673
DECIMAL POINT MECHANISM FOR CALCULATORS
Original Filed Nov. 19, 1953 42 Sheets-Sheet 41

INVENTOR
LLOYD J. LAPOINTE

BY
Beau, Brooks. Buckley & Beau.
ATTORNEYS

April 30, 1963   L. J. LAPOINTE   3,087,673
DECIMAL POINT MECHANISM FOR CALCULATORS
Original Filed Nov. 19, 1953   42 Sheets-Sheet 42

FIG. 84

```
MULTIPLICAND—2.3 | 4.5—MULTIPLIER
             0 1 |
               8 | 2
               1 | 1
                 | 0 5
          ─────────────
           1 0 | 3 5 —PRODUCT
```

FIG. 85

```
                        ╱—DIVIDEND                      ╱—QUOTIENT
DIVISOR—2 7 | 6 5 0 0 0 0 0 0 0 0 0 0 0 0 0 | 2 4 0 7 4 0 7 4 0 7 4 0 7 4
            5 4
            ─────
            1 1 0
            1 0 8
            ─────
              2 0 0
              1 8 9
              ─────
                1 1 0
                1 0 8
                ─────
                  2 0 0
                  1 8 9
                  ─────
                    1 1 0
                    1 0 8
                    ─────
                      2 0 0
                      1 8 9
                      ─────
                        1 1 0
                        1 0 8
                        ─────
                          2 0 0
                          1 8 9
                          ─────
                            1 1 0
                            1 0 8
                            ─────
                              2—REMAINDER
```

INVENTOR
LLOYD J. LAPOINTE

BY
*Beau, Brooks, Buckley & Beau.*
ATTORNEYS 3,087,673
Patented Apr. 30, 1963

3,087,673
DECIMAL POINT MECHANISM FOR
CALCULATORS
Lloyd J. Lapointe, 1261 Highland Ave.,
Rochester 20, N.Y.
Original application Nov. 19, 1953, Ser. No. 393,041, now Patent No. 2,951,636, dated Sept. 6, 1960. Divided and this application July 21, 1960, Ser. No. 44,376
9 Claims. (Cl. 235—161)

This application is a division of my co-pending application, Serial No. 393,041, filed November 19, 1953, now Patent No. 2,951,636, issued September 6, 1960, for a Calculating Machine.

The invention relates to automatic calculating machines of the electric mechanical type having both electrical and mechanical controls. It has particular reference to the improvements and simplified devices which obtain partial products during a multiplication operation cycle when a single digit in a multiplier is multiplied by all the digits in a multiplicand. The invention also has particular reference to the automatic positioning of entered numbers and results about a decimal point position in an accumulator and on a record sheet.

Calculating machines capable of performing the four primary computations of addition, substraction, multiplication, and division in an automatic manner are always complex and require a skilled operator to obtain the desired results. It is desirable to provide a machine which will perform any of the four computations without exercising any more skill than would be required to operate a simple adding machine. It is also desirable to print all entries put into the machine and all results obtained from the machine on a record sheet with the decimal point always aligned about a common decimal position.

One of the underlying principles of the present invention is to count the digits on either side of the decimal point as they are entered into a storage block. With this data the position of the decimal point in a product or quotient can be obtained automatically and the result is printed in a position on the recording sheet which shows the exact decimal position. Other novel features will be evident when the description is read in connection with the drawings.

One of the objects of the present invention is to provide an improved automatic calculating machine which avoids one or more of the disadvantages and limitations of prior art arrangements.

Another object of the invention is to reduce the number of mechanical and electrical parts in an automatic calculating machine.

Another object of the invention is to improve the accuracy of calculating machines by providing a system for entering digits which is positive in operation.

Another object of the invention is to increase the flexibility of calculating machines by providing two or more accumulators with operative means for transferring a number from any one accumulator to any other accumulator in an additive or subtractive manner.

Another object of the invention is to increase the usefulness of calculating machines by providing a printing mechanism which is capable of printing all numbers entered into the machine and all results.

Another object of the invention is to automatically determine the decimal point for all numbers whether the result of addition, subtraction, division, or multiplication.

Another object of the invention is to print the results of addition, subtraction, and multiplication on a record sheet arranged about a decimal position which can be indicated on the sheet by a characteristic mark.

Another object of the invention is to employ an improved relay system for obtaining a plurality of partial products when all the digits in the multiplicand are multiplied by each digit in the multiplier.

Another object of the invention is to enable a calculating machine to perform division in a simplified manner by omitting the usual requirement of an addition cycle after an over-subtraction cycle.

Another object of the invention is to insure the accuracy of calculating machines by providing a safety circuit which operates whenever there is a break in the electrical power applied to the machine.

A feature of the invention includes nine partial product relays, each containing circuit contacts which are assigned values corresponding to the tens and units digits of products of all numbers from one to nine, inclusive; each of the relay contacts connected in series with a control contact and one or more electromagnetic clutches which control a series of accumulator counting wheels to turn an amount proportional to the digit values of the product of a multiplicand digit and a multiplier digit.

Another feature of the invention includes a system for determining the decimal point position in a sum, difference, product, or a quotient. To accomplish this during a dividing operation the digits of a dividend are first entered into a storage block and the digits to the left of the decimal point are counted. Then the dividend is entered into an accumulator in a predetermined position. The digits of the divisor are entered into the storage block and the digits to the right of the decimal point are added to the counted dividend digits. A positioning system is employed to align the digits to position the lowest digit in the divisor in the same denominational order as the highest digit in the dividend. During the usual repeated subtraction and storage block shift operations a decimal point is printed between digits in the quotient when the sum of the digit places to the left of the decimal point in the dividend plus the number of digit places to the right of the decimal point in the divisor is equal to the number of storage block shift operations.

To accomplish this during a multiplication operation an accumulator decimal point is first assigned a position between two accumulator orders. Then the multiplicand digits are entered into the storage block and the digits to the right of the decimal point are counted. Next, the multiplier digits are entered into the storage block adjoining the multiplicand digits and the number of digits to the right of the multiplier decimal point are added to the decimal digits of the multiplicand. Before the start of the multiplication operation the storage block is further shifted a number of digit spaces which is the difference between the number of decimal spaces in the accumulator and the sum of the decimal digits in the multiplicand and the multiplier.

During an addition or subtraction operation with decimal point registration, the numbers are entered into the storage block as described above and the digit places to the right of the decimal point are counted. Before the start of the operation the storage block is shifted a number of digit places which is the difference between the number of decimal spaces in the accumulator and the number of decimal digits in the entered number.

Another feature of the invention includes a circuit means for removing the entered number from the storage block whenever the decimal capacity of the machine is exceeded.

For a better understanding of the present invention, together with other and further objects thereof, reference is made to the following description taken in connection with the accompanying drawings.

FIGS. 1 and 2, when viewed together, are a plan view of the entire calculator with some of the cover plates removed.

FIGS. 3 and 4, when viewed together, are a side view taken from the right side of the calculator with the covers removed.

FIGS. 8A, B, C, and D are side views of one of the accumulator wheels showing carry contacts.

FIG. 9 is a front view of the accumulator mechanism with the keyboard and associated mechanism removed.

FIGS. 9A, B, and C are front views of one of the shuttle shaft control mechanisms.

FIG. 10 is a sectional view of the keyboard mechanism taken along line 10—10 of FIG. 16.

FIG. 11 is a side view of the keyboard mechanism taken from the right.

Figure 12:
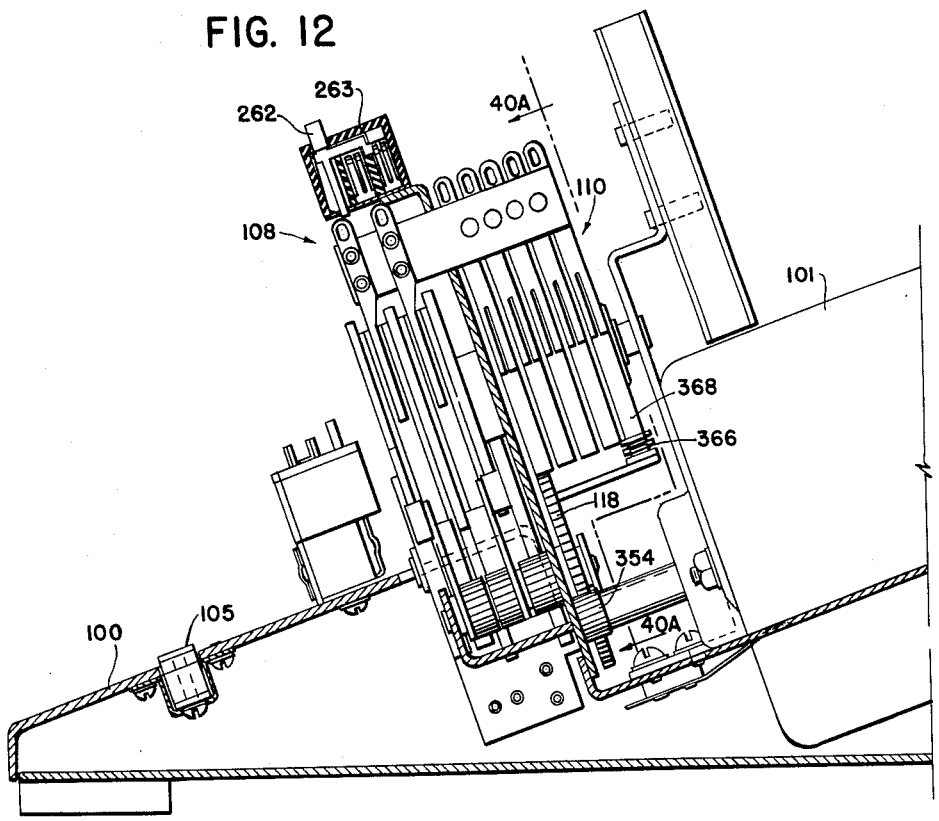
Figure 13:
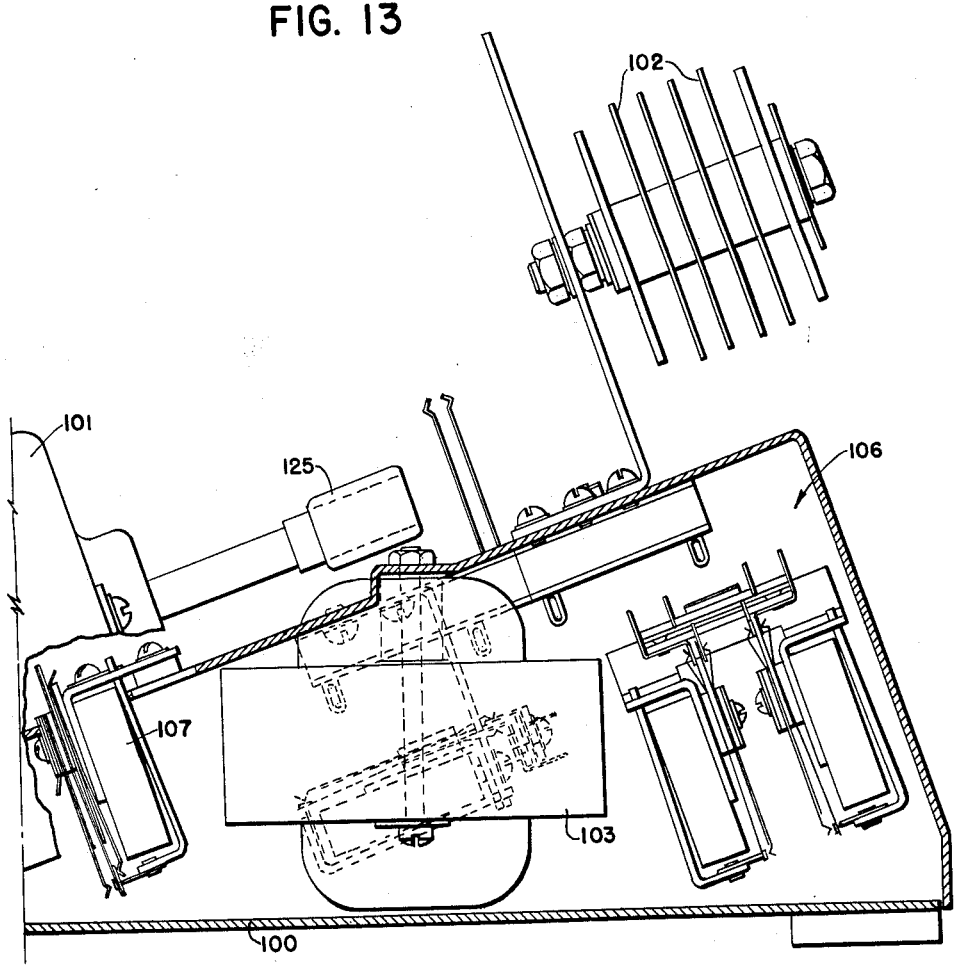

FIGS. 12 and 13, when viewed side by side, are a sectional view of the base mechanism with the keyboard, accumulator, and printing mechanism removed.

FIGS. 14 and 15 when viewed side by side are a plan view of the base mechanism with all the plug-in units removed.

FIG. 16 is a front view of the keyboard with the cover removed.

Figure 20:
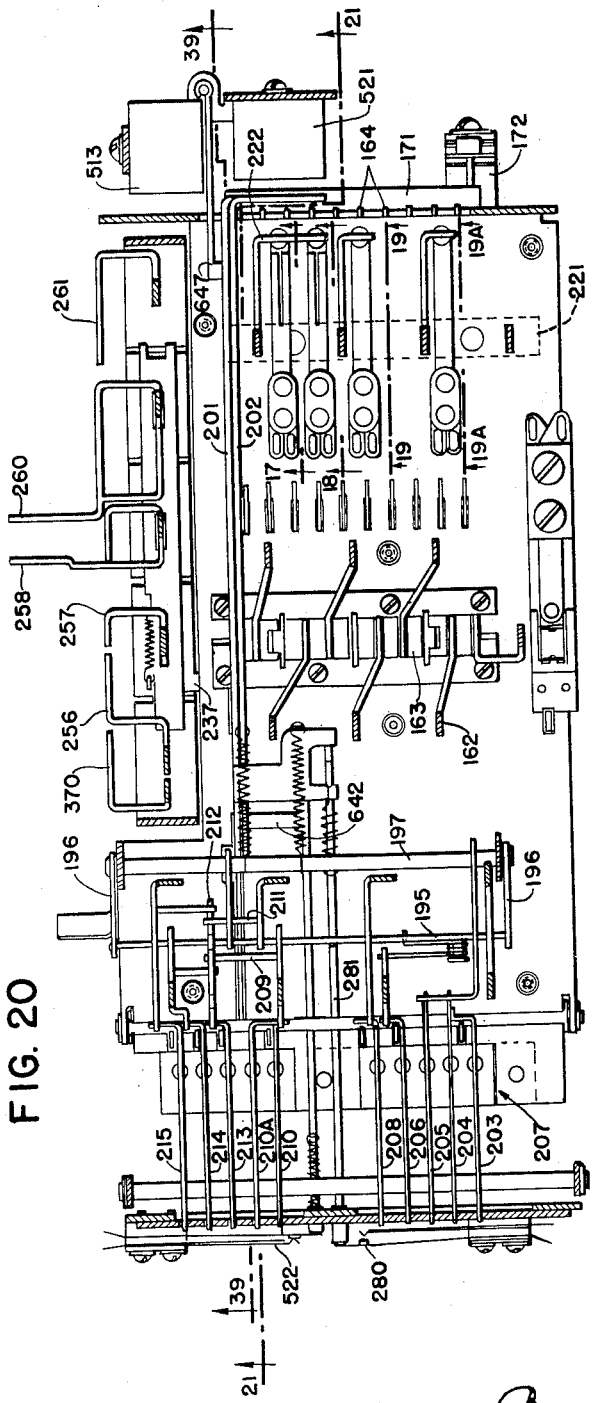

FIG. 17 is a partial sectional view of the Retain key taken along line 17—17 of FIG. 20.

FIG. 18 is a partial sectional view of the Retain key taken along line 18—18 of FIG. 20.

FIG. 19 is a sectional view of the Non-List key, also the Lower Register key, taken along lines 19—19 and 19A—19A of FIG. 20.

FIG. 20 is a sectional view of the keyboard mechanism taken along line 20—20 of FIG. 16.

Figure 21:
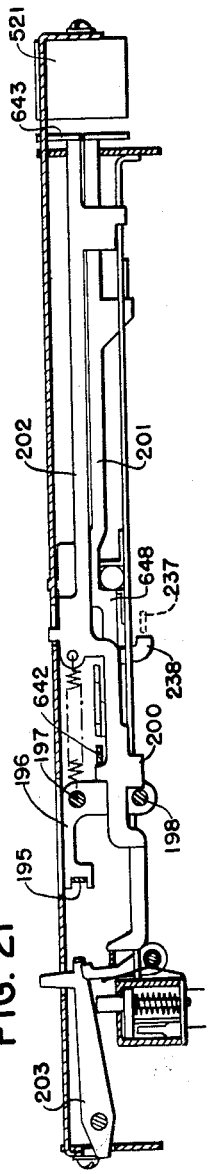

FIG. 21 is a detailed sectional view of a small part of the keyboard mechanism and is taken along line 21—21 of FIG. 20.

FIG. 22 is a plan view of the storage block.

FIG. 23 is a sectional view of some of the operational keys in the keyboard and is taken along line 23—23 of FIG. 10.

FIGS. 24 to 28, inclusive, are sectional views of the key shanks and stop bars taken along corresponding section lines of FIG. 23.

Figure 29:
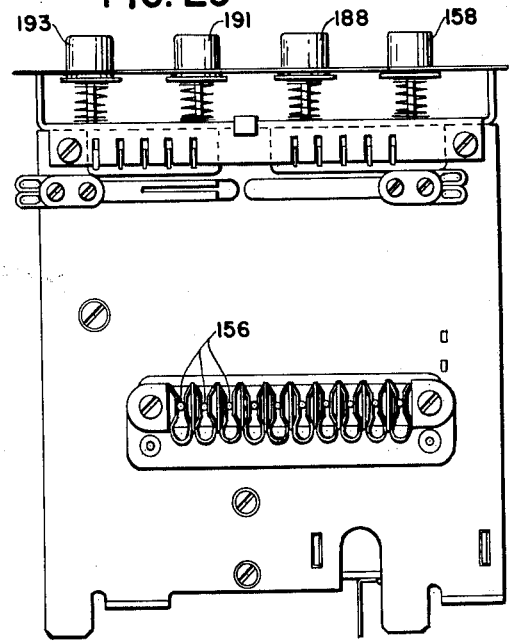

FIG. 29 is a side view of the keyboard mechanism, taken from the left, and shows the connecting lugs to the storage block switches.

Figure 30:
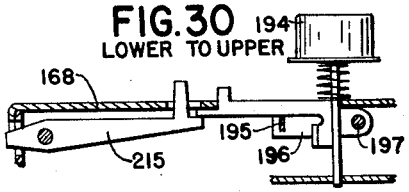
Figure 31:
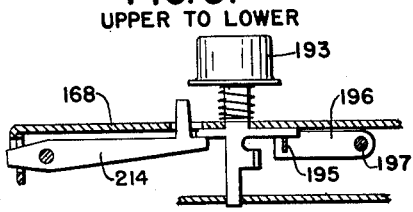

FIG. 30 is a sectional view of the Lower to Upper key showing the key shank and its co-operating mechanism.

FIGS. 31 to 35A, inclusive, are sectional views similar to FIG. 30, showing other operational keys.

Figure 36:
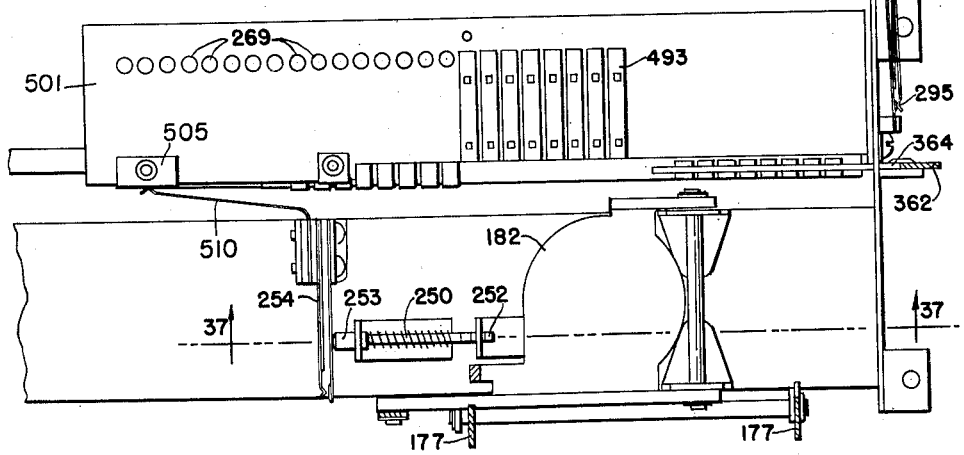

FIG. 36 is a sectional view of the keyboard mechanism, taken along line 36—36 of FIG. 10, and shows some of the operating components.

Figure 37:
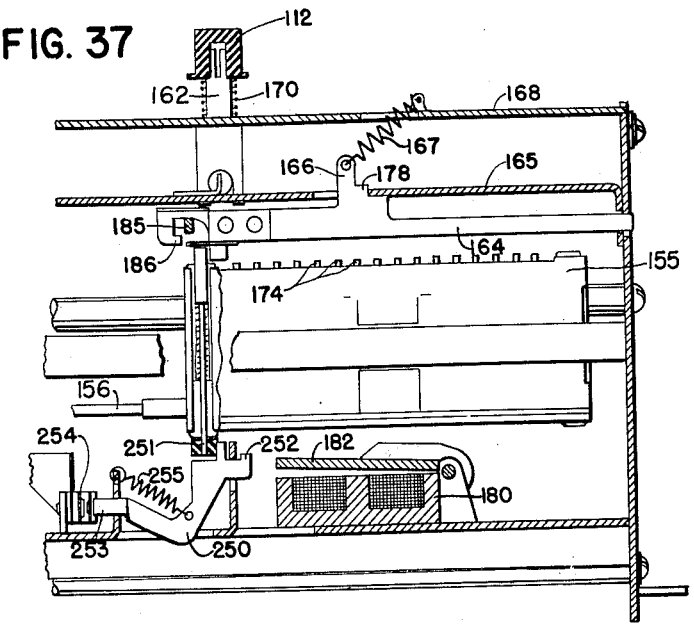

FIG. 37 is a sectional view of part of the keyboard mechanism taken through the "0" key on line 37—37 of FIG. 10.

Figure 37A:
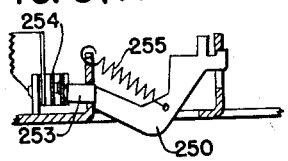

FIG. 37A shows part 250 in the operated position.

FIG. 38 is another sectional view of the keyboard mechanism taken along line 38—38 of FIG. 11 but omitting some of the components.

FIG. 39 is a sectional view of a part of the keyboard mechanism, taken along line 39—39 of FIG. 20.

Figure 40:
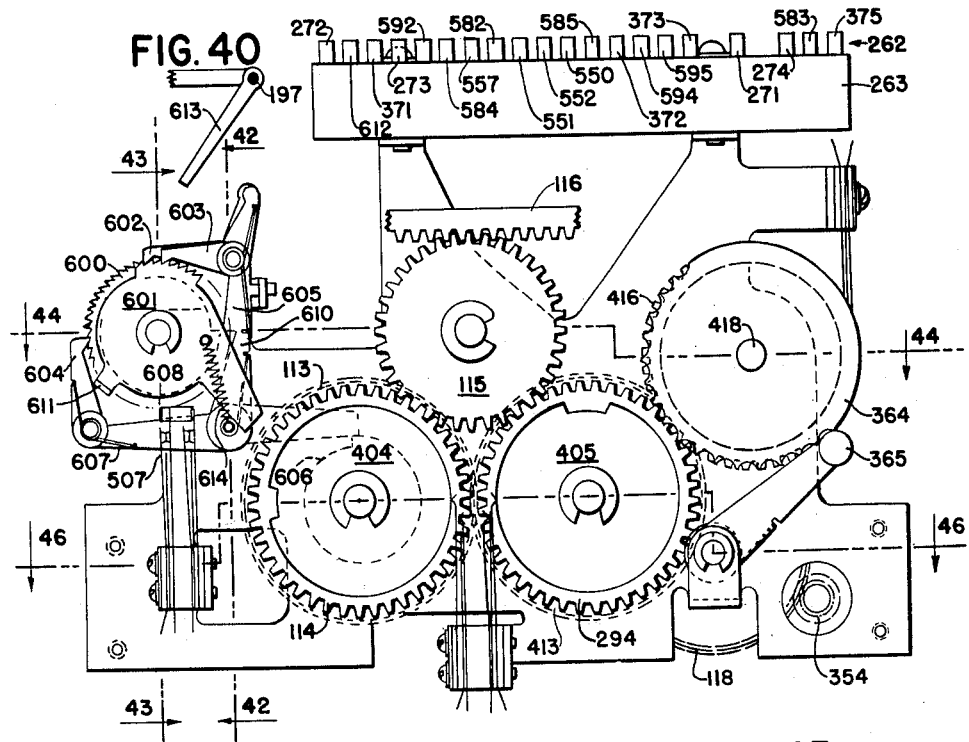

FIG. 40 is a front view of the escapement mechanism.

FIG. 40A is a view of the escapement mechanism taken from the back.

Figure 41:
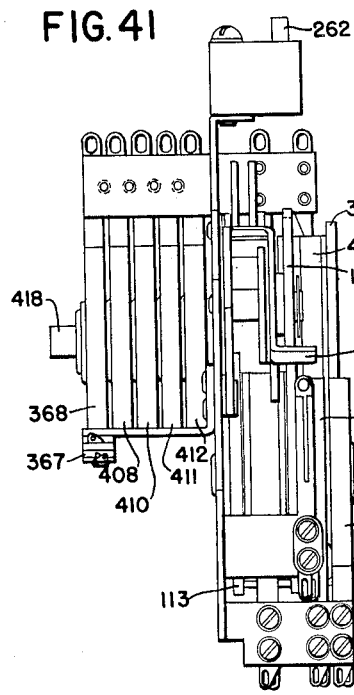

FIG. 41 is a side view of the escapement mechanism taken from the right side of FIG. 40.

Figure 42:
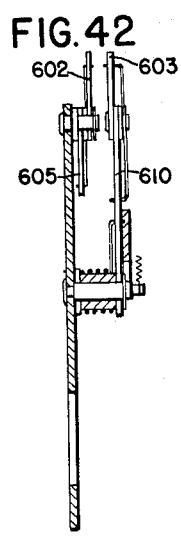

FIG. 42 is a sectional view taken along line 42—42 of FIG. 40.

Figure 43:
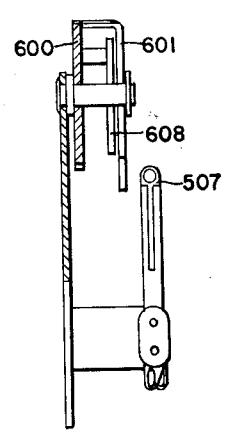

FIG. 43 is a sectional view taken along line 43—43 of FIG. 40.

Figure 44:
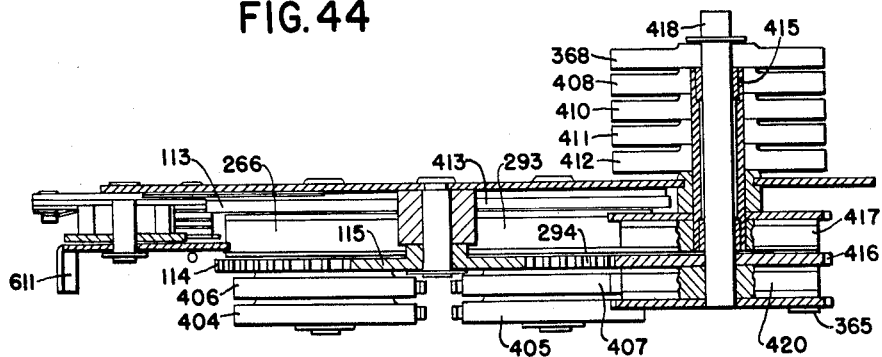

FIG. 44 is a sectional view taken along line 44—44 of FIG. 40.

Figure 45:
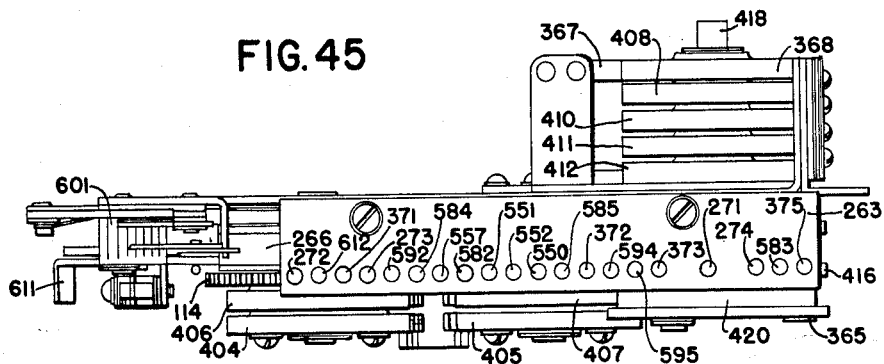

FIG. 45 is a top view of the escapement mechanism.

Figure 46:
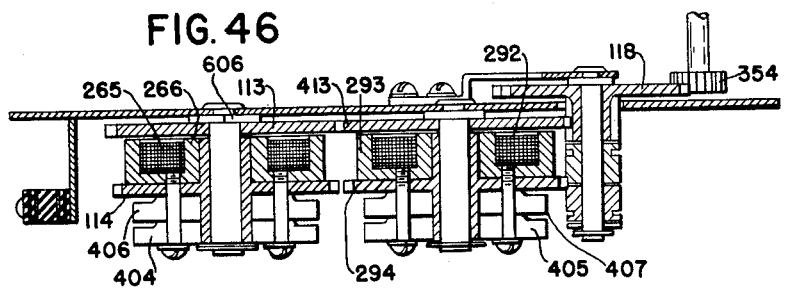

FIG. 46 is a part sectional view taken generally along line 46—46 of FIG. 40.

Figure 47:
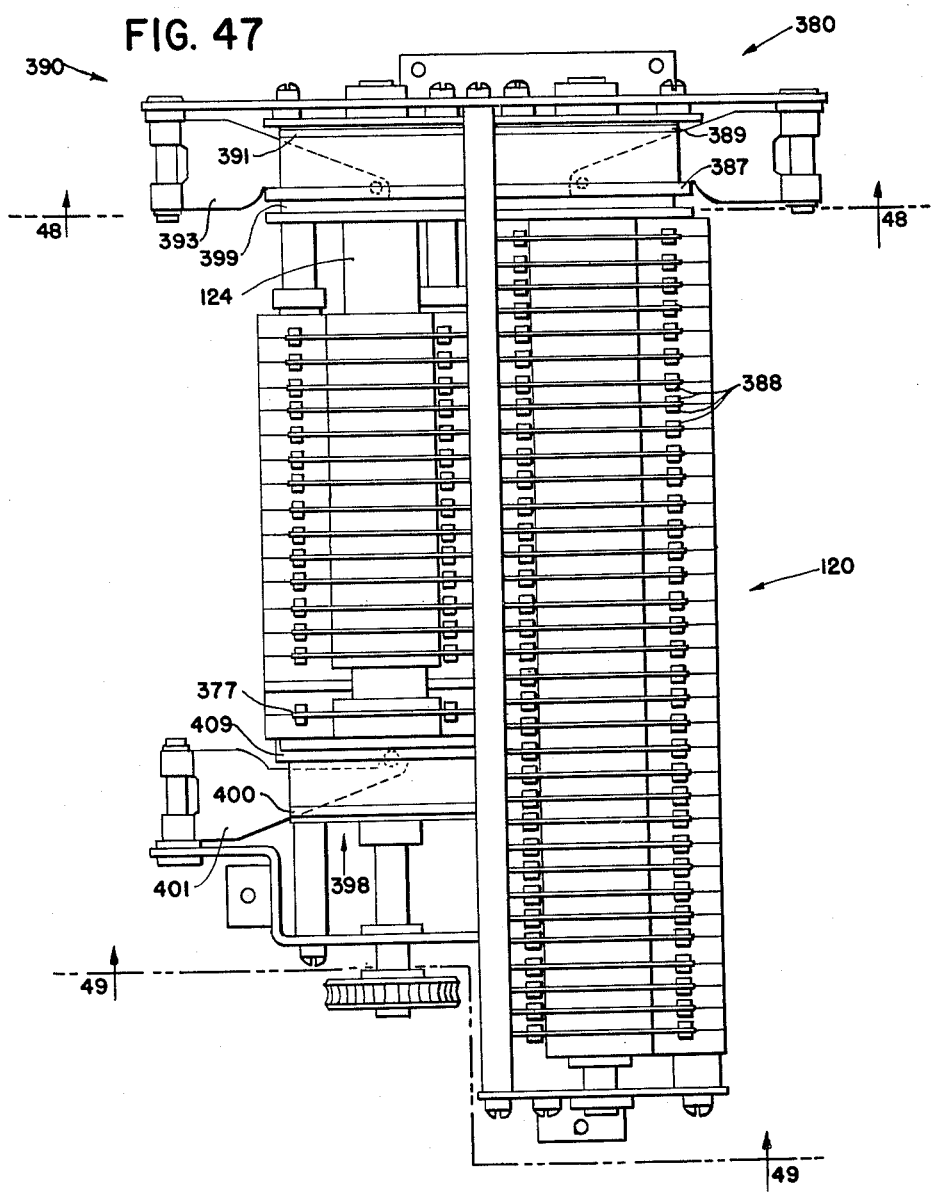

FIG. 47 is a top view of the three commutator shafts with their commutator segments and clutches.

Figure 48:
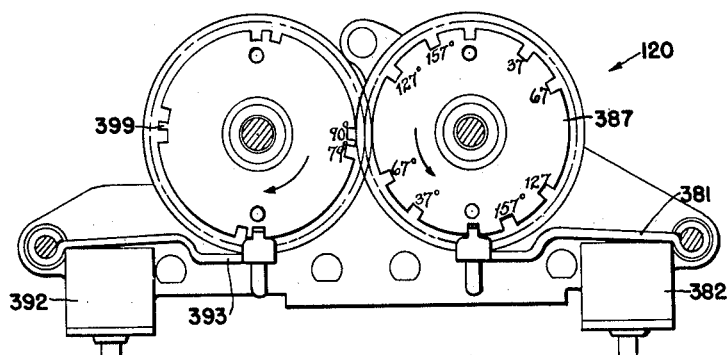

FIG. 48 is a sectional view of the commutator shafts taken along line 48—48 of FIG. 47.

Figure 49:
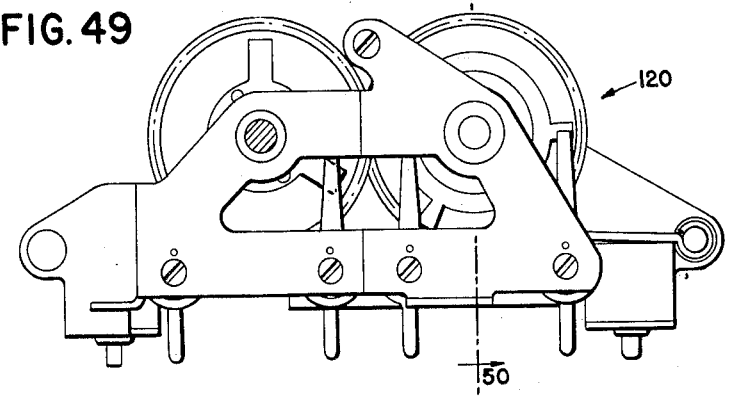

FIG. 49 is a sectional view of the commutator shafts taken along line 49—49 of FIG. 47.

Figure 50:
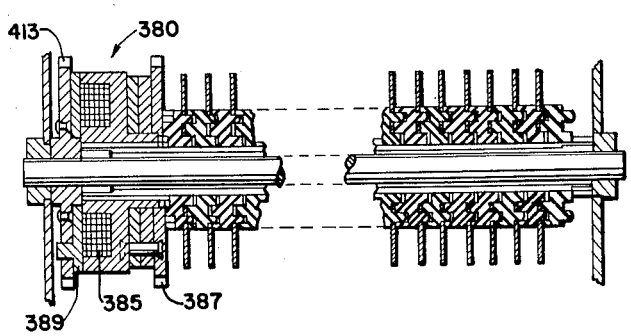

FIG. 50 is a sectional view of the "A" commutator shaft taken along line 50—50 of FIG. 49.

FIG. 51 is a side view of the nine multiplier relays, assembled as a unit, with some parts cut away to show the internal construction.

FIG. 52 is a sectional view, taken along line 52—52 of FIG. 51 and shows some of the details of the "times three" relay unit.

FIG. 53 is a sectional view, taken along line 53—53 of FIG. 51 and shows the other side of the "times three" relay unit.

FIG. 54 is a side view of the "times three" relay with parts in section to show the details of the inner mechanism.

FIG. 55 is a side view of the "Units Tens Transfer" relay with parts in section to show the details of the make and break contact components.

Figure 56:
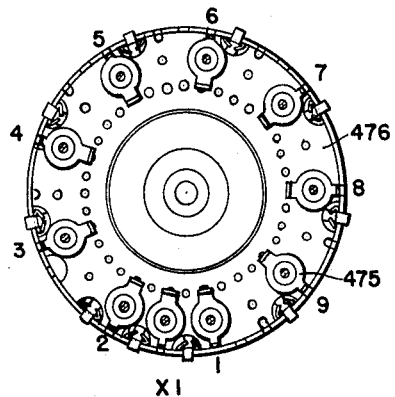

FIG. 56 is a plan view of the "times one" relay unit with its armature removed.

Figure 57:
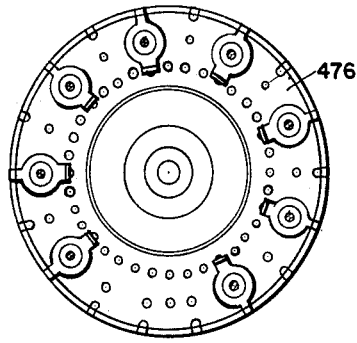

FIG. 57 is a plan view of the "Units Tens Transfer" relay showing the tens value plate with its armature removed.

Figure 58:
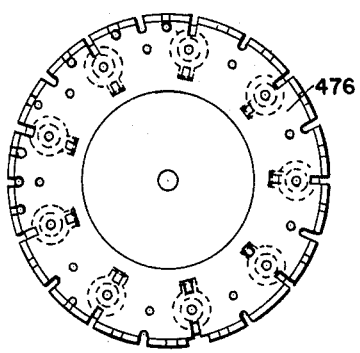

FIG. 58 is a plan view of the "Units Tens Transfer" relay showing the units value plate.

Figure 59:
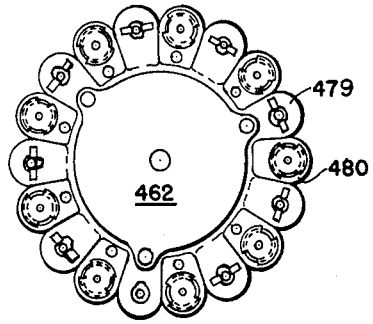

FIG. 59 is a plan view of the moving element in the "Units Tens Transfer" relay.

Figure 60:
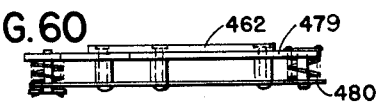

FIG. 60 is an end view of the element shown in FIG. 59.

Figure 61:
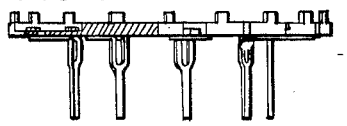

FIG. 61 is a side view, with parts in section, of the plate shown in FIG. 58.

Figure 62:
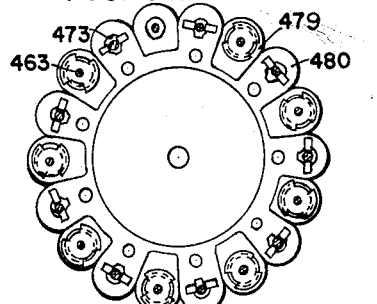

FIG. 62 is a bottom view of the element shown in FIG. 59.

Figure 63:
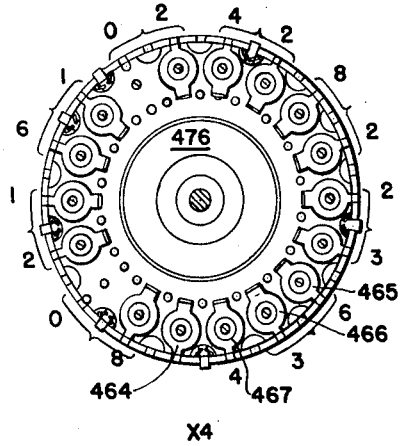

FIG. 63 is a plan view of the "times four" relay base with its armature removed.

Figure 64:
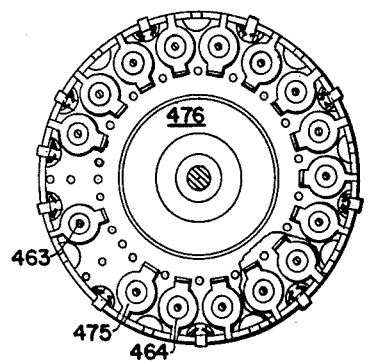

FIG. 64 is a plan view of the "times three" relay base.

Figure 65:
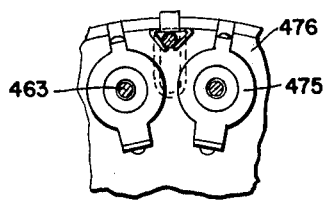

FIG. 65 is a detail drawing on a larger scale showing a small section of the relay base.

Figure 66:
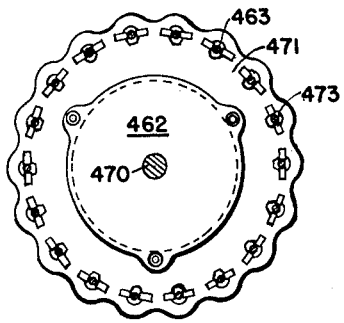

FIG. 66 is a plan view of a typical clapper unit showing the iron relay armature.

Figure 67:
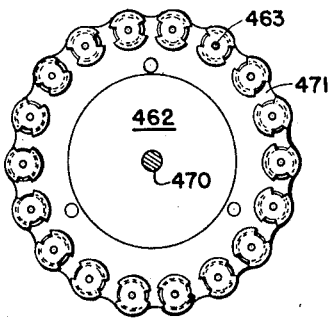

FIG. 67 is a plan view of the clapper unit of FIG. 66 but showing the reverse side.

Figure 68:
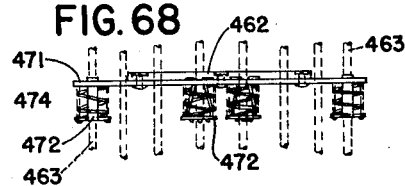
Figure 73:
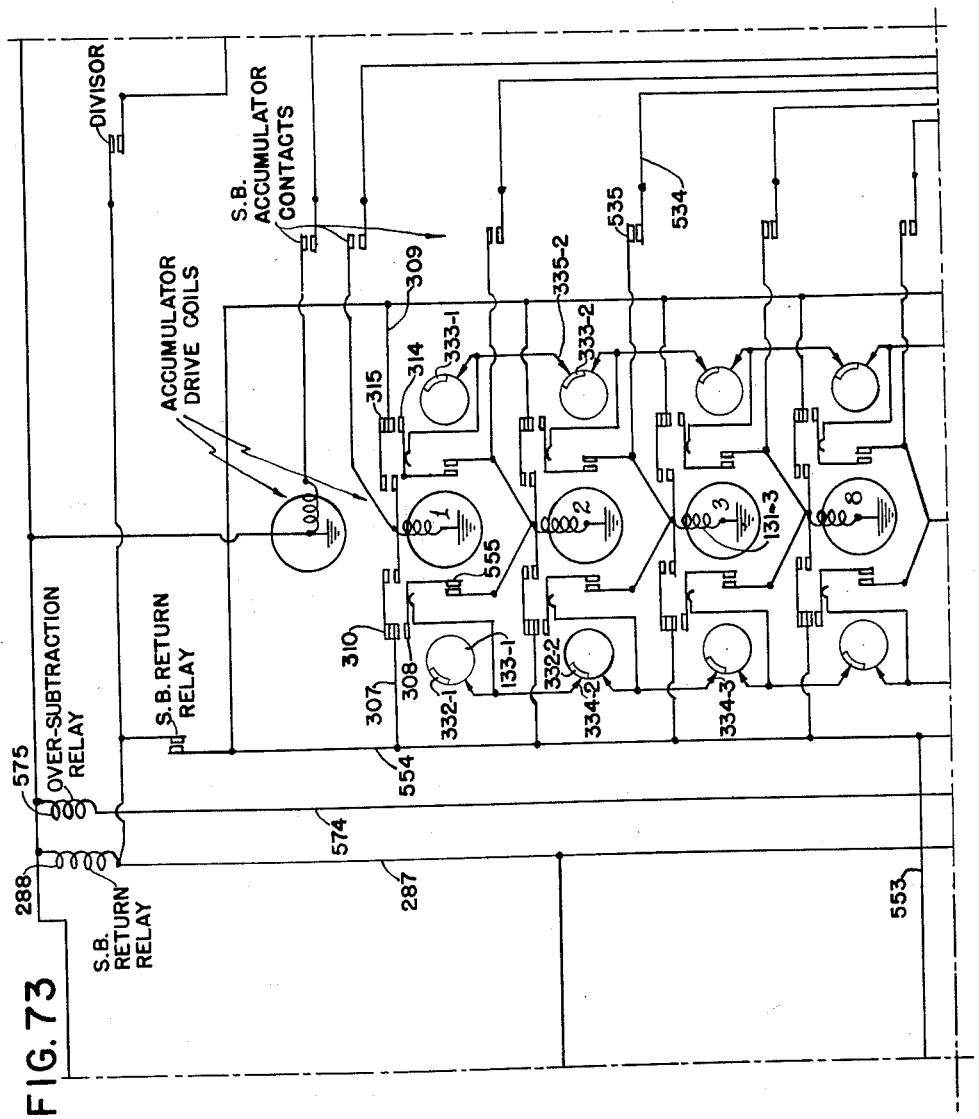

FIG. 68 is a side view of the clapper unit of FIG. 66 showing how the conductor pins fit in the contact units.

FIG. 69 is a side view of the printer unit showing the type wheel, printer arm, and paper feed mechanism.

FIG. 70 is a side view similar to FIG. 69 but on a smaller scale to show more of the paper feed components.

FIG. 71 is a schematic wiring diagram of the complete multiplier relay assembly.

FIGS. 72 to 79, inclusive, when arranged as indicated in FIG. 80 (below FIG. 22) constitute a schematic wiring diagram of the complete calculator.

FIG. 80 indicates the manner of assembling FIGS. 72 to 79.

Figure 81:
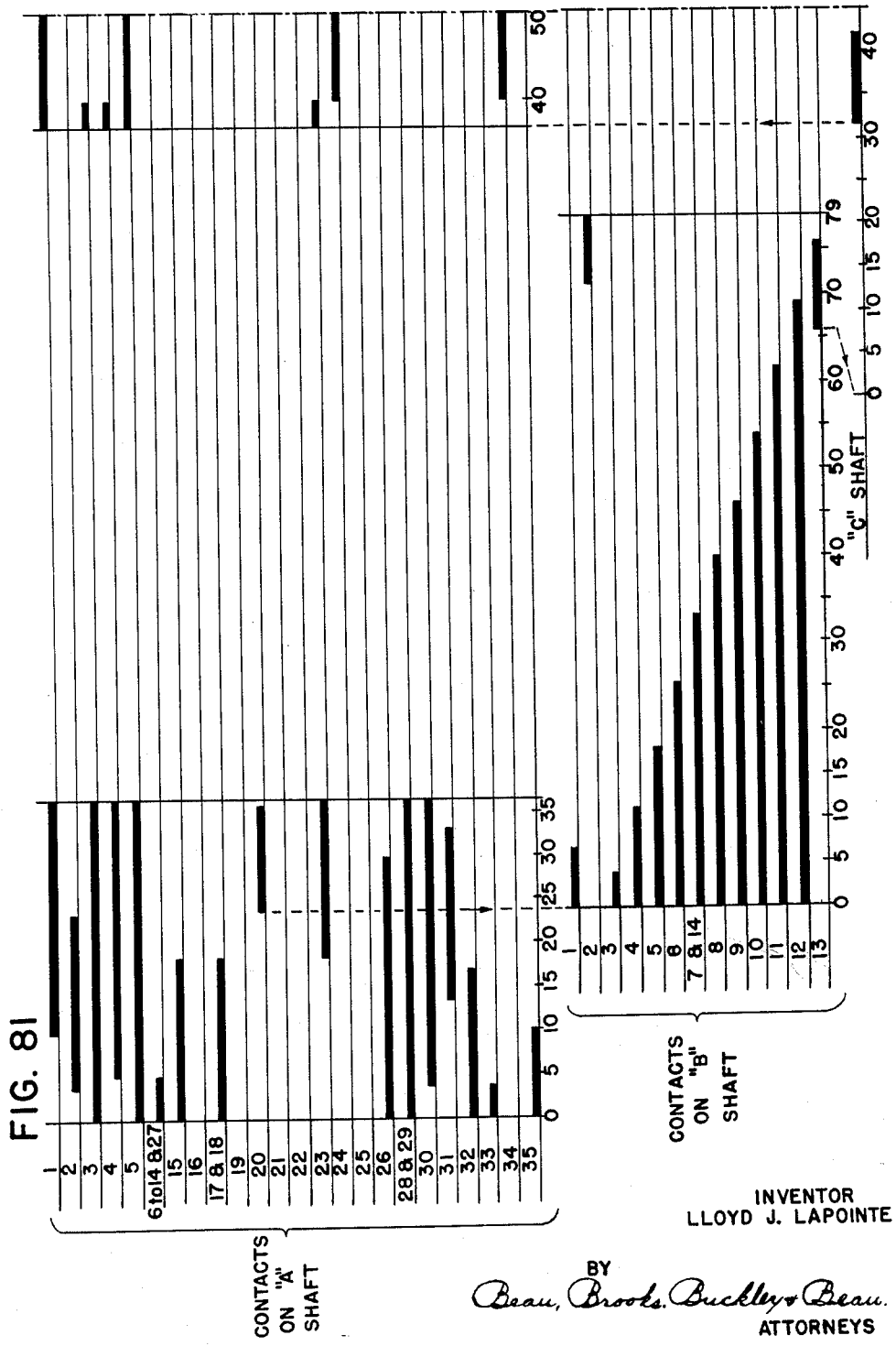
Figure 82:
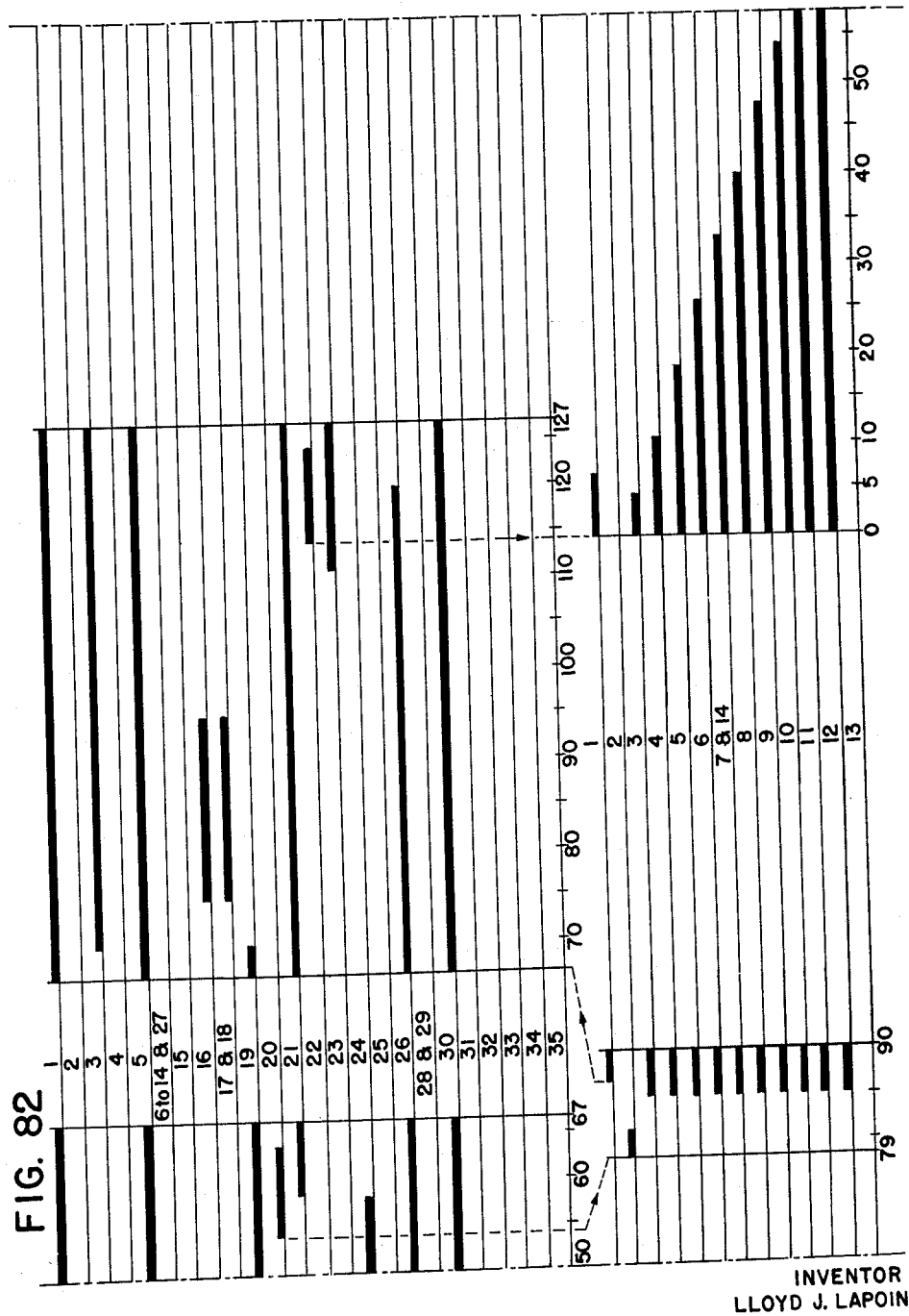
Figure 83:
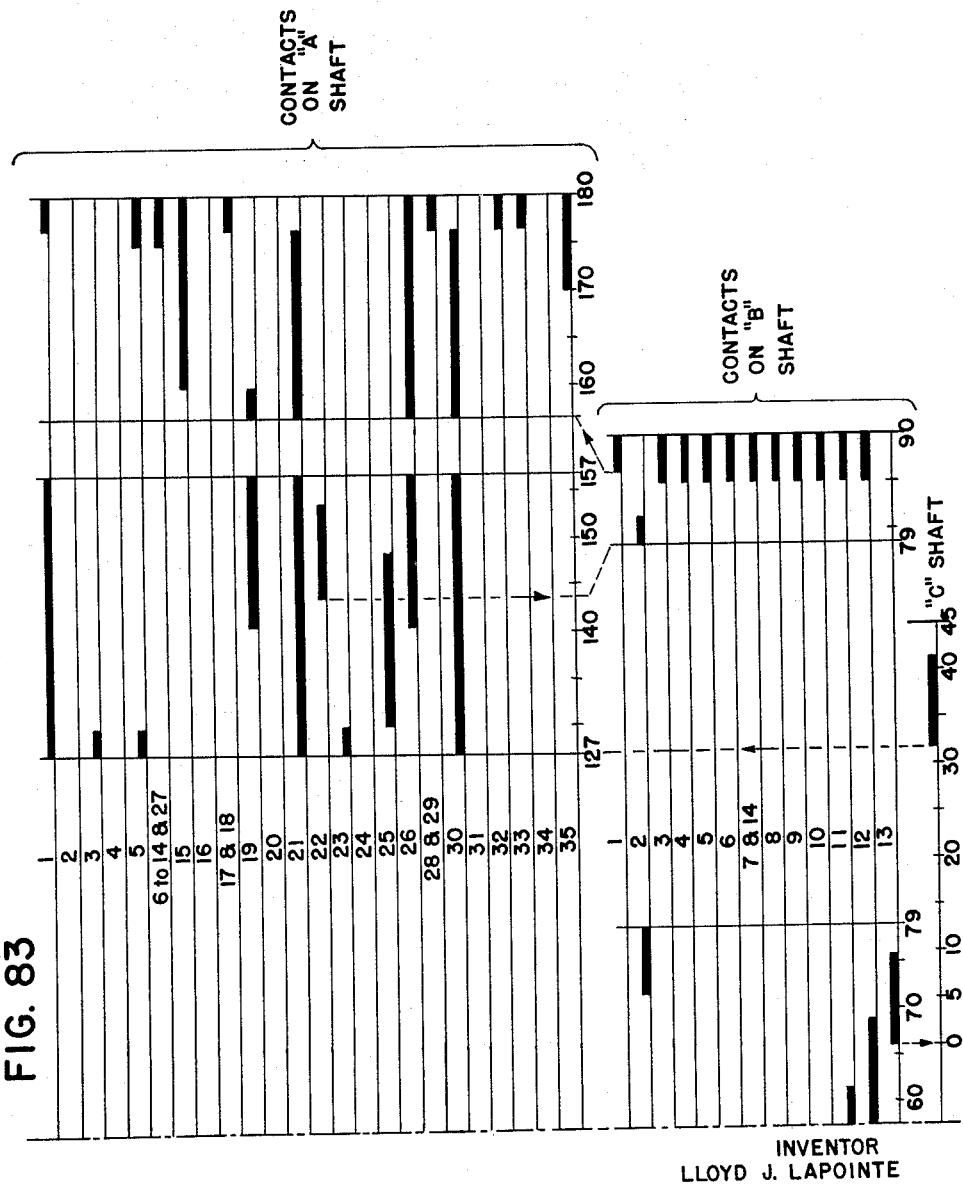

FIGS. 81 to 83, inclusive, are a timing diagram, showing the duration of contact of the commutator segments of shafts A, B, and C and indicating the periods when the shafts are stopped. FIGS. 84, 85, and 86 are sample calculations.

*General Organization*

The calculator will now be described in general terms, omitting for the present the detailed features of novelty and invention. Reference is made to FIGS. 1 to 15 which show all the major components of the calculating machine. These major components are plugged in to a base structure which is shown in detail in FIGS. 12, 13, 14, and 15. The base includes a supporting casting 100 on which is mounted an electric motor 101, a rectifier unit 102, a transformer 103, a multiple plug-in socket 104 for the rotating commutators, and a plug-in socket for the keyboard unit 105. The base member also contains a number of relay units 106 and 107 which will be described in detail later. In FIG. 12 an escapement assembly 108 is shown mounted on the base casting together with contact fingers 110 which control the position of a storage block and its movement in both directions across the width of the machine. Other plug-in units and contact fingers supported on the base structure will be described in detail hereinafter.

Figure 1:
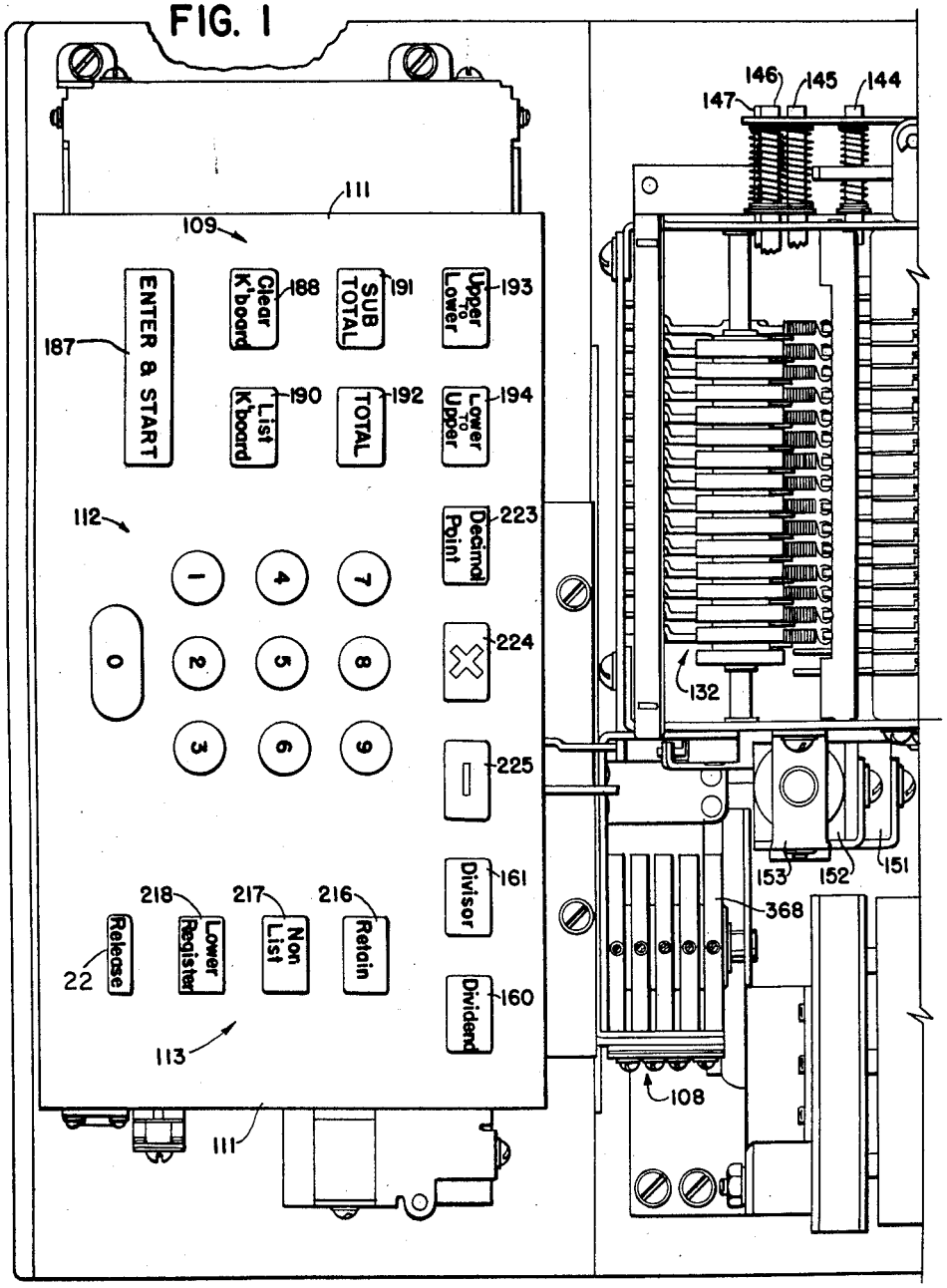
Figure 2:
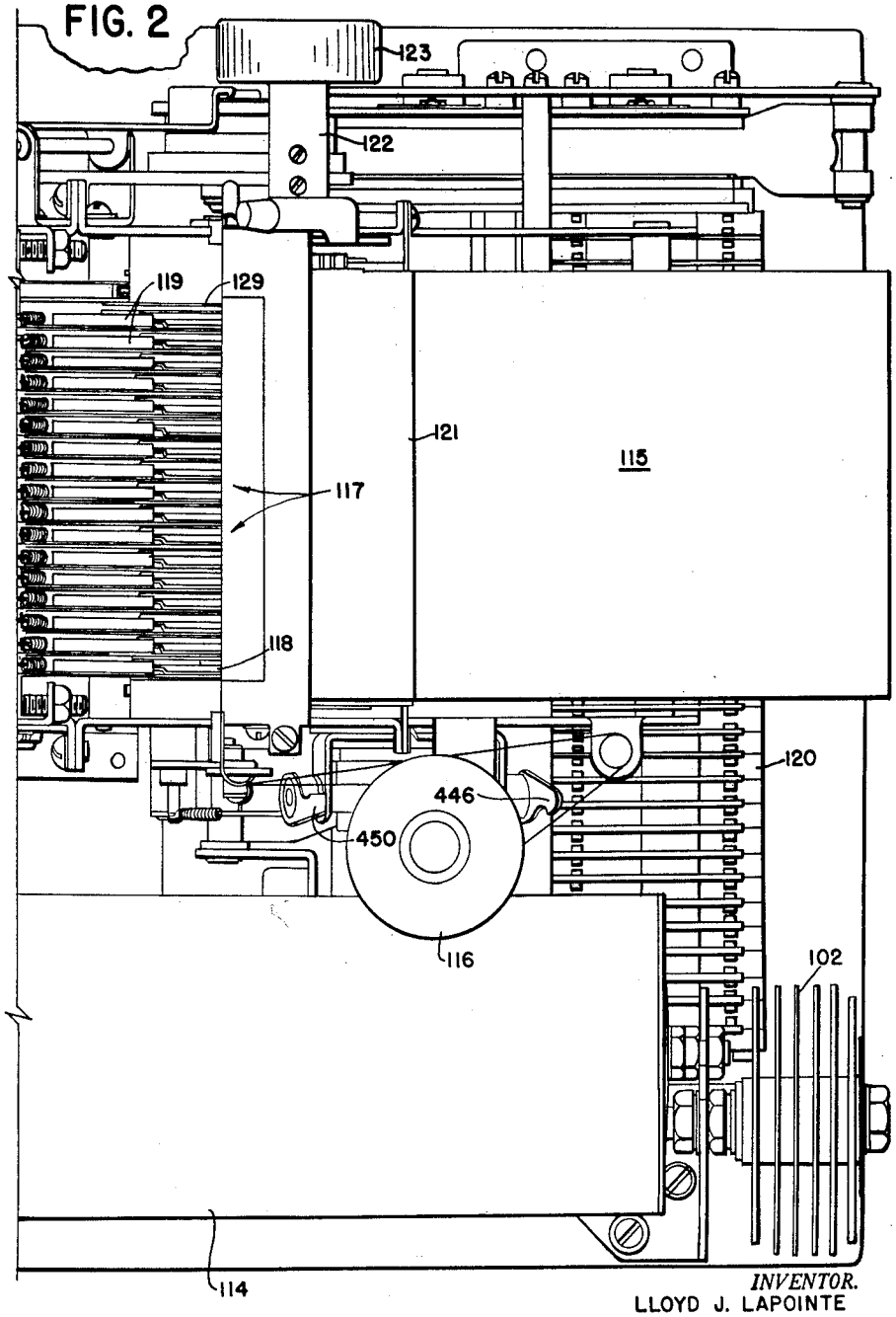

FIGS. 1 and 2 when taken together show the main components as viewed from above with the cover removed. A keyboard panel 111 contains ten digit keys 112 and a plurality of operation keys 113. Directly behind the keyboard is the escapement mechanism 108 and some of the controls which cause it to operate. A relay 114 is mounted on the right hand side of the machine and is used exclusively for obtaining the partial products of all combinations of two digits from 1 to 9. Details of the multiplier relay are shown in FIGS. 51 to 68, inclusive, and will be described later. A paper roll 115 is positioned at the rear of the machine and is used for paper storage for a printing mechanism in the usual well-known manner. A ribbon container 116 is mounted adjacent to the paper roll for use by the printing mechanism. The calculator contains 15 denominational orders and a printing mechanism 117 includes 15 print arms for printing the digits which have been run into each of the 15 orders in the accumulator. A sixteenth print arm 119 is used to print quotient digit values. A seventeenth print arm 118 contains the usual additional characters, such as —, T, ST, and x. An eighteenth print arm 129 contains a decimal point for designating a decimal point when a quotient is being printed. At the back of the machine below the paper roll 115 an "A" commutator shaft 120 is located (FIG. 4), with "B" and "C" shafts beside it toward the front of the machine but not visible in FIG. 2. A paper platen 121 is employed in the usual manner to roll the paper from the storage roll 115 and position it in front of the print arms 117, 118, 119, and 129. The platen is connected to a shaft 122 and a hand knob 123.

Figure 3:
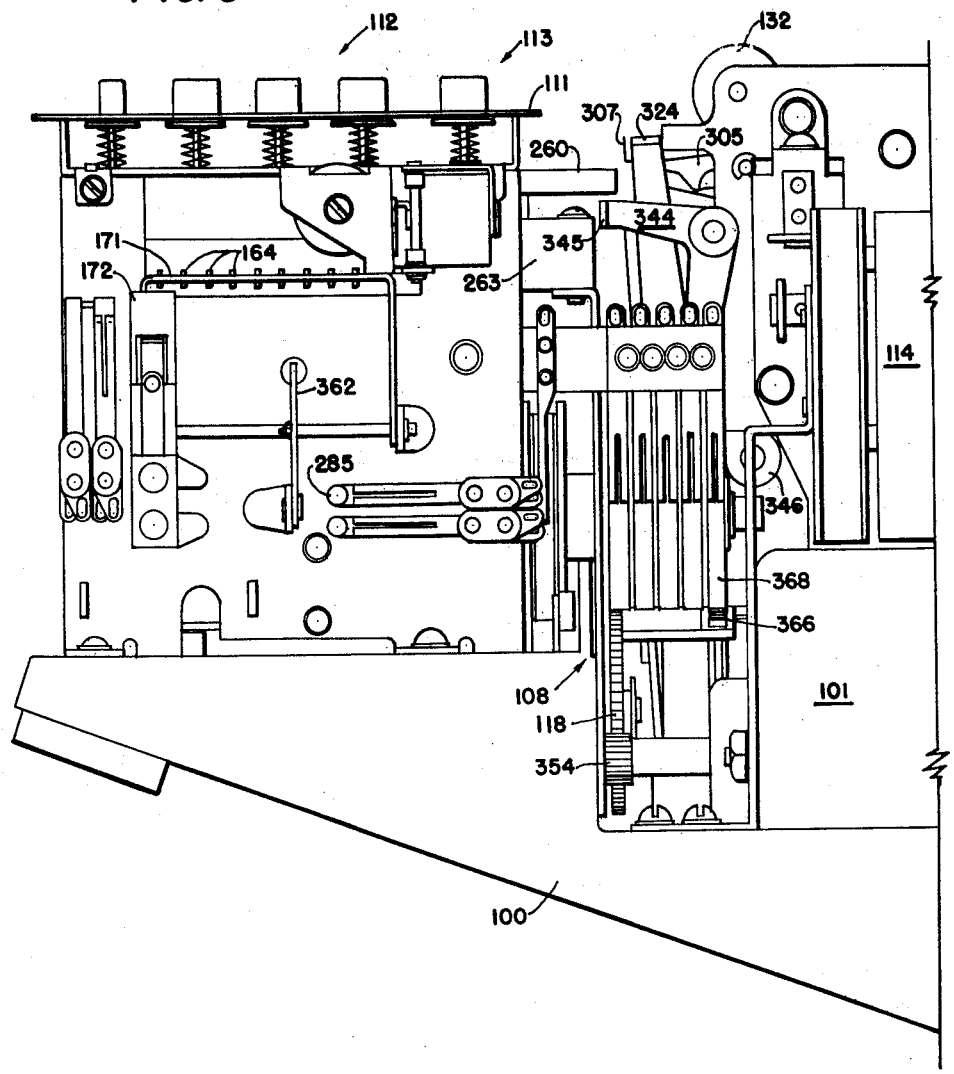
Figure 4:
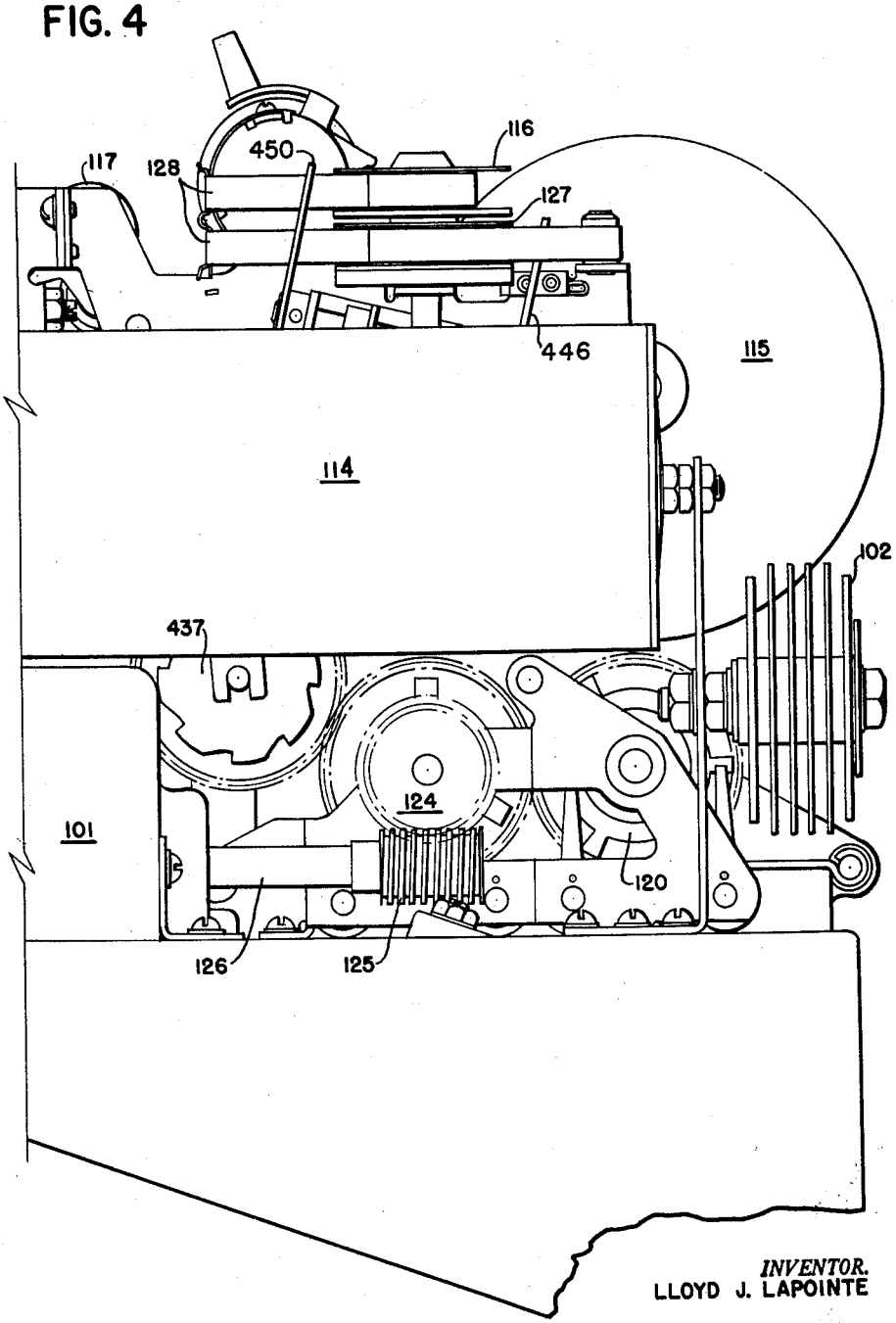

FIGS. 3 and 4 when taken together form a side view of the calculator taken from the right side and show the multiplier relay assembly 114 in block, the rectifier unit 102, the paper roll 115, and the "A" commutator 120. This view also shows the "C" commutator shaft 124 and indicates a worm screw 125 attached to a shaft 126 run by the electric motor 101. FIG. 4 shows the upper ribbon containers 116 and a lower ribbon container 127 together with the ribbon 128.

Figure 5:
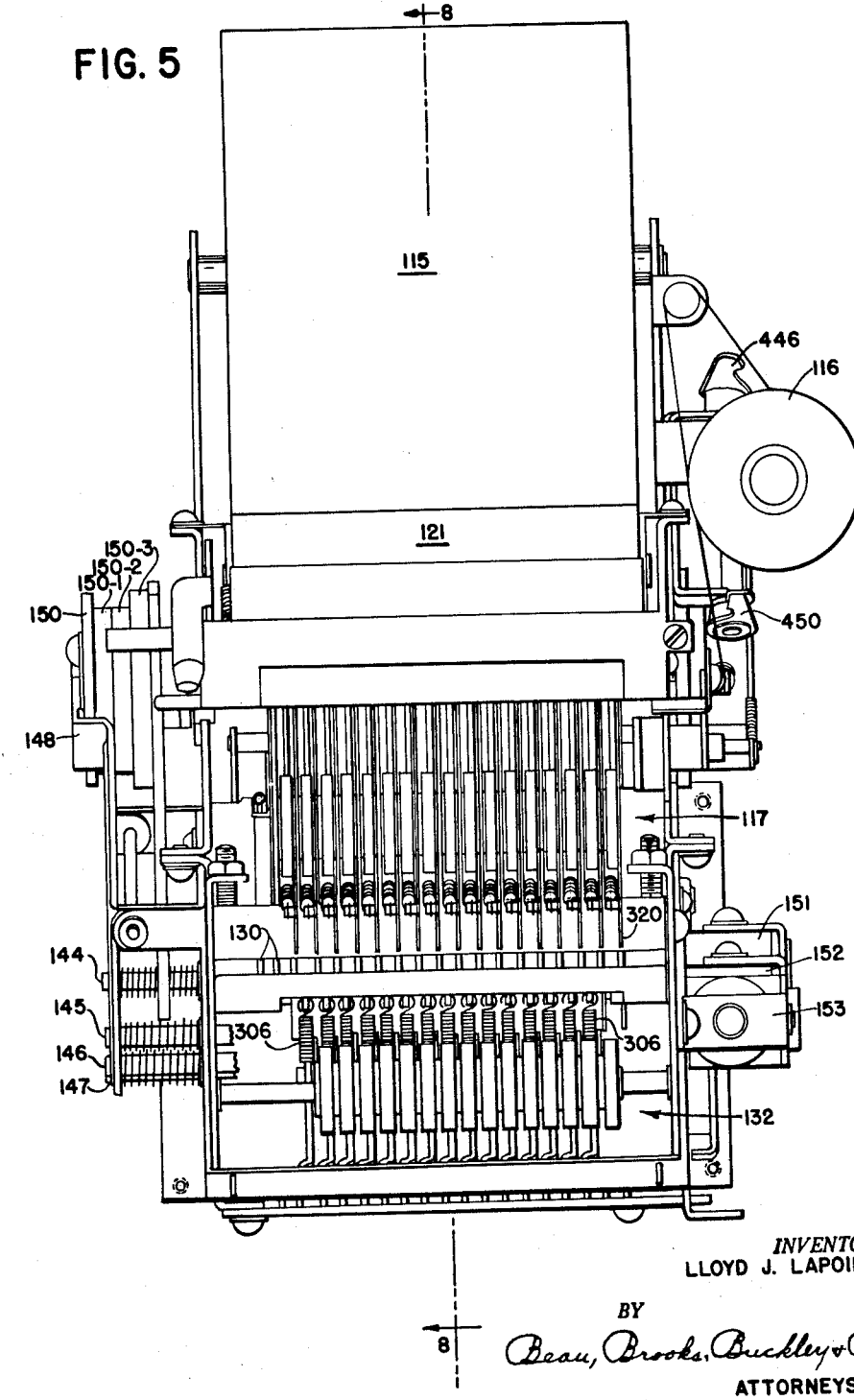
FIG. 5 is a plan view of the accumulator and printing mechanisms removed from the base member.
Figure 6:
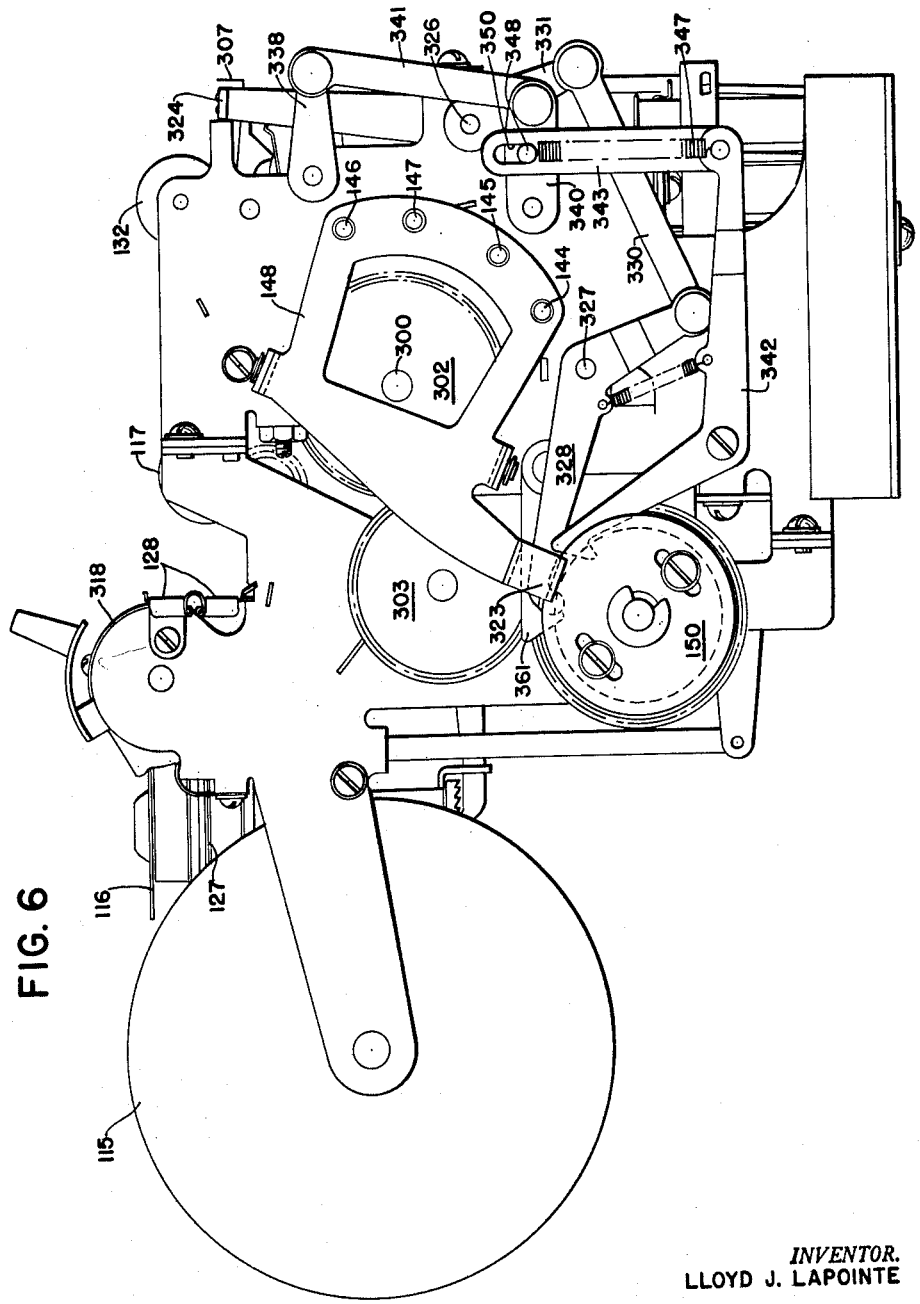
FIG. 6 is a side view, taken from the left, of the accumulator and printing mechanism.
Figure 7:
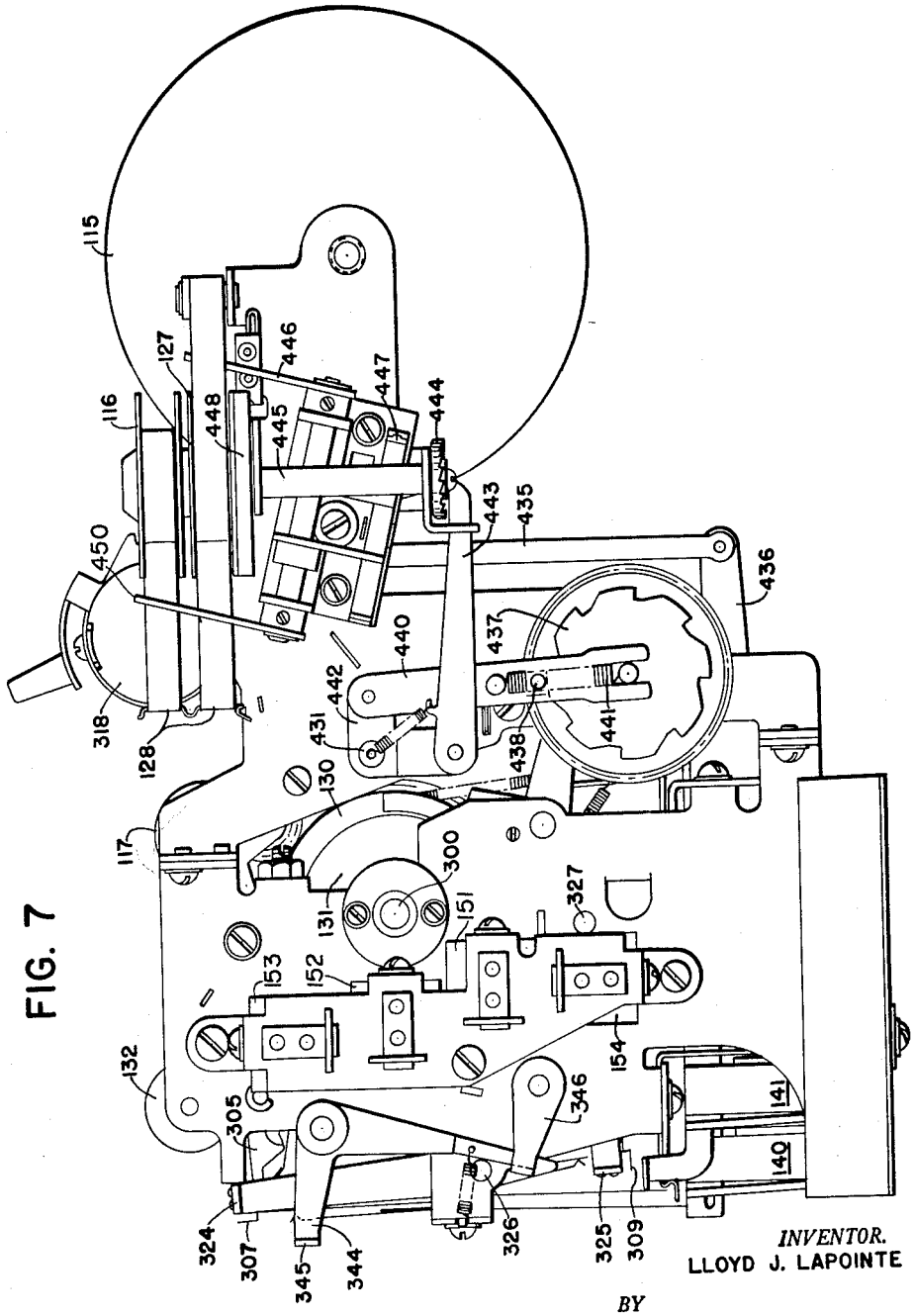
FIG. 7 is a view similar to FIG. 6 but taken from the right side.
Figure 8:
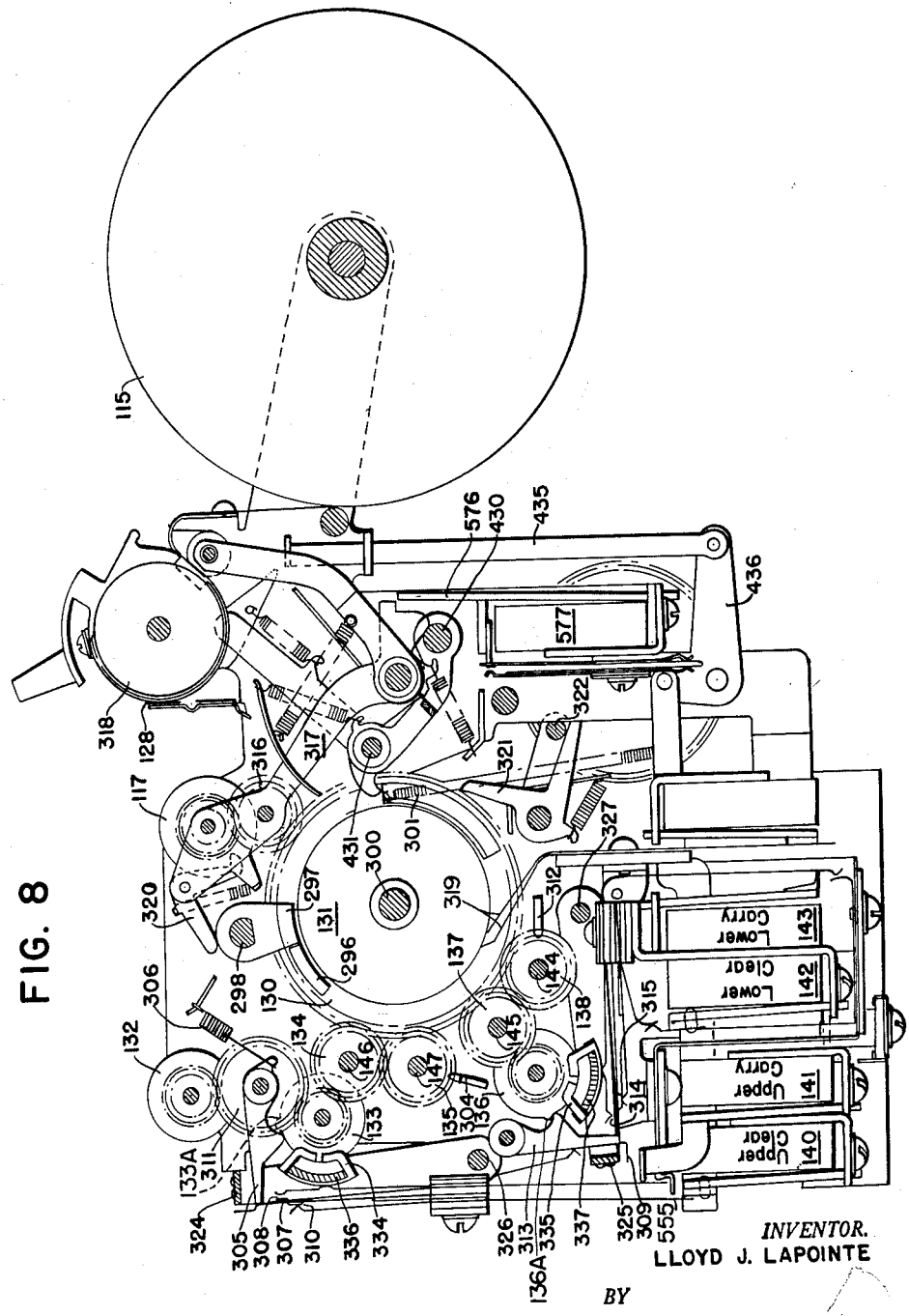
FIG. 8 is a sectional view of the accumulator and printing mechanism, taken along line 8—8 of FIG. 5.

FIG. 5 shows part of the rear end of the calculator and is similar to FIG. 2 but certain parts have been omitted from this figure for the sake of clarity. Print arms 117 are positioned directly above an assembly of eighteen drive gears 130 which are controlled by eighteen associated electromagnetic clutches 131 (see FIG. 8) and control the entering of digits into the machine's accumulator mechanisms. In order to show the operator what number is in the upper accumulator, a series of fifteen visual wheels 132 are mounted at the top of the machine just back of the keyboard. The machine shown in the drawings contains two accumulator units with means for entering a number from the keyboard into either accumulator, additively or subtractively, and also contains means for shifting a number in either accumulator to the other accumulator, either additively or subtractively. However, it should be obvious that any number of accumulators can be used in this type of machine in accordance with the ideas here disclosed. The upper accumulator 133 is shown in FIG. 8 with an idler gear 134 for adding in amounts directly from the drive gears 130. An additional set of gears 135 is employed to transfer numbers from the drive gears 130 to the accumulator gears 133 in order to subtract. The lower accumulator 136 is similar to the upper accumulator and has a series of idler gears 137 and a series of gears for subtracting 138. Directly below the accumulator mechanism four relays are positioned. Relay 140 is operated when the upper accumulator is to be cleared. Relay 141 is operated to provide a carry in the upper accumulator. Relay 142 is similar to relay 140 but is for clearing the lower accumulator while relay 143 is operated to provide a carry in the lower accumulator. The circuits connecting the relay windings and their associated contacts will be described in detail later. The accumulator gears 133 are always in mesh with their associated idler gears, and gears 134 are normally in mesh with gears 135. However, neither gears 134 nor 135 are in mesh with the drive gears 130 unless they are shifted in an axial direction by an outside control means. This control means is shown generally in FIG. 5 where shafts 144, 145, 146, and 147 are shown at the left side of the machine urged by springs which normally maintain the gears in an unmeshed condition. In FIG. 5 the operating means which controls the shaft movements is not shown but FIG. 6, which is a side view taken from the left of the rear portion of the calculator shows the operating lever 148 and the cam wheel 150 which operates it. Retaining means for holding any one of the shafts 144 to 147 in engaging position is mounted on the right hand side of the calculator (FIGS. 5, 7, and 9). This means comprises four magnets 151, 152, 153, and 154, the latter not being visible in FIG. 5. The armatures of these magnets contain slotted portions which engage the ends of shafts 144 to 147 and hold any one of them in an operated condition.

Digit amounts are entered into the keyboard 112 by the operator and each key operates a small electrical switch in a storage block 155 directly under the keyboard (see FIG. 10). There are fifteen denominational orders and ten digits, 0 to 9, inclusive, therefore there are a hundred and fifty electrical switches in the storage block. Sliding contacts are maintained with all the switch terminals, all the digits of equal value being connected by contact rods 156 (FIG. 22) and all the switches in each of the fifteen denominational orders are connected by a series of sliding contacts 157 (FIG. 10).

The operation keys in the keyboard contain the usual control keys such as start, total, subtotal, clear, and list. In addition, control keys are provided which will transfer a number from the upper accumulator to the lower and from the lower to the upper. A subtract key causes subtraction instead of addition while the non-list key disables the printer mechanism. If it is desired to enter numbers from the keyboard directly to the lower register, a control key may be operated for this operation.

One of the novel features of the calculator resides in the decimal point control system. When a number having a decimal point is to be entered, the digits to the left of the decimal point are entered into the storage block by the operator, then the decimal point key is depressed and then the numbers to the right of the decimal point are entered. If this procedure is followed in all cases of addition or subtraction the numbers will be aligned about a central decimal position which may conveniently be designated by a red line vertically printed on the paper roll 115.

When it is desired to perform multiplication of two numbers with the decimal point control, the multiplicand with its decimal point is first entered into the storage block and the multiplier key 224 (×) is depressed. Then the multiplier is entered into the storage block with the decimal point and the start key 187 is depressed.

The multiplier and multiplicand are both retained in the storage block during the multiplication operation. After the start key is depressed, the machine will automatically multiply the two numbers and at the end of the operation the product will appear in the visual digit wheels properly aligned about a decimal position. If the multiplication operation is done in the lower accumulator the result is not visible to the operator. The product is retained in the accumulator and is available for other operations and the multiplicand and multiplier are retained in the storage block until it is automatically returned to its normal position and cleared. If it is desired to print the result and clear the accumulator the total key 192 is depressed.

In order to divide one number by another the dividend key 160 is first depressed. Then the number is entered into the storage block with the decimal point, and the start key 158 is depressed. This action moves the storage block so that the highest order digit is in the 9th denominational order (controlled by a counting wheel) and the number is then entered into the upper accumulator. The storage block is next returned to its normal position and cleared. Next, the divisor key 161 is depressed and the divisor is entered into the machine with the proper decimal point designation. Then the start key 158 is depressed and the lowest order digit of the divisor is aligned under the previously entered highest order of the dividend. From this position the machine will divide the dividend by the divisor using the process of repeated subtraction. The quotient is printed vertically on the paper with a decimal point printed in its proper place. The remainder is printed in horizontal alignment in the usual manner.

*Keyboard Digit Keys*

The keyboard, as shown in FIGS. 1, 10, 11, 16, 37, and 38 comprises digit keys from 0 to 9, inclusive. The keys are connected to key shanks 162 which are offset beneath the panel 168 and enter a ball lock 163 (FIG. 10) comprising ten balls set in a race and arranged to permit only one key to be depressed at any one instant. Directly beneath the ball lock is a series of ten key rods 164, each of which is latched in a slot in an upper supporting plate 165. Each of the rods 164 contains an ear 166 which extends through plate 165 and is secured to one end of a spring 167, the other end of the spring being secured to a portion of sub-panel 168. This panel supports the lower end of a plurality of key springs 170 which resiliently hold the keys in their unactuated position. All the key rods 164 have their end portions terminating in contact with a pivoted bail 171 which in turn is in contact with a switch 172 shown in FIG. 11 as an enclosed microswitch.

Directly below the key rods 164, a storage block 155 is slidably positioned so that it can be moved from one side of the machine to the other. The storage block contains a plurality of 150 switches arranged in 15 columns of ten each. These switches are shown in detail in FIG. 10 and each switch includes an upper contact number 174 and a lower contact spring 175. The lower contact springs are connected by a series of ten rods 156 in such manner that like digits in each denominational order are all connected to the same rod. It will be noted from FIGS. 10 and 16 that the upper contact members 174 are progressively positioned under an extension 173 so that the actuation of one of the key rods 164 by a key shank 162 will result in the depression of the contact member and the closing of the switch in the storage block assembly. Each of the upper contact members 174 is provided with a small lug which, after depression, is latched under a spring latch plate 176 which retains the contact member in actuated position until released by a bail 177. The operation of the key system is as follows: When any one of the keys 112 is depressed the lower extremity of the key shank 162 comes in contact with a portion of its associated key rod 164 moving it downwardly so that extension 173 depresses one of the contact members 174 pushing it down below the latch plate 176 to make permanent contact with the lower contact spring 175. When the key rod 164 is lowered, portion 176 is pushed down below plate 165 and spring 167 pulls the rod to the right hand side of the machine moving bail 171 and closing microswitch 172. This switch closes a circuit which is in series with a magnet winding 180 below the storage block and which controls a portion of the escapement mechanism.

The escapement mechanism, which will be described in detail under another heading, moves the storage block one denominational order space to the left and presents a new row of upper contact members 174 to the digit key rods. When the storage block is moved to the left by the escapement mechanism one of the key rods 164 is still in its lowered position. Because of the storage block motion the next contact member 174 engages extension 173 moving it to the left so that the offset portion 178 clears plate 165 and the spring 167 pulls the rod 164 back to its original position, thereby normalizing the keyboard mechanism and making it ready for the next key depression. One of the switches in the storage block is now in its contact position. This contact is communicated to other circuits in the calculator by the series of rods 156 and by a plurality of commutator bars 269 positioned directly under the storage block and shown in detail in FIG. 10. The above described operation is sufficient to produce effective operation of the digit key mechanism and the storage block switches. However, in order to insure that the key action produces its intended results, a power depressing mechanism has been built into the machine and includes an armature 182 (FIG. 16), a vertical rod 183 secured to the end of the armature, and a pivoted lever 184. Lever 184 is secured to a bail 185 which extends across the entire width of the storage block and lies adjacent to a hook portion on all the key rods 164. When the rods 164 are lowered by the key shanks and then moved to the right by springs 167 the hook portion 186 is moved under bail 185 and when armature 182 is moved downwardly by the closing of switch 171, lever 183 is pulled down and the bail 185 is also lowered, engaging the hook portion 186 and forcing rod 164 to its lowered position. Because of this power actuation it will be evident that only a slight touch of any one of the digit keys is necessary to produce a complete and positive actuation of the key mechanism and to positively actuate the desired switch in the storage block assembly. When the storage block is moved by the escapement mechanism to the left, the hook portion 186 is disengaged from the bail 185 and allowed to resume its normal position even if bail 185 had not been normalized.

From the above it will be evident that successive actuation of the digit keys will enter the required information into the storage block and hold it there, available to other calculator circuits until it is wiped out by the return of the storage block to its initial position. The return motion of the storage block is furnished by the escapement mechanism which will be described in detail later. When the storage block has been fully returned, the upper edge of bail 177 is disengaged from a pin 179 and a spring 169 operates the bail and pushes all the latch plates 176 toward the back of the machine, thereby releasing all the upper contact switch members 174 causing them to return to their initial position as shown in FIG. 10.

The zero key 112 (FIGS. 36, 37, and 37A) includes an additional mechanism which is designed to prevent the machine from accepting a divisor number whose first character is a zero at a time when the decimal point key is not operated. Without this safety device the machine might be set up to give an excessive number of subtractions to obtain a quotient.

At the bottom of the machine a small latch 250 has one arm under the shank of a zero storage block rod 251. This same arm contains a notched portion 252 which normally retains the latch in its unactuated position when it is not moved by the zero rod. An insulator 253 secured to the latch 250 is adjacent to a switch 254. If a zero key is depressed (not proceeded by a decimal point) when the storage block is in the first order, latch 250 is lowered and spring 255 pulls the latch to the left closing the switch and completing a circuit associated with the division and completing operation. When the start key 187 is depressed, the storage block will return to its zero position at once, indicating an error in manipulation. The return of the storage block always returns latch 250 to its original position. If the decimal point key is depressed before a zero key is depressed, the above mentioned safety circuit is inoperative and the division operation continues after the depression of the start key.

Keyboard, Control Keys

The keyboard contains 16 operation keys which control the operation of the calculator and direct the automatic features of the mechanism. There are seven "start" keys which initiate various sequences. These comprise an Enter and Start key 187 (FIGS. 1, 16, and 35A), a Clear Keyboard key 188, a List Keyboard key 190, a Sub-Total key 191, a Total key 192, an Upper to Lower key 193, and a Lower to Upper key 194. These keys have no bail lock and no form of interlock between key shanks but there is a retaining mechanism which operates after a depressed key is released and prevents the keys from being operated until after the operation has been completed.

The Enter and Start key 187 has two shanks because of its length and when depressed, operates a bail 195 which extends for the entire width of the keyboard and is operated by all of the Start keys. Bail 195 is secured to two bell cranks 196 mounted on a rod 197 and secured to a second bail 198 which engages projections 200 on start bars 201 and 202. The Enter and Start key also depresses three switch levers 203, 204, and 205 which depress three switch shanks and cause the start of several circuit operations which will be described later when the entire circuit of the machine is described. Switch levers 203 and 204 are latched down when operated. Lever 205 returns with the Start key 187.

The Clear Keyboard key 188 depresses a switch lever 206 which is latched down and closes one of the switches in bank 207 and operates a relay which causes the storage block to be returned to its initial or zero position at which time bail 177 is released and operates latch plates 176 to release all the switch units 174. This key has no action on the accumulators nor any of the accumulator controls except during the clear operation the accumulator power line is cut off.

The List Keyboard key 190 causes the number in the storage block to be printed but prevents storage block from returning and prevents the accumulator drive gears from meshing with the accumulator gears. The operation of this key depresses a switch lever 208 which is latched down and closes a switch in switch bank 207 thereby actuating the drive gears to transfer the number from the keyboard directly to the printer mechanism.

The Sub-Total key 191 prints the number in the upper accumulator but does not clear that accumulator. A sub-total may be printed from the lower accumulator by depressing both the Lower Register key and the Sub-Total key. This action will be better understood when the lower register key is described. Depressing the sub-total key 191 operates the bail 195 and depresses switch levers 210 and 210A which latch down and operate switches in bank 207 and in turn operate several relays. This key also contains a cross bar 209 which operates common bar 212. Other details regarding the sub-total operation will be described later.

Figure 32:
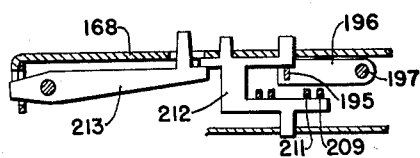
Figure 33:
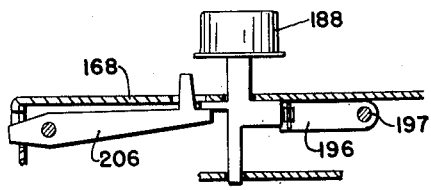
Figure 34:
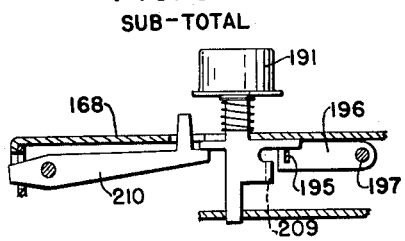
Figure 35A:
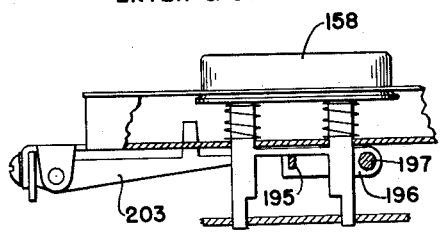
Figure 35:
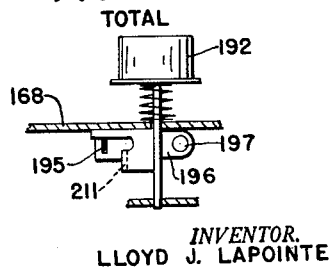

The Total key 192 is similar to the sub-total key and performs the same operation except that the accumulator is zeroized during the total operation. The Total key operates bail 195 and by means of an extension 211 (FIG. 20) operates a common total bar 212 (FIG. 32). The common total bar is operated by three other extensions similar to 211. These three extensions are secured to the sub-total key 191, the Upper to Lower key 193, and the Lower to Upper key 194. The common total bar operates key lever 213 which latches down and depresses a switch bar located in bank 207 which controls several relays which perform the total operation. The Upper to Lower key 193 transfers a number from the upper accumulator to the lower accumulator and performs this operation by connecting the upper accumulator gears and the lower accumulator gears to the drive gears 131 with a sensing circuit in operation so as to clear the upper accumulator by running its gears in a reverse order to their zero position. When the upper accumulator is cleared, its digit value is transferred to the lower accumulator and to the printer mechanism. Key 193 operates bail 195 and also a switch lever 214 which is latched down.

The Lower to Upper key 194 is similar to key 193 except that it transfers a number in the lower accumulator to the upper accumulator. This operation is the same as the one described above except the action is reversed. Key 194 operates bail 195 and also depresses a switch lever 215 which is latched down.

On the right side of the keyboard are four keys which are not connected with the total operation. Three of these keys, Retain 216, Non-List 217, and Lower Register 218 operate electrical contacts and are illustrated in FIGS. 17, 18, and 19. The fourth key Release 220 simply operates a latch plate 221 which releases any one of the other three keys which may have been latched down. As will be obvious from FIG. 20 the Retain key 216 contains an extension 222 which operates two banks of switch contacts. One of these banks is shown in FIG. 17 and contains two normally closed contacts. The second bank is shown in FIG. 18 and includes one normally closed contact and one normally open. The Non-List key 217 and the Lower Register key are exactly the same and are both illustrated in FIG. 19, each containing one normally open contact. The operation of these keys and their associated circuits will be described in detail later.

There are five other keys on the keyboard, not total keys, but controlling calculator operation as related to subtraction, multiplication, and division. These keys are Decimal Point 223, the times key (×) 224, the subtraction key (−) 225, the Divisor Key 161, and the Dividend key 160. These five keys contain a control system associated with their key shank which includes nine latch bars located directly beneath the keys and shown in FIGS. 23 to 28, inclusive. All the keys except the dividend key will be latched in their depressed position by the uppermost latch plate 228. The latch plate is connected by a spring 230 to the keyboard structure and engages the key shanks in their uppermost cut-out portions. The dividend key is also latched down by a smaller latch plate 231 which includes a similar spring 232. Directly below latch plate 228 are four additional latch plates 233, 234, 235, and 236. Latch plate 236 has an extension 237 which is engaged by a member 238 controlled by the Enter and Start key 158 by means of start bar 201. Latch plate 236 also has a turned up extension 240 which engages parts of bars 228, 233, and 235 so that the operation of any start key which causes start bar 201 to operate causes latch plates 228, 233, 234, 235, and 236 to be moved to the right. This action unlatches the top latch plate and allows a depressed key to move up for a very short distance to be retained by latch 236. This latch also locks other undepressed keys (except the Dividend key) in their normal condition.

When the operation is finished and start bar 201 is normalized, latch plate 236 is released by extension 238 and is returned by spring 241, freeing all the keys.

An additional shank 242 is positioned under the Decimal Point key 223 and is depressed along with that key. It is locked down by plate 234 which holds the shank in actuated position while permitting key 223 to be returned to normal at the end of a cycle. During multiplication, addition, or subtraction, the key 223 and shank 242 move together and are both latched down for the entire operation. During a division operation the decimal key 223 and shank 242 are depressed together and are latched down until the dividend is entered into the accumulator. After the dividend is entered the decimal key is released because the lug 238 moves latch plate 236 to the right. The shank 242 is held down by plate 234, which is under spring tension from plate 233. Plate 233 is now held by hook 248. During the operation which enters the divisor into the storage block, the Divisor key 161 first unlatches the Dividend key 160 and then the Decimal Point key 223 is latched down and held by plate 228. When the start key is depressed, plates 236, 233, and 228 are moved to the right by member 240 (and 238). At this time the decimal key is held down by plate 236. At the end of the division operation member 238 is returned to its normal position and all the depressed keys are released.

The times (×) key 224 cannot be depressed unless the storage block has been moved at least one order space. This provision results because a turned down extension 243 on latch plate 244 engages a part of the storage block 245 and this latch plate and also plate 246 can move to the left only when the storage block moves. Depressing the × key 224 releases the Decimal Point key 223 by the operation of latch 228.

The minus key 225 (−) is locked in its normal position when the Dividend key 160 is depressed through the action of latch plate 247 which is cammed by the dividend shank into a retaining notch in the (−) shank. This latch plate 247 also prevents the Dividend key 160 from being depressed when the minus key has been depressed.

The dividend key 160 is latched down by plate 231 and when depressed, a hook 248 is resiliently pressed against latch plate 233. This latch plate is moved to the right by the start key control and as soon as it is moved into position the hook enters a hole in the plate and keeps it in operating condition until the Dividend key is released. The dividend key can only be depressed when the storage block is in its zero position since a single space movement will cause plate 244 to move under part of the key shank. When the key is depressed before a number is entered plates 244 and 246 are held in their normal position so that the (×) times key cannot be depressed.

The Divisor key 161 may be depressed when the Dividend key is down but not if any other key is in operative position. It is latched by latch plate 231 which it cams to the right on being depressed thereby unlatching Dividend key 160. The divisor key holds plate 233 to the right until the end of the division problem.

Each of the above described five keys contain extensions on their key shanks 256, 257, 258, 260, and 261 (FIG. 20) which engage switch plungers 262 (FIGS. 12, 14, 40 and 45) and operate switches which close circuits and operate relays for starting the operations desired. The Decimal Point key extension 370 engages three switch plungers, 272, 612, and 371. Each of these plungers operates an electrical switch which is shown in the wiring diagram (FIGS. 72 to 79) designated by the same reference numbers. The additional shank 242 which is under the Decimal Point key has extension 256 which engages three switch plungers 273, 592, and 584. The times (×) key extension 257 engages two switch plungers 582 and 557. The minus key extension 258 engages three switch plungers 552, 551, and 550, the latter plunger being also operated by the Divisor key extension 260 which also engages plungers 585, 372, 594, and 373. The Dividend key extension 261 engages five switch plungers 271, 374, 274, 583, and 375. The electrical circuits containing these switches will be described later.

*Escapement*

The escapement mechanism is a power operated means for transferring the storage block 155 from one side of the machine to the other, either by increments (one denominational order) or by extended movement which may occur during any problem to locate the storage block so that the decimal point may be properly positioned. The escapement mechanism is entirely automatic and operates in either direction.

In order to move the storage block one digit space to the left as the digits are recorded in the storage switches, the bars 164 are employed together with magnet 180 and armature 182 (FIGS. 16, 36, and 37). A depression of any of the digit keys, 0 to 9, trips a key rod 164 by pushing it down so that a projection 178 is released and the rod is pulled to the right operating a bail 171 and closing switch 172. This sends current through the winding of magnet 180 pulling down its armature 182 and lowering rod 183 which in turn rotates lever 184 and lowers bail 185. Bail 185 is positioned under a hooked portion of the rods 164 and when the bail is lowered it engages hook 186 (which has moved to the right) and pulls it down to make contact with one of the upper switch lugs 174 and seat it fully. When bar 183 is lowered, it causes a switch arm to close a pair of contacts 264 which are in series with the power line and a storage block clutch coil-left 265 (see wiring diagram FIGS. 72 and 76). The clutch coil 265 is enclosed in clutch unit 266 (FIGS. 44 to 46) and engages a rotating gear 113 to move the storage block 155 by means of rack 116 and gear 115 (FIG. 40).

The movement of the storage block 155 forces rod 164 into its original position by means of the engagement of switch lugs 174 acting on projection 173. This opens switch 172 and releases armature 182 but the armature cannot go up to its original position until a projection 267 (FIG. 10) moves into a hole in a plate 268 mounted on the storage block. When the armature 182 reaches its normal position switch 264 is opened and the clutch 266 is released stopping the movement.

During a multiplication operation, when the decimal point key is used, the escapement mechanism may be called upon to send the storage block as many as 8 spaces to the left. When such an operation is started the start key 158 is depressed and a circuit is completed from the supply line 270 through dividend contacts 271, decimal contacts 272 and 273, dividend contacts 274, contacts 275 on D–1 cam 408 start contacts 276, contacts 277 on SB–1 cam 404 and the escapement coil 180, and ground. Actuation of the escapement coil 180 and armature 182 closes contacts 264 which completes a circuit through start contacts 278 and sends current through the storage clutch coil 265-Left, thereby moving the block to the left. This motion continues until the D–1 cam 408 is rotated to the position where contacts 275 are opened and the escapement coil 180 is cut off.

At the end of multiplication problems the storage block 155 is returned to its normal or zero position. This action occurs when start-released contacts 280 are closed by the start-released bar 281 moving to the right. This bar (shown in FIGS. 38, 16 and 20) closes contacts 280 after being released by both an escapement bail 282 and by the start bail 195. This contact 280 completes a circuit through start contacts (FIGS. 72 and 76), commutator 158, multiplier relay contact 279, column selector contacts 285, A–2 commutator contacts 286, conductor 287, and the storage block return relay 288. The actuation of this relay closes contacts 290, which complete a circuit through start released contacts 291, contacts 295, escapement coil 180 which closes escapement contacts 264, completing a circuit through contacts 537 to storage block clutch coil-right 292. This causes clutch 293 (FIGS. 44 and 46) to be actuated, turning gear 294 (FIG. 40) to turn gear 115 and move the storage block (FIG. 40) to turn gear 115 and move the storage block all the way to the right. When the storage block is one-half a space away from the normal position, a small insulator lug opens contacts 295 (FIG. 11) and opens the circuit to the escapement coil 180, permitting its armature 182 to rise and engage the storage block in its normal position.

Other escapement operations will be discussed when the operation of the multiplying and dividing structures are described.

*Accumulators*

There are two accumulators, an upper and a lower, both positioned adjacent to a driving gear arrangement and both arranged to be coupled to the driving gears either for addition or substraction. FIG. 8 shows the accumulator gear trains while FIGS. 5, 6, 7, and 9 show some of the associated mechanisms.

The drive gears 130 include a limit piece 296 which engages a stop 297 secured to a rod 298 which is secured to the frame. The drive gears are mounted on a shaft 300 on which they turn freely. The shaft 300 is being rotated at a constant speed while the "B" shaft is turning. The drive wheels are normally held in their non-actuated position by a series of long springs 301 which are stretched between a point on the gear periphery and the base. Shaft 300 is secured to a gear 302 on the outside of the frame at the left side of the machine. This gear is driven by the motor 101 which is connected to it by a gear train and includes a considerable reduction in speed. Also meshing with gear 302 is an idler gear 303 and a cam gear 150 assembly which contains four cam wheels to operate the accumulator mechanism.

There are eighteen drive gears 130 and each is mounted adjacent to an electromagnetic clutch 131 which is secured to the shaft 300. The clutches rotate with the B shaft and have one terminal of their magnetic windings connected to the shaft and the negative side of the low voltage D.C. supply line. The other terminal is connected to a slip ring on the clutch periphery and makes contact with a flexible brush 319. When current is applied to the winding, the clutch is magnetically fastened to the drive gears 130 and they both turn pulling one end of spring 301 around the shaft center.

At the front side of the drive gears, four shafts 144, 145, 146, and 147 are mounted. These shafts each hold 15 gears which may rotate on the shafts and are normally out of engagement with drive gears 130. When at rest shaft 147 holds gears 135 which are each engaged by a stop 304. Shaft 146 holds gears 134 which are normally in mesh with gears 135 and therefore held against rotary motion. Gear 134 is in mesh with another gear 133 which is the upper accumulator gear and which does all the adding and subtracting of digit values. Gears 133 and 134 are arranged to be always in mesh. A cam wheel is secured to the accumulator gear 133 and contains a single raised portion which assists in carrying, clearing, and sensing an over-subtraction. A cam follower 305 presses against the cam wheel held in engagement by a spring 306 and also engages a spring leaf 307 which is part of two switches 308 and 310. Gear 133 also meshes with an idler gear 311 which in turn meshes with a gear on a numeral wheel 132 for indicating the digital value in the upper accumulator.

The lower accumulator has no indicating means but does have a gear 138 and stop 312 corresponding to gear 135 and stop 304. Gears 137 and 136 correspond to gears 134 and 133 and cam follower 313 is the same as cam follower 305. Switches 314 and 315 are similar to switches 308 and 310.

Shafts 144, 145, 146, and 147 are controlled and set by an operating lever 148 (FIG. 6) and a series of four shuttle magnets 151, 152, 153, and 154 (FIG. 5). Lever 148 is formed with an extension 323 which bears on a cam wheel 150. The cam wheel 150 includes a raised portion which lifts extension 323 twice each cycle and compresses springs on the shafts which tend to move all the shafts 144, 145, 146, and 147 a short distance to the right of the machine. If the machine is arranged for addition in the upper accumulator, shaft 146 is allowed to be moved to its operated position by the actuation of the armature of shuttle magnet 153 which then locks the shaft in this position when the current is removed from the coil. When lever 148 returns to normal the springs on the other three shafts are returned to their normal position and the machine is set to add in the upper accumulator. Shuttle magnet coils and their respective electrical connections are shown in the wiring diagram in FIG. 75.

Both accumulators are operated by similar controls and perform the same functions. When it is desired to add an amount into the upper accumulator shaft 146 is moved along its length to move gear 134 out of mesh with gear 135 and into mesh with drive gear 130. The teeth on accumulator gear 133 are broad enough to keep gear 134 in mesh in spite of this movement. Then current is turned on and the clutch winding and clutch drive gear 130 revolve for the degree of rotation necessary to turn the accumulator wheel the desired amount. As the drive gears turn, a ratchet stop 321 is moved into engagement with gear teeth on the lower side of gear 130. A bail 322 controls the action of all the ratchet stops and when the gears are to be returned to normal the bail is moved down and the gears are released and returned under the action of springs 301.

When the drive gears are moved to their position, another set of idler gears 316 is turned. Each of these gears turns a print wheel 117 which has type numerals on its periphery. When a number is to be printed, the type wheels together with arm 317 are moved quickly to make contact with the paper on platen 318, printing through ribbon 128. As the arm 317 leaves its normal position, a detent 320 slides away from the upper surface of stop 297 and the lower end of the detent enters teeth on gear 117 thereby holding it in the correct position during the printing excursion. Further details of the printing action will be disclosed under a separate heading.

Before the drive wheels 130 are released, gear 134 is returned to its normal position which is out of mesh with the drive gears but in mesh with both gears 133 and 135. When the drive gears have been returned to their zero position the addition cycle is complete and the machine is ready for another addition.

When it is desired to subtract a value from the accumulators, shaft 146 is retained in its normal position and shaft 147 is moved axially. This removes the gear teeth from stop 304, meshes with the teeth on drive gears 130 and returns meshing operation with gear 134. Now, when the drive gears are turned by clutches 131, the accumulator wheels are turned by means of both gears 134 and 135 and therefore turn in a reversed direction.

When the accumulator wheels 133, 136 are turned more than a complete revolution, a small cam portion 133A and 136A passes under the cam followers 305, 313 moving it so that the end of the follower moves above a bent portion of leaf springs 307, 309 and closing contacts 308, 314 and opening contacts 310, 315. These same contacts are shown in the wiring diagram, FIG. 73. The formation of the switch leaf 307 includes an offset end which extends above the cam follower and is later engaged by a restoring bail 324. A similar bail 325 restores the switch leaf 309 and permits cam follower 313 to return. These bails are secured, respectively, to shafts 326 and 327 which are controlled by an arm 328 (see FIG. 6) which bears on cam 150–2 and assures that the cam followers 305 and 313 are restored at the proper time in the operating cycle. One end of arm 328 is pivotally attached to a rod 330 and another arm 331 which rocks shaft 326. The circuit connections and the electrical operation of these components will be explained when a specific example is described.

On each accumulator wheel 133 and 136 a conductive insert 332 and 333 is positioned near the periphery. They are indicated in FIGS. 8A, B, C, and D, and 73. A series of contact arms 334 and 335 (FIGS. 8 and 73) make contact with the inserts when the accumulator wheels are rotated to a contact making position. The contact arms are secured to a non-conductive support 336 and 337 which is supported by short arms which are secured to the accumulator shafts. When addition is being performed, the supports are set so that contact is made between each of the arms and the conductive insert when the accumulator wheel is set at nine. When subtraction is being performed the supports 336, 337, are moved one-half digit space and make double contact when the accumulator wheels are set at zero. Control of the supports is effected by two arms 338 and 340 (FIG. 6) which are pivotally joined by an arm 341. The combination is rocked by lever 342, one end of which bears on a cam 150–1 fastened to gear 150. The other end of lever 342 is fastened to an arm 343 which is coupled to a pin 348 on short arm 340. The operation of lever 342 to change the contact positions of arms 334 and 335 is a cyclic operation and occurs once during each cycle.

The change of contact positions of arms 334 and 335 to subtract during a subtraction or division calculation is performed by two levers shown in FIG. 7. The upper accumulator shaft acts as a pivot for a bell crank 344 which is formed with a turned over piece 345. The lower end of crank 344 contains a hook portion which normally engages a turned over piece which is part of arm 346, secured to the lower accumulator shaft. When subtraction is to be performed, either by a subtraction operation or by a division operation, piece 345 is pressed downwardly by either extension 258 or 260 which are attached to key shanks under keys 225 (FIG. 20) and 161 (also FIGS. 3 and 23) unlocking arm 346. Both accumulator shafts (due to arm 341, FIG. 6) can now turn and place the contact arms 334 and 335 at the zero contact position. At the end of a simple subtraction problem the cam secured to wheel 150 pushes both arms 340 and 336 into their addition contact position.

When a division problem is being solved and the machine is required to perform a series of repeated subtractions, the divisor key is held down until the entire problem is completed. This retains bell crank 344 out of engagement with arm 346 and arm 346 is free to rotate to the subtraction position. At the end of each machine cycle when arm 343 is lowered, arms 340 and 336 can be moved by spring 347.

When the accumulators are cleared, it is the result of a Total operation and for this reason the clearing operation is entirely automatic. The circuits for this operation will be described fully when a specific example is considered. When the Total key is depressed, all the drive gears 130 are magnetically connected to their clutches 131 because clear contacts 315 and 310 (FIGS. 73 and 77) have been closed. Also, by means of the total relay contacts, shuttle magnet 152 is energized, allowing shaft 147 to be shifted by arm 148 and the set of minus gears 135, 134, and 133 (FIG. 8) are engaged. As the drive gears are turned, bail 322 is raised permitting the ratchet pawl 321 to engage the teeth as they pass by. Printer gears 316 and 117 are also engaged and turning. As soon as the raised portion on cam 133 makes contact with cam follower 305, switch 310 is opened and the clutches are released. There is no carry operation because the total key opened a switch 528 which disabled the carry circuit.

When all the drive gears have been stopped and the accumulator wheels returned to zero, the printer mechanism prints the total on the paper 115 and gears 135 are moved out of mesh with the drive gears. After this, the ratchets are withdrawn by bail 322 operated by cam arm 361 (FIG. 6) actuated by a cam 150–3 secured to wheel 150. Then springs 301 return the drive gears to their zero position, zeroizing the printer wheels at the same time.

*Commutators*

To control the operations of the machine during sequences which require a time delay or a sequential operation, a number of commutator contacts are employed. These are mounted on three shafts, designated the A, B, and C shafts. The A shaft contains rotating contacts which generally act to control circuits for adding, subtracting, multiplication, and division. There are thirty-five commutators on the A shaft and the shaft rotates one-half of a revolution for each cycle. FIGS. 47 to 50, inclusive, show the details of the A, B, and C shafts, while FIGS. 81, 82, and 83 show the duration of the contacts made by each commutator on these three shafts. The B shaft contains fourteen commutators, ten of which are for supplying the accumulator drive wheels with pulses which govern the digit value which is rolled into the accumulator wheels. The B shaft rotates one-fourth of a revolution for each cycle of addition, subtraction, and division. Because an extra cycle is consumed in adding in the tens values of the partial products obtained during multiplication, two cycles or one-half revolution of the B shaft are necessary for multiplication. One of the B commutators (B–1) sends supply current to the A shaft, the B–2 commutator connects a supply line to the storage block return relay during addition or subtraction. The B–3 commutator acts for a very short time and actuates the storage block return relay during the division cycle when a zero appears in the lowest order in the divisor. Commutators B–14 to B–12 control the digit entering circuits. Commutator B–13 starts the C shaft to print and B–14 provides a pulse which releases the decimal point printing arm.

The A–1 commutator is connected directly to the main supply line and takes over after the Start key has been depressed. The A–2 commutator energizes the storage block return relay during a multiplication calculation. This relay returns the storage block to its zero position after the end of a multiplication problem. The A–3 commutator controls the releasing of the decimal point relay during a division calculation. The A–4 commutator operates the units-tens transfer relay and is used only during the multiplication operation. The A–5 commutator is also a multiplication control and determines the length of time the multiplier contacts are closed. Commutators A–6 to 14 are also used during the multiplication calculation and close connections to the storage block input conductors. The A–15 commutator is a control of the shuttle magnets which hold the accumulator gears into engagement with the drive gears 130. The A–16 commutator is also a shuttle coil control and supplements the A–15 commutator by providing current when the shuttle magnets are pulsed to release the shuttle gears from the accumulator gears. The A–17 commutator controls the transfer from the upper accumulator to the lower accumulator. The A–18 is the same as A–17 but operates when the transfer is made from the lower accumulator to the upper and allows the upper plus shuttle coil to be connected to the lower minus shuttle coil. The A–19 commutator controls the carry circuit and energizes the carry-over coil. The A–20 commutator starts the B shaft. The A–21 commutator closes a circuit to control the A shaft so that it will operate only once during an ordinary listing. The A–22 commutator starts the B shaft the second time during a multiplication or division operation. The A–23 commutator connects the keyboard storage block to the accumulator controls and also energizes the times one relay. Commutators A-24 and A-25 control the escapement of the storage block, A-24 moving it to the right during a multiplication or division operation and A-25 moving it to the right in a division operation only.

The A-26 commutator supplies the 16 order drive wheel with a one-value pulse. The A-27 commutator connects the storage block to the selected multiplier coil. The A-28 commutator connects the lower minus shuttle coil to engage the lower minus accumulator gears to the drive gears. The A-29 commutator connects the upper minus shuttle coil to engage the upper minus accumulator gears to the drive gears. The A-28 and A-29 are connected for a count of nine only.

The A-30 commutator connects positive potential to an automatic clearing relay when a circuit interruption occurs. The A-31 commutator energizes the total relay to take a total when the automatic clearing relay is closed.

The A-32 commutator connects the positive line through holding contacts to the start set-up relay to insure the relay is locked in an operating position for a 17 degree rotation. The A-33 commutator sends current through the main latch coil 573 at the end of a calculation to unlatch the keyboard. The A-34 commutator supplies a pulse to the minus shuttle magnets (through A-28 or A-29) to release after a nine count.

The A-35 commutator opens the line, during a multiplication operation, between the multiplier circuit and the storage block. During this time the A-6 to A-14 commutators are closed.

The C commutator shaft contains only one commutator and is used only for printing. It turns only one-eighth of a revolution for each cycle.

The three commutator shafts are shown in detail in FIGS. 47 to 50 and are also indicated in lesser detail in FIGS. 2 and 4. The extent of the conducting sectors is listed and indicated in the combined wiring diagram (FIGS. 72 to 79) and their action in connection with circuit operation will be described by means of the wiring diagram when specific problems are described.

Figure 75:
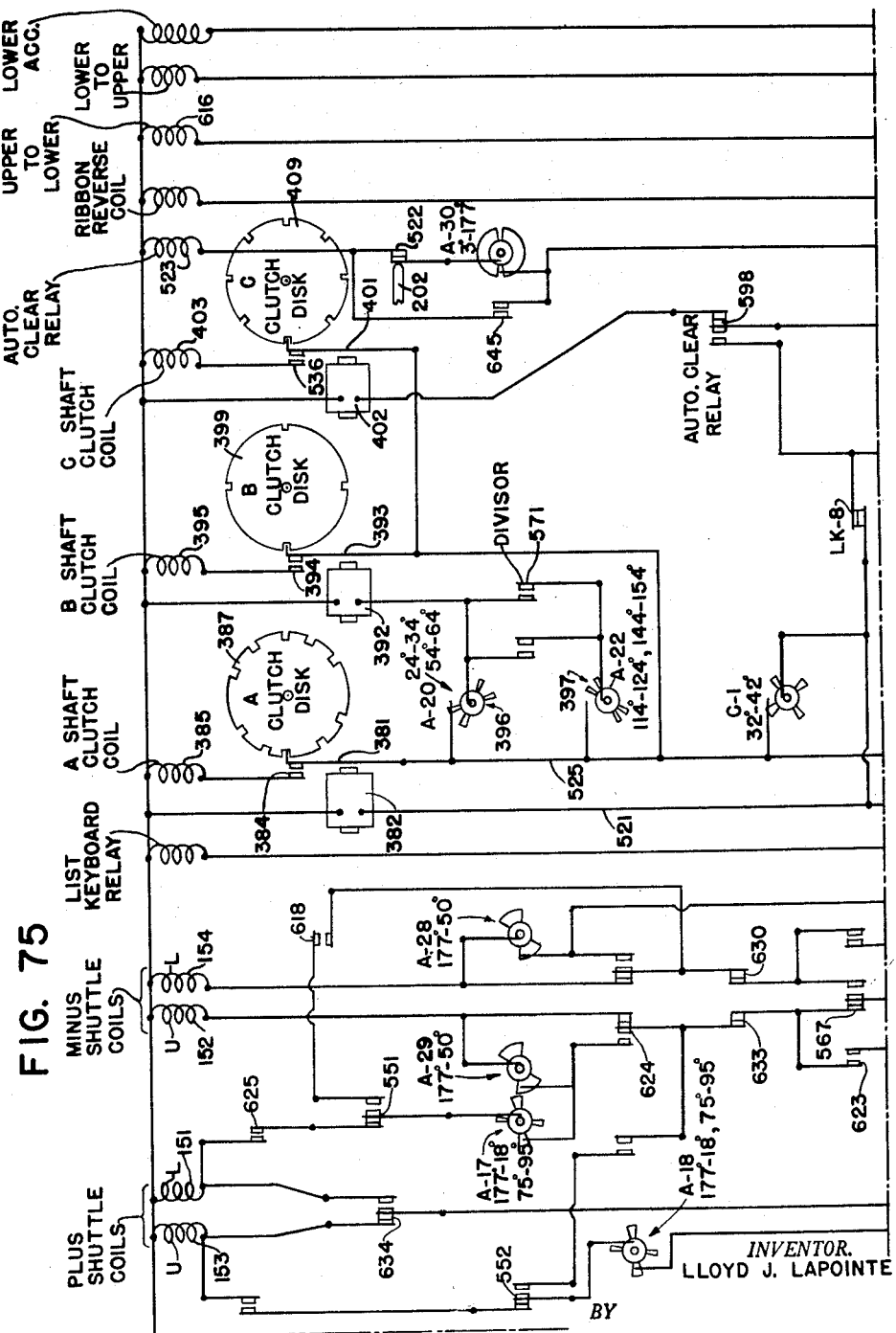

The A commutator shaft 120 (FIGS. 47 to 50) includes a clutch assembly 380 which is similar to the clutches used to couple the drive gears to the rotating power shaft 300. In addition, clutch 380 includes a contact arm 381 which is operated by a magnet 382. The connections which start and stop the A shaft are shown in FIGS. 75 and 79 where one contact 383 of the start set-up relay closes a connection between the positive terminal and the contact arm magnet 382, the other side of which is connected to the negative terminal. When this happens, the magnet 382 pulls the arm 381 away from the clutch stop disk 387 and at the same time closing a contact 384 which connects the clutch coil 385 through a start release relay contact 386 to the positive terminal. Current through coil 385 couples clutch plate 389 to the power shaft and the entire array of commutators on the A shaft turns, making contact with the various contact fingers 388 positioned on both sides of the contact commutator sectors. In all operations the start set-up relay contacts 383 are opened (at 13°) before the A shaft has turned to its first stopping point. However, the shaft continues to rotate because contact arm 381 rides on the periphery of the clutch stop disk and keeps contacts 384 closed. As soon as the next notch is encountered (at 37°) armature 381 moves into the notch and contacts 384 are broken. This stops the clutch movement.

The B commutator shaft 124 contains fewer commutators but includes a clutch 390, a clutch plate 391, a stop disk 399, a magnet 392 and its associated armature 393. The B contacts 394 are wired in a similar manner being connected in series with the start release relay contacts 386 and the B clutch coil 395. The B shaft is started by the closure of a number of contacts, the simplest control being the closure 396 which forms the A-20 commutator. Other combinations include closure of the A-22 contacts 397 with either the multiplier contacts 376 or divisor contacts 571.

The C commutator shaft is controlled by a clutch 398 having a clutch plate 400, a stop disk 409, and a magnet armature 401 controlled by magnet coil 402. The C shaft clutch includes an operating coil 403 which coupled the plate 400 to the single commutator 377. The C shaft is started by the B-13 contacts 378.

It should be pointed out that the commutators on all three shafts, A, B, and C are simply a means of closing a circuit and cam-operated contacts would perform the same function. There are three other series of contacts which are caused by a rotating shaft. These are the storage block cam contacts which are controlled by cams 404, 405, 406, and 407 (FIGS. 40, 44, 45, and 46). These cams turn in synchronism with the movement of the storage block. The operation of this series of cams will also be considered when a specific example is described.

A second series of cam operated contacts is controlled by the decimal point cams 408, 410, 411, and 412 (see FIGS. 40 to 46, inclusive). These cams revolve as a single unit and are connected to the storage block to turn with it whenever it is desired to record the decimal point in problems involving multiplication, division, addition, and subtraction.

One other cam, called the E cam 368, is a part of the storage block series. Its operation and use will be described later in division. It places the lowest order of the divisor in the 9th position.

The storage block cams 404, 405, 406, and 407 are engaged by two clutches 266 and 293. Clutch 266 is adjacent to a power gear 113 which is turned all the time the motor is running. When current is applied to coil 265, it causes contact to be made between the clutch core 266 and the power gear 113, and gears 294 and 114 together with cams 406, 404, 405, and 407 revolve in a clockwise direction. This action drives the storage block to the left through idler 115. When clutch 293 is actuated, contact is made between power gear 413 and clutch core 293 and the above mechanism is rotated in a counterclockwise direction driving the storage block to the right.

The D series of cams 408, 410, 411, and 412 are secured to a sleeve 415 (FIG. 44) which is fastened to a clutch 417. When this clutch is actuated, it attracts gear 416 and the D series of cams moves with gear 416 and the storage block.

The E cam is driven by a shaft 418 which is secured to an electromagnetic clutch 421, which is adjacent to gear 416 on the side opposite to clutch 417. When this clutch is actuated, the gear 416 turns the E cam in synchronism with the storage block movement.

The above described cams are coupled to a constantly rotating set of power gears by electromechanical means. It is obvious that a mechanical coupling can be employed to obtain the same result by operating mechanical latches.

*Printer Mechanism*

The printer mechanism is shown in detail in FIGS. 69 and 70 which have been drawn on an enlarged scale to show the details more clearly. Parts of the printer mechanism which include the ribbon advancing mechanism are indicated in FIGS. 2, 4, and 7. The printer wheels 117 together with the printer idler gear 316 and the detent arm 320 have already been generally described. Also, parts of the ribbon feeding mechanism which include spools 116 and 127 and the ribbon itself 126 have been mentioned previously.

The printer mechanism is designed to print the total, sub-total, and the amount in the keyboard or the accumulator when the operator desires such a figure. For many operations especially during a multiplication calculation, the printer arms are held inactive and for this reason the ribbon advancing means operates only during a printing operation. As has been described above the printer idler gear 316 is in mesh with the accumulator drive gears 130 at all times except when the printing operation takes place. Therefore, when a number is entered into the accumulator during an addition or subtraction cycle the drive gears 130 are advanced an amount equivalent to the number entered into either one of the accumulator gears and the idler gear 316 and its associated printer wheel 117 are turned a like amount. When the B–13 commutator 378 makes contact with its stationary contacts it completes a circuit which energizes magnet 402 and draws armature 401 from a slot in stop disk 409, closing the contacts 536 which energizes the clutch coil 403 and causing the C shaft to turn 45 degrees. This action lowers a bail 430 and permits the printer arm 317 to move towards the rear of the machine causing an impact between printer wheel 117 and the ribbon 128, thereby printing a character on the paper 115 which has been wound around the platen 318. As the printer arms move away from their neutral positions, the detent arms 320 slide away from the stop cams 297 and the other end of the detent arms move into the gear teeth of the printer wheels 117 thereby retaining them in an accurate printing position during the printing stroke and during the return to their neutral position. Just before the printer arms are fully returned by bail 430, the detent arms 320 are again removed from the gear teeth so that the printer wheels 117 and the idler gears 316 are free to move with the drive gears 130 when they return to their neutral position. The return of the printer arms 317 is caused by rotation of shaft 431 which controls the movement of bail 430. Shaft 431 is controlled by bell crank 442 and rod 440 (FIG. 7) and is secured to a bell crank lever 434 which operates bail 430 on one leg and operates a rotatable pawl 432 on the other leg (FIG. 70). This pawl engages ratchet teeth 433 which are secured to the platen and the intermittent movement of pawl 432 causes the platen to turn one tooth after each printer operation. The bell crank 434 is moved a sufficient amount to turn the platen more than two teeth but a stop 435 is provided which engages the lower end of pawl 432 and permits it to pick up only one tooth on the ratchet 433 during normal listing operations. When a total operation is called for, the stop 435 is lowered a definite amount by means of a bell crank 436 which is operated by either one of the clearing relays 140, 142 (FIG. 8); then when the bell crank 434 is operated, pawl 432 picks up two teeth and moves the paper at an amount equivalent to a double space. This signifies that a total has been taken and a clearing operation has been done on one of the accumulators.

The printer operation is controlled by the C commutator shaft which also includes a mechanical cam shaft 437 (FIGS. 7 and 4). Cam 437 comprises a series of cut-out portions around its periphery and a pin 438 on arm 440 moves in and out of the cut-out portions under the resilient action of spring 441. This intermittent motion rocks bell crank 442 and moves ratchet arm 443 toward the front of the machine to engage a tooth on ratchet wheel 444. Then, as wheel 437 rotates, the arm 443 is moved to the rear of the machine and wheel 444 is turned a small amount. This wheel is secured to shaft 445 on which are mounted ribbon spools 116 and 127. Shaft 445 is coupled to the upper ribbon spool 116 by friction means and under normal conditions when the ribbon is moving in one direction the friction coupling is sufficient to move the ribbon 128 from spool 127 and wind it on spool 116. When the ribbon is nearly unwound from spool 127, the ribbon makes contact with an arm 446 moving it to the left as viewed from the front of the machine. This motion operates a set type switch 447 (FIG. 7). The operation of this switch sends a current through an electromagnetic clutch 448 mounted under spool 127. This clutch is formed in the same manner as clutch 380 shown in FIG. 50 and when operated is strong enough to turn spools 127 and 116 in a reverse direction, overcoming the resistance of the friction disk mounted on spool 116. As long as clutch 448 operates, the ribbon 128 is withdrawn from spool 116 and wound on spool 127 and this condition of operation continues until spool 116 is unwound. The exhaustion of spool 116 causes the ribbon to make contact with an arm 450 similar to arm 446 and actuates the set type switch 447 opening the contacts and releasing clutch 448. With this force released, the friction disk on spool 116 again winds the ribbon 128 from spool 127 to spool 116 until the entire cycle is again repeated.

*Partial Products Relays*

During the multiplication operation, partial products are derived from a system of relays and these partial products are successively run into the accumulator to produce the product of a multiplier and a multiplicand. FIGS. 51 to 68, inclusive, illustrate the structural details of the partial products relay while FIGS. 71 and 78 illustrate the connections of the relay assembly as related to the remainder of the calculator elements.

The relay assembly 114 is shown in FIG. 51 which is partly in section. There are nine relays which are connected to produce the partial products of any two single digit factors and there is a switching relay called the units-tens transfer which is timed to switch from the units series of connections to the tens series at the proper interval so that both values may be entered into the accumulator in the proper denominational order. The magnet part of the relay unit comprises an iron cup with a central iron core 460. A coil 461 is positioned in the cup around the central core and produces the magnetic force which attracts an iron plate armature 462. The armature 462 carries contact members which slide on small rods 463 and make electrical contact with other contact members which are secured to the relay base. There are eighteen rods positioned around the central magnet, one rod carrying the current for holding contacts, the other seventeen for the seventeen digit values which are the necessary results obtained when multiplying any two numbers from one to nine.

FIG. 63 shows the ×4 relay and indicates how the different values are connected in order to obtain the products of four times all the other digits. The holding contacts 464 have no digit value and simply retain the relay in its actuated condition after the initial operating pulse has been applied. To the left of this position are two positions which give the tens and units value of four times two, these values being indicated by zero and eight in the figure. Adjacent to these positions are the units and tens relay contacts which denote the product of four times three, and so on around the circle until contacts 465 and 466 produce the units and tens value of four times nine. The contact 467 between the holding contact 464 and the contact 466 represents the value of four times one or four. The other nine relays have their partial product values arranged in a similar fashion. Whenever a zero occurs in the multiplication table the contacts are omitted. FIG. 56 is a plan view showing the arrangement of contacts in the times-one relay and FIGS. 52, 53, 54, and 64 show several views of the times-three relay. FIG. 52 is a plan view of the armature assembly which is moved by the attraction of the relay magnet. A central iron disk 462 is formed with a hole surrounding a supporting shaft 470 which holds the entire array of ten relays together. The iron disk 462 is riveted to a non-conductive ring 471 which carries the movable contacts 472 (FIG. 54). These contacts are shown in greater detail in FIG. 68 and comprise a flat bottom piece with two bent up portions which are threaded through a small hole 473 (FIG. 66) in the non-conductive ring 471. A coiled spring 474 holds the flat end pieces in resilient engagement with the stationary contacts 475 (FIG. 65) when the relay is actuated.

Stationary contact members 475 are secured to a non-conducting disk 476 which is molded to the bottom of the magnet as shown in FIGS. 51 and 54. Contact members 475 are secured to disk 476 by crimping turned-over portions through holes and around the edge of the supporting disk.

All the multiplying relays, ×1 to ×9, inclusive, contain contacts that are normally open and when the relay is actuated, all the contacts are closed. The Units-Tens transfer relay, however, contains nine normally closed contacts 477 (FIGS. 71 and 55) and eight normally open contacts 478. When this relay is actuated, connection is made to the contacts which produce the tens order digits of the partial products and when the relay is unactuated connection is made to the contacts which produce the units order digits of the partial products. In order to produce the make-break feature an extra nonconducting ring 480 is added to this relay (FIGS. 51, 55, 60, and 62) and alternate portions are cut away from rings 479 and 480 as illustrated in FIGS. 59 and 62.

The connections between contact points and the incoming and outgoing circuits are shown in FIG. 71. The multiplication relay is a circuit component connected between nine B commutators and the contacts of the multiplier storage block relay. When addition, subtraction, or division is being performed the Units-Tens transfer relay has contacts 477 in a closed position and the ×1 relay is closed to provide conductance between input and output conductors having similar values. When the calculator is multiplying, all the multiplicand digit switches in the keyboard are connected to the multiplier relay by the keyboard conductors and the multiplier relays are used, one at a time, to close all of the multiplier relay contacts. If an 8 multiplier is to be multiplied by a 7 multiplicand, all the contacts in the ×8 relay are closed and the Units-Tens transfer relay is first actuated to close contacts 478 and a closed circuit is then produced between the 7 line to the keyboard, conductor 481, through contacts 478, over conductor 482, through the lower contacts 483 of the ×8 relay, to conductor 484, and thence to conductor 485 and the commutator on the B shaft which sends a pulse through the storage block switch which has a time interval equal to a five count. This registers a "5" in the accumulator as the tens value of the product 7×8=56.

As soon as the 5 is registered, the storage block moves one space to the right, the Units-Tens transfer relay moves into its normal position and a circuit can then be traced from conductor 481 through one of the contacts of bank 477, over conductor 486, through one of the contacts in bank 487, over conductor 488, to conductor 490 and the commutator on the B shaft which sends a pulse through the storage block switch which has a time interval equal to a six count. This registers a "6" in the accumulator as the units value of the product of 7×8 equals 56. Due to the storage block movement after the registration of the 5 the 6 is entered into the accumulator one denominational order lower than the 5. Additional features of the multiplier relays will be disclosed when an example is discussed in connection with a full multiplier calculation.

*Storage Block Mechanism*

The Storage Block has been described in part in connection with the escapement and keyboard controls. It comprises 150 small switches which are closed by the manual operation of the digit keys in the keyboard. The switches have one terminal in sliding engagement with a series of ten rods 156, each rod making contact with all the switches designating the same digit value. The switches have their second terminal in sliding engagement with a series of 15 commutator buttons 269 (FIG. 22). The entire block of switches moves on two rails 494 and 495 under control of two electro-magnetic clutches 266 and 293 (FIG. 46). As the storage block is moved by the escapement mechanism from one order to the next the sliding contacts below the block are advanced to the next commutator button 269.

Rods 156 are connected to the multiplier relays as shown by the wiring diagram (FIGS. 78 and 74) through commutators A-6 to A-14. The commutator bars 493 (FIG. 38) are each connected to a similar bar 500 under a column selector block 501. Connection between the bars 500 and 493 to the main supply line 514 is as follows: Contacts 503, lugs 504, brush 505, brush 510, commutator A-27, commutator A-5, conductor 558, to contacts 557, to the main supply conductor 514.

When a multiplication calculation is called for, the sequence of operations can be summarized as follows: (1) the operator enters the multiplicand by depressing the required digit keys in sequence, (2) the (×) Times key 224 is depressed, (3) the multiplier is entered into the keyboard by depressing the required digit keys in sequence, (4) the Start and Enter key is depressed. After this, the machine automatically multiplies each single digit in the multiplier by all the digits in the multiplicand, the partial products being entered in an additive manner into the upper (or lower) accumulator. After the finish of the multiplication if the product is in the upper accumulator it is made visible by dial wheels 132. If the operator desires to print this product, the Sub-Total key is depressed. If it is desired to print the product and clear the accumulator, the Total key is depressed.

It should be pointed out that during the process of multiplication, both the multiplicand and the multiplier are entered into the storage block adjoining each other with no separation except the depression of the (×) times key which causes no movement of the storage block but does engage a column selector block 501 so that, during the entering of the multiplier, the storage block 155 and the column selector 501 move together. The column selector block includes a bracket 497 which engages a multiplier selector block 496 which is resiliently engaged by a long spring 502. The multiplier selector block 496 is held against return by a pawl 363 which engages teeth 498.

Wiring diagrams, FIGS. 73, 74, 77, and 76 show the electrical connections of the various bars and contacts.

As the multiplicand digits and multiplier digits are being entered, there are no circuit connections to the remainer of the machine because the Start bar 195 has not been depressed and the A and B commutator shafts have not yet started to move. After the problem is set up, all the multiplicand digit switches are connected to commutator buttons 269 which will soon be connected to the clutch windings of drive gears 130 in the accumulator assembly. The multiplier digit switches are connected to contact lugs 493 and 500 on column selector block 501 (FIG. 38). In this position the highest digit switch in the multiplier is connected through the left hand lug 500, through a movable contactor, to a terminal 503, to a second terminal 504, through a movable contactor 505, contact 510, to conductor 506.

When the Start and Enter key 187 is depressed, one-half cycle of multiplication is effected before the storage block moves. The tens values of the partial products (of the highest digit in the multiplier by all digits in the multiplicand) are entered into the accumulator. The details of this process will be explained when a specific example is considered. At the end of the first half cycle of multiplication, the storage block is moved one space to the right and the column selector block 501 moves with it but the multiplier selector 496 remains in its left hand position held by pawl 363. After this movement, the second highest storage block switch of the multiplier is in contact with the second lug 500 (and 493) which is now in contact with contactor 505. At this position the units values of the partial products are entered into the accumulator in their proper orders. During the escapement movement the Units-Tens transfer relay is normalized and changed from the Tens contacts to the Units contacts, thereby giving the units results of the partial products.

With the storage block in the second position, the transfer relay is again actuated and changed from the units series of contacts to the tens series, thereby producing the tens results of the partial products circuit of the second multiplier digit.

Then the second escapement movement occurs and the transfer relay is again normalized and the units values of the second series of partial products are entered into the accumulator. This process is repeated until all the digits of the multiplicand have been multiplied by each digit of the multiplier. When this occurs, a switch 285 is closed by the return of the column selector block and at the start of the next cycle, commutator contacts 286 are closed by the A shaft and the storage block return relay 288 is actuated, returning the storage block to its normal position and the calculation is complete.

Shuttles

In order to show the details of construction and operation of the shuttle magnets, FIGS. 9A, 9B, and 9C have been included. All four magnets 151, 152, 153, and 154 have the same construction. A coil 645 is supported on a bracket of iron which also supports an armature 646, hinged at one end. The shaft 145 which carries the accumulator idler gears is movably supported in one of the side plates of the machine and normally is held in a disengaging position by a spring and the free end of armature 646. The end of the shaft contains a short portion having a smaller diameter and a disk portion 647.

When it is desired to engage the idler gears, current is first applied to the winding 645 drawing the armature into a horizontal position. Then, as described above, a lever is cammed to move the shaft 145 to its engaging position. At this point the assembly is arranged as shown in FIG. 9B. Next the current is cut off from the coil and the armature falls into place as indicated by FIG. 9C. This locks shaft 145 in its engaging position and the idler wheels are in mesh with the accumulator wheels and the drive gears.

Operation of Addition

In order to illustrate the operation of the calculator, the number 456 will be entered into the keyboard and then transferred to the upper accumulator. The motor 101 is started when the operator depresses any of the Start keys 109 which causes the machine to go through a complete cycle actuating a timer mechanism and closing switch 507. Switch 507 connects the alternating current supply line to the motor 101, the transformer 508, and the rectifier 509. The timer mechanism will be described later and operates to turn off the machine after a predetermined time interval. Each time the start key is depressed the timer is reset.

The number 4 digit key is now depressed and the key rod 164 is released moving bail 171 to the right and operating switch 172 (FIG. 16). This action energizes magnet 180 which lowers armature 182 and causes a power bail 185 to be lowered thereby depressing the fourth switch 174 in the first row in the storage block 155. This same action closes escapement contacts 264 and sends current through contacts 278 to the clutch coil-left 265 to the negative or ground side of the supply line (FIG. 72). The actuation of the clutch coil attaches clutch 266 to gear 113 which is rotated continuously by a train of gears 413, 118, and a pinion 354 secured to the end of the motor shaft (FIG. 46). This action causes the storage block to move to the left until the next switch shank 174 engages projection 173 on key rod 164 (FIG. 38) forcing it to the left and opening contacts 172 thereby opening the circuit to the escapement coil and permitting its armature 182 to move upwardly into the next notch in the storage block. This latter movement opens contacts 264 breaking the current to the clutch coil 265 and stopping the motion of the storage block. The number four switch 174 is now depressed in the first denominational order and the storage block has been moved one place to the left.

Depressing keys 5 and 6 repeat the above described action, the final result being switches 4, 5, and 6 in the first three denominational orders have been moved into their contact making position and the storage block has been moved three places to the left.

When the storage block first moved to the left, two contacts 512, and 295 were closed and contacts 511 opened and the following circuits were established: Contacts 511 connect the positive supply line to the main latch coil 513 through commutator A–33 (FIG. 72). The purpose of these contacts is to time the actuation of the main latch coil which releases the set-up bar 201. If contacts 511 are closed before commutator A–33 closes its circuit, the set-up bar 201 is released when the commutator makes contact. If, however, the commutator contacts are made and the storage block is not in its zero position, then the start set-up bar 201 can not return until the storage block is returned to its zero position, at which time the circuit will be completed and the set-up bar released. Contacts 512 connect the rectifier line to conductor 514. Contacts 295 connect the escapement coil 180 to commutator contacts A–24 and A–25 for a later operation.

The start key is now depressed and contacts 515, 516, and 283 are operated (FIGS. 72 and 76). Start contacts 515 send current through the start set-up relay 517 and this relay closes eight contacts which set up the following circuits. Contacts 284 complete a circuit from the start contacts 283 to conductor 514 around several other contacts. Contacts 518 establish a holding circuit for the relay which may be traced as follows; from the positive line 270 through start contacts 283, start contacts 284, conductor 520 through commutator contacts A–32, holding contacts 518 to the relay coil 517 and ground. Contacts 383 (FIG. 79) complete a circuit from conductor 514 to conductor 521 and the A shaft release coil 382 (FIG. 75). Four other contacts are closed by the start set-up relay 517 but they complete no addition circuits and will not be considered at this time.

Start key contacts 516 (FIG. 76) are used in division only. Start key contacts 283 connect the positive supply line 270 to conductor 514 through contacts 284 or other contacts in parallel with it.

Depressing the start key also completes a circuit to a holding coil 521. This circuit may be traced from conductor 514 over conductor 520 to the holding coil 521 and ground. Depressing the start key also energizes the upper plus shuttle coil 153 by completing a circuit which may be traced from conductor 514 through two normally closed contacts 565 and 566 (FIG. 79), through the contacts of the A–15 commutator through three other normally closed contacts 550, 632, and 634 to coil 153 and ground.

When the start key is depressed, it mechanically moves several arms which operate as follows. The set-up bar 201 is moved to the right by the start key and is held in an operated condition by a holding coil 521 until the end of the cycle. The start released bar 281 is placed under spring tension but is prevented from following the set-up bar by the depressed start key. As soon as the start key is released, this bar moves to the right closing contact 280. The start key also moves a circuit interrupt bar 202 against the start key holding coil 521. This bar provides a signal when the current is interrupted during a calculation operation. If the current is interrupted for a very small time interval during a machine cycle, the bar will return to its normal position and will close contacts 522 thereby sending current through the coil of an automatic clearing relay 523 (FIG. 75) thereby returning the storage block to its normal position and clearing the accumulator.

When the start key is released, it removes the mechanical interference (bail 195) holding the start release bar and allows it to move to the right and close contacts 280. This action closes the circuit between conductors 514 and 520 and energizes the start release relay 524. When this coil is actuated, five contacts are closed, only one of which effects the addition operation. This circuit may be traced from conductor 514, through contacts 386 (FIG. 79), over conductor 525, through contacts 384, and the A shaft clutch winding 385 to ground. This connects the A shaft to the motor drive and starts it to rotate.

The A commutator shaft is now coupled to the motor drive and rotates for 37 degrees until the first notch is reached. During this rotation the following contacts are opened; between 0 and 10 degrees contacts A–2, A–4, A–6 to A–14, A–33, A–27, and A–30, are operated but are not used during the addition cycle. Also, during this time, a mechanical cam on cam wheel 150 has actuated cam follower 323 (FIG. 6) to move the proper shuttle shaft 146 into engagement with a shuttle armature which retains it in engagement and thereby moving idler gears 134 into mesh with the accumulator drive gears 130 to move the accumulator wheels in an additive direction. At 18 degrees, commutator A–15 opens and releases the armature of the plus shuttle coil which locks the shaft and its associated gears in its engaged position. At 18 degrees rotation, commutator A–23 makes contact and energizes the storage block accumulator coil 526 and the ×1 relay 527. These relays close the following circuits; from conductor 514 through contact 528 (FIG. 78), then through commutator contact A–23, over conductor 530 to the storage block accumulator coil 526 and ground, also through contacts 531 (FIG. 74), the ×1 relay coil 527 and ground. At 10 degrees, the commutator A–1 closes and connects its contacts in parallel with numerous contacts (FIG. 76) connecting conductors 270 and 514.

When the A shaft has rotated 24 degrees, the A–20 commutator makes contact and completes a circuit to the B shaft release coil 392. This action pulls armature 393 out of a notch in disk 399 and closes contacts 394 thereby providing current for the B shaft clutch 395 and starting the B shaft rotating. At 34 degrees, the A–20 commutator contact 396 are opened but armature 393 rides on the surface of disk 399 and contacts 394 (FIG. 15) remain closed until the B shaft has rotated for 79 degrees. At 37 degrees, the stop lug of armature 381 engages the first notch in disk 387. This opens contacts 394 and stops the rotation of the A shaft.

During the rotation of the B shaft from 0 to 79 degrees, current will flow through commutator disks B–7, B–8, and B–9 because these contacts are connected to the three storage block switches 4, 5, and 6 which were manually depressed at the start of the calculation. The circuit which inserts the value of four may be traced as follows; from conductor 514 through contacts 532 of the storage block return relay, then through contacts 533 of the quotient decimal point relay, through commutator contacts B–7, through the multiplier circuit and through a closed contact in the multiplier storage block relay, to the number 4 switch in the storage block 177, then to the left through contacts 500 on the column selector block 501, over conductor 534 (FIG. 73), through contacts 535 of the storage block commutator coil, to clutch coil 131–3 adjacent to the third drive gear 130. When coil 131–3 is energized, it picks up the drive gear and turns it along with accumulator drive gear 134 and accumulator wheel 133 to register a four in the third denominational order. The duration of the current in coil 131–3 is controlled by commutator segment B–7 which sends current through this circuit long enough to turn the accumulator wheel so that a 4 is registered. In a similar manner, currents through commutator segments B–8 and B–9 send current through storage block switches 5 and 6 to register these numbers in the accumulator wheel in the second and first denominational orders. The B shaft continues to rotate until it is stopped at 79 degrees but at 66 degrees commutator B–13 (FIG. 79) closes and sends current to the C shaft release coil 402 to actuate its armature 401, close contacts 536, and send current through clutch coil 403 to turn the C shaft 45 degrees. During this rotation, the numbers 4, 5, and 6 are printed on the platen 318 by the printer wheels 117. The printing action has been described previously and is controlled by the removal of bail 430 (FIGS. 8 and 69) from the lower part of printing levers 317, permitting the arm and the print wheels to snap against ribbon 128 and print on the paper 115 around the platen 318. The print arms 317 are restored by the same bail 430 under control of shaft 431 which is operated by arm 440 (FIG. 7) and cam wheel 437.

At 72 degrees rotation of the B shaft, the storage block return relay is actuated by a circuit through contacts 588, 590, 591, over conductor 287, relay 288, to ground. One of the relay contacts completes a circuit to the escapement coil 180. This circuit may be traced as follows: (FIGS. 76 and 77) from conductor 514 through contacts 290 on the storage block return relay, through contacts 291 on the start release relay, then through contacts 295 on the storage block home contacts, to escapement coil 180 and ground. Energizing coil 180 moves armature 182 and closes escapement contacts 264, then through contacts 537 of the start release relay, over conductor 538 to the storage block clutch coil-right 292. Energizing this clutch coil couples the storage block to the motor drive and returns it to its home or zero position. When the storage block is about one-half a space from its home position, two contacts 512 and 295 are opened and one contact 511 is closed. One of these contacts 512 opens the line around the A–1 contacts which means that conductor 514 will be disconnected when the A–1 shaft has rotated 177 degrees. The second of these contacts 295 disconnects the escapement coil but its armature will not move because it is held down mechanically. When the storage block reaches its home position, the armature 182 enters the stop rack 268 (FIG. 10) and escapement contacts 264 are opened, cutting off current from clutch coil 292 and stopping the storage movement. The third contact 511 closes but completes no circuit.

Another contact 532 on the storage block return relay 288 opens, cutting off current to the counting commutators on the B shaft thereby preventing any further counting for the duration of this cycle.

At 32 degrees of the C shaft movement, the A shaft was again set into motion to rotate from 37 to 67 degrees. This action is caused by a circuit through the C–1 contacts 377 (FIG. 75). During this rotation, the following actions occur: at 40 degrees, contacts A–23 open and normalize the Times One relay 527 and the Storage Block Accumulator Coil 526. At 50 degrees, contacts A–19 close, actuating Upper Carry Coil 141 by a circuit from conductor 514, through contacts 528, through Over-subtraction relay contacts 543, through the A–19 contacts, through contacts 544 and 545, to the Upper Accumulator Carry Coil 141 and ground. At 54 degrees, contacts A–20 close and start the B commutator shaft as before. At 64 degrees, contacts A–20 open as before at 34 degrees. At 67 degrees, the A shaft comes to a stop.

The B shaft is caused to rotate from 79 to 90 degrees to send a single-valued pulse to the accumulator assembly for purposes of carrying. The B shaft is released for rotation at 54 degrees of the A shaft. At 87 degrees of the B shaft rotation, the A shaft is released for rotation to move from 67 to 180 degrees. The circuit which starts the A shaft may be traced as follows (FIGS. 75 and 79): from conductor 514 through contacts 386 of the Start Released Relay, through contacts B–1, A–21, conductor 521, to release coil 382, and ground. This sets the A shaft in motion in the usual manner. The B shaft is stopped at 90 degrees by a slot in disk 399 as described above.

The A shaft in moving from 67 to 180 degrees operates on several circuits. These may be described as follows: at 79 degrees, the A–19 contacts open the circuit which energized the carry coil 141; also contacts A–16 close which again attracts the armature of shuttle coil 153, releasing the shuttle shaft and disconnecting the drive gears from the accumulator wheels. At 95 degrees, the contacts A–16 release the shuttle coil armature. At 100 degrees, the shaft 146 is again operated to cause the idler gears to engage with the now returned, drive gears. The A–23 contacts close at 111 degrees and actuates the Storage Block Accumulator Coil 526 and the Times (×1) relay 527. At 130 degrees, contacts A–23 open, cutting off the current from the Storage Block Accumulator and the Times One (×1) relay. At 141 degrees, contacts A–19 close and again open at 160 degrees, cutting off current from the carry coil 141. At 177 degrees, contacts A–1 open, separating conductor 514 from the positive supply line 270 (provided the Storage Block is in its normal position) and the operating system is substantially dead. If the Storage Block 177 is not in its normal or zero position when contacts A–1 are opened then conductor 514 is connected to the positive supply line by contacts 512 until the Storage Block is fully returned.

At 177 degrees, the A–21 contacts disconnect the A shaft Release coil 362 from its supply circuit which ran from conductor 514 through contacts 386 (FIG. 79), over conductor 525 to the A–21 contacts, then over conductor 521, to coil 382, and ground. The armature 381 can now fall into the notch at 180 degrees on disk 387. Also, at 177 degrees, the latch coil 513 is energized by a circuit which may be traced from the positive supply line 270, through the contacts made by the A–33 commutator, then through contacts 546, 511, 547, 548, to the latch winding 513 and ground. This action permits the set-up bar 201 to return to its normal position, unlocking the keyboard for the next entry. Also, at this time, contacts A–32 close setting up the start circuit for the next entry.

At 180 degrees, the A shaft armature 381 falls into the 180 degree notch on disk 387 and the A shaft stops, ending the cycle, and bringing the machine to a complete stop.

Any additional numbers added to the machine will go through the same system of operation as described above except when one or more accumulator wheels are turned from nine to zero and a carry operation is to be performed. Then contact arm 307 (FIGS. 8 and 73) has been tripped by the end of cam follower 305 and a circuit is made from conductor 514, over conductors 553 and 554, to contact arm 307 and contact point 308, then through contacts 555 which are closed by the Upper Accumulator Carry Coil 141, through the clutch coil 131–2 in the second order to ground. This action enters a one in the next higher order and the carry is made. The Carry Coil 141 is controlled by commutators A–19 (FIG. 78) which are connected twice during each cycle for about 20 degrees or just enough time for the drive gears to enter a one in the accumulator wheels.

In cases where a carry is made in one order and a nine is already in the next higher order, the two carrys are made at the same time. The circuit for this operation is the same as the one described above except contact wheel 133–2 will be in a position where the conducting segment 332–2 bridges the two contact brushes and then a circuit is completed from contact arm 307, contact 308, brush 334–2, carry contacts 556, clutch coil 131–3, and ground. It will be obvious that if a plurality of nines are in the accumulator wheels and a one is added to the lowest accumulator all the carries will be made during a single carry period and all the accumulator wheels will be turned together, an amount equivalent to a unit digit.

Subtraction Operation

The subtraction operation is the same as addition except, when a number is to be subtracted, the minus key 225 is depressed and several minus contacts are transferred from the plus to the minus circuit position. One of these contacts 550 transfers the line 514 from the A–15 commutator to the minus line. A second minus contact 551 is connected to the A–17 commutator and a third transfer contact 552 is connected to the A–18 contacts. The only purpose of these contacts is to insure that one of the two minus shuttle coils 152 or 154 is energized when a subtraction is to be made. The flow of current through these coils is controlled by the same commutators and at the same time as the plus shuttle coils.

Also, during a subtraction or division calculation, brushes 334 on rods 336 and 337 are rotated one-twentieth of a circumference so that a simultaneous minus carry circuit is set up when the accumulator wheels are at zero instead of nine.

Multiplication Operation

The steps used to multiply may be summarized as follows: (1) the multiplicand is entered into the Storage Block; (2) the Times (×) key is depressed; (3) the multiplier is entered into the Storage Block adjacent to the multiplicand; and (4) the Start and Enter key is depressed. After this, the machine automatically does the multiplication, showing the product in the visible indicator wheels 132. This product may be printed on the tape by depressing the Total key 192 or the Sub-Total key 191.

When the multiplicand is entered into the Storage Block the operation is the same as entering a number in addition. This has been explained in detail above. When the times (×) key 224 is depressed it locks the Storage Block to the column selector block 501 and the two move together. The column selector block 501 engages the multiplier 496 (FIGS. 38 and 78) and moves it to the left as the Storage Block continues to receive multiplier digits.

Figure 74:
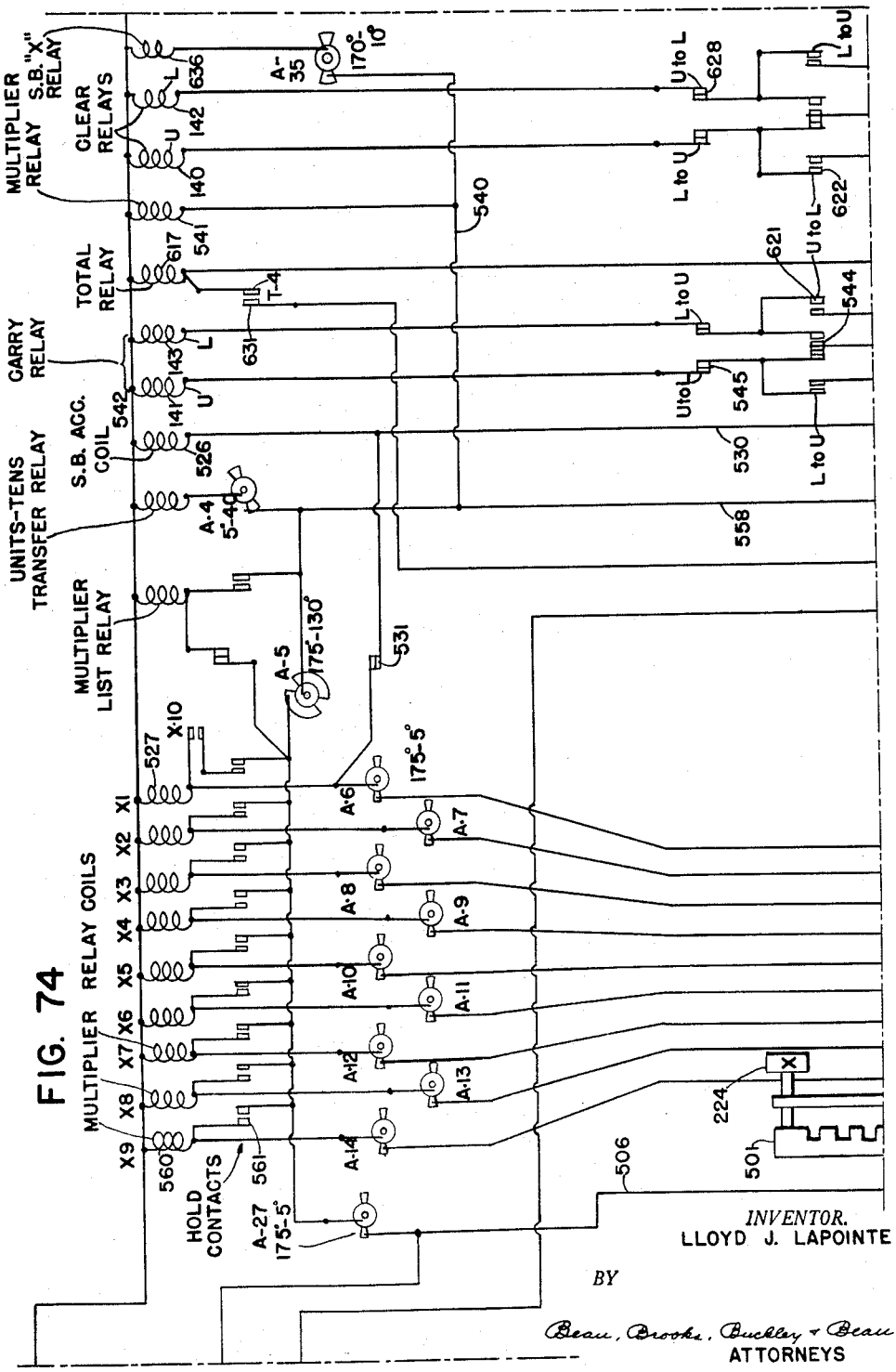

When the Start and Enter key 187 is depressed, a circuit is completed to operate one of the multiplier relays (FIG. 74). This circuit may be traced from conductor 514, through contacts 557 made by depressing the (×) times key 224, over conductor 558, through contacts made by accumulators A–5 and A–27, over conductor 506, brushes 510 and 505, one of commutator bars 493, one of the lugs 500, through the selected multiplier switch in the Storage Block to one of the contacts operated by commutators A–6 to A–14, to the selected multiplier relay coil 560. These coils operate the contacts shown in detail in FIG. 71 and, in addition, each has a holding contact 561 which retains the relay armature in its actuated condition until one of the series contacts in the supply line is broken. At the same time, Multiplication Relay 541 (FIG. 74) is actuated by current from conductor 540. As long as the operator holds the Start and Enter key down nothing further happens. The multiplier storage block relay contacts 635 are open when commutator contacts A–6 to A–14 are closed. These contacts are controlled by relay coil 636 which in turn is controlled by commutator A–35.

As soon as the Start and Enter key is released, the Start Released Relay is actuated (FIG. 72) by the closing of contacts 280, controlled by bar 281. The Start Released Relay 524 closes contacts 386 (FIG. 79) which completes a circuit from conductor 514, through contacts 386, over conductor 525, through contacts 384, to clutch coil 385, and ground. Contacts 384 had been made by the Start and Enter key when contacts 383 were closed sending current through coil 382.

The calculator will now make a complete cycle for each digit in the multiplier plus an automatic extra cycle for clearing the storage block. The sequence is as follows: during the first half-cycle, the number is run from the multiplicand section of the Storage Block into the accumulator by way of the Multiplier Relay contacts. This first enters the tens digits, then a short interval for carrying if necessary; then, before the second half-cycle, the storage block is moved one space to the right and the units digits are entered; after another short interval for carry, the second cycle is started and the second multiplier digit in the storage block actuates the selected relay 560 and the process is repeated.

During the multiplication cycle, the A shaft rotates from 0 to 37 degrees, starting the B shaft at 24 degrees. Then the B shaft rotates to 79 degrees, entering the digit values into the accumulator and starting the A shaft at 66 degrees. The A shaft rotates from 37 degrees to 67 degrees, starting the B shaft, then rotates from 79 degrees to 90 degrees controlling the carry circuit and starts the A shaft at 87 degrees through the B–1 commutator. The A shaft now rotates from 67 degrees to 127 degrees, starting the B shaft again at 114 degrees. The B shaft now starts from 0 again and rotates to 79 degrees on its second count, starting shaft A at 66 degrees as before. The A shaft then rotates from 127 degrees to 157 degrees, starting the B shaft again at 144 degrees. The B shaft rotates from 79 degrees to 90 degrees, controlling the second carry operation, and starting the A shaft again at 87 degrees as before. Then the A shaft rotates from 157 degrees to 180 degrees, ending the first full cycle.

During the above sequence, the C shaft does not move since printing is not done during the multiplying calculation. The C shaft is cut off by transfer contact 562 (FIG. 79) which is operated by the (×) times relay 541 and the current which would normally set the C shaft into motion, as is done in addition and subtraction, is shunted through three closed contacts 563, 637, and 638, back to conductor 521 to start the A shaft instead.

The above description relates to the multiplication operation when the values are deposited into the upper plus accumulator. It should be pointed out that by depressing the Lower Register key 218, the same operation will be effected but the values will be deposited in the lower accumulator. It is also possible to multiply when the minus key is depressed, then the partial products and totals will be run into either one of the accumulators in a negative direction and the result is a complementary number which can then be added to another number in order to give the difference between the two numbers.

Since the process of multiplication is a process of adding partial products to an accumulator it makes no difference if there is a number already in the accumulator or not. If the calculation includes the result of $A+B \times C$ then A may be entered into the upper accumulator and B and C multiplied together in the same accumulator giving the correct result when the multiplication is finished.

*Division Operation*

The Division operation may be summarized as follows: (1) The Dividend key 160 is depressed (it stays down until the Divisor key is depressed), (2) the Dividend digits are entered into the Storage Block by depressing the keys 112 in proper sequence, (3) Depress Start and Enter key 187, (4) The Storage Block then moves so as to position the highest digit of the Dividend in the 15th denominational order. The digit values are entered into the accumulator and the Storage Block is returned to its normal position and is cleared, (5) The Divisor key 161 is depressed, operating the divisor contacts, 550 and engaging the minus idler gears. This key remains in its latched position until the problem is completed, (6) The Divisor digits are entered into the storage block, one digit at a time, in sequence, (7) The Start and Enter key is depressed, (8) The Storage Block again moves to the left to place the highest digit in the divisor in the 15th order, (9) The machine now proceeds to subtract the divisor from the dividend. Each time an over-subtraction occurs, printing is done by the 16th wheel only, the others being blocked, (10) At the end of the subtraction process, the remainder is printed by an automatic total cycle.

The first entering of the Dividend digits in the storage block is the same as described under Addition. When the Start and Enter key is depressed the storage block moves to the left due to the following circuit: From the positive supply line 270, through contacts 271 (now making contact with the lower point due to depression of Dividend key), contacts 612, through contacts 564 of Storage Block Cam 406 (FIG. 76), contacts 276 and 277, coil 180 (closing contacts 264), and ground. When contacts 264 are closed, a circuit is completed from supply line 270, through contacts 264, through contacts 278, to clutch coil 265, and ground. This starts the storage block moving to the left and continues the motion until the clutch circuit is broken by the opening of contacts 564 which are controlled by a notch on cam 406 positioned as to always stop the movement of the storage block at the 15th order. When the Start and Enter key is released, the digit values of the dividend are entered into the accumulator in the same manner as in addition.

The operation of entering the Divisor into the storage block and then placing the block at the 15th position is the same as for the Dividend but when the Start and Enter key is released the digit values are subtracted from the amount in the accumulator because the upper minus shuttle coil is energized by a circuit which may be traced from conductor 514, through contacts 565 and 566 (FIG. 79), through the commutator contacts A–15, contacts 550 (now on the right side), to contacts 567 (FIG. 75), to the upper minus shuttle coil 152 and ground.

In order to explain the Division operation in detail, let it be assumed that 65 is to be divided by 27. The 65 is entered as described above and is run into the accumulator in the 15th and 14th denominational orders. Then the 27 value is set in the storage block, as described above, and the storage block is automatically moved to the left of the machine until the 27 values are aligned with the 65 values. Now the first cycle of subtraction is effected by the above described circuit and the 65 is reduced by 27 leaving 38. A second subtraction is then made because a circuit is now completed from contacts 397, to the A–22 commutator, and through contacts 571 which were closed by the Divisor relay 572 (FIG. 72). The second subtraction leaves 11 in the accumulator. A third subtraction cycle is started, leaving the value 84 in the accumulator but setting up a carry circuit both orders because both accumulator wheels have been run past the zero position. The carry circuit includes conductors 514, and 553, contacts 307–15 which are now in the lower position because of the action of cam follower 305 (FIG. 8), then to contacts 573 (closed) under the Divisor key, over conductor 574 to coil 575 of the Over-Subtraction Relay, and ground.

The Over-Subtraction Relay makes a number of contacts and, in addition, mechanically blocks the printing of all but the 16th printing arm. The blocking is done by an armature 576 (FIGS. 8 and 69) of Relay 575.

When the C shaft does cause a printing cycle and the 16th arm prints a 2 on the left side of the paper, the number printed being the number of subtractions that have taken place before over-subtraction. This is because of a circuit which may be traced from the supply conductor 553, over conductor 554, through contacts 578 of commutator A–26, then through contacts 580 to contacts 581 controlled by the Over-Subtraction Relay 575, then to the clutch coil of the 16th drive gear, and ground.

The Over-Subtraction Relay causes the shuttle gears on all the 15 orders to remain in contact so that the amount which has been subtracted from the accumulator wheels is run back. The final result is the same as the value before the operation. The above action takes place in one complete cycle. The pulses which actuate the 16th clutch winding are timed to arrive late by commutator A–26 and the clutch windings are actuated for a prolonged time interval to permit the pawl 321 to move out and into engagement. In this manner the quotient counts from succeeding cycles are added together. The action is controlled by cam 150–3.

When the over-subtraction relay 575 is actuated, contacts 581 (FIG. 78) and contacts 637 (FIG. 79) are opened and contacts 597 are closed. This action occurs sometime during the 1 to 9 count, before 66 degrees rotation of the B shaft. The B-13 commutator contacts 378 are closed at 66 degrees and then a circuit may be traced from conductor 514 through closed contacts 386, conductor 525, B-13 contacts 378, contacts 597, contacts 598 (FIG. 75) the C shaft release coil 402 and ground. This starts the C shaft and a printing operation is effected. Only one printing wheel, the 16th, is actuated to print because the over-subtraction relay armature 576 (FIGS. 8 and 69) when actuated, moves under an end portion of the other printing levers 317 and prevents their movement. The 16th printing wheel is not engaged by armature 576 and prints a 2 on the paper. This action occurs between the first subtraction operation and the carry operation. When the C shaft has moved 32 degrees, it starts the A shaft to rotate from 37 to 67 degrees, the set-up rotation for carry. However, when over subtraction takes place, there is no carry necessary and contacts 543 are opened and carry is prevented.

An escapement of the storage block to the right is now effected by the following circuit: Contacts 621 are closed by the over-subtraction relay completing a circuit through the A-24 commutator contacts 623, contacts 291, and 295, escapement coil 180 and ground. This causes contacts 264 to close and sends current through contacts 537, conductor 536, to the storage block clutch coil-right 292, to ground. This escapement motion occurs during the first half-cycle; if it had occurred during the second half-cycle the circuit would have been the same except commutator A-25 is used instead of A-24.

The storage block now aligns 27 with 110 in the accumulator and another series of subtractions takes place similar to the operations described above but this time 4 subtractions are necessary to reduce the 110 value to 2, a value less than 27. The next subtraction actuates the Over-Subtraction relay as before and the amount oversubtracted is added back to the accumulator. Then, after printing a 4, the escapement mechanism moves the storage block one space to the right, as before, placing the 27 digits under a 20 in the accumulator.

The next subtraction operation results in an over-subtraction at once and a zero is printed on the paper. Then the storage block is again moved one space to the right and the 27 digits are below the last two orders of the number 200. Now the machine makes seven subtractions before the 200 is reduced to an 11, and, after the usual over-subtraction and printing operation, the storage block is again moved one space to align the 27 with 110. This is a repetition of the condition which existed after the first series of subtractions and it is now evident that the digits 407 will repeat in sequence in the quotient for the capacity of the machine.

FIG. 85 illustrates the process of division by repeated subtraction when there is no decimal point indication and both dividend and divisor have been shifted to the 15th order in the calculating machine. If the machine is permitted to run until the problem is completed, the quotient will contain 14 digits with a remainder of 2.

Decimal Positioning

The calculator contains a Decimal Point key and other means in the structure and circuits to position the decimal point, both when entering numbers from the storage block into the accumulator, and also when printing an answer which may be the result of either addition, subtraction, multiplication, or division. The entire structure for accomplishing the above results has already been described in connection with the other processes of calculation and for that reason several problems showing the operation of the decimal point structure will now be described.

In order to make the decimal point positioning more useful, a roll of paper 115 is provided with a red line running down its center, positioned mid-way between the eighth and ninth denominational orders. The decimal point position is controlled by the position of the cam faces on cams 408, 410, 411, 412, 404, 368, 405, 406, and 407. It should be remembered that it is not necessary to use the decimal point structure and all the calculating operations may be made in the usual manner as described above without using the decimal point key. Whenever it is desired to make use of the decimal point structure, the number is entered into the storage block with a depression of the decimal key 223 in its proper position. The depression of the decimal point key does not cause the escapement mechanism to move the storage block but it does switch in several control circuits associated with the "D," "E," and "SB," cams which control the movement of the storage block during the calculation.

When numbers are being added or subtracted, the decimal point is positioned at the start of the problem before the number is transferred from the storage block to the accumulator and then the answer will obviously appear in correct alignment. The storage block is positioned as follows: During the entering of a number by manual depression of the keyboard, all digits to the left of the decimal point are entered when the D clutch 417 is in its unactuated condition. When the decimal point key is depressed, sixteen contacts are operated, ten being closed by the decimal relay, three being depressed by the decimal rider 242 and three being depressed by the shank under the decimal point key 223. This action sends current through clutch coil 417 and locks the D cams to the storage block so that as the digits to the right of the decimal point are entered the D cams will turn as the storage block moves to the left. Then when the D-1 cam 408 is moved to the 8th position the Storage Block stops and the number is entered.

Let it be assumed that it is desired to multiply 2.3 by 4.5. First, the 2 digit key is depressed and the storage block moves one space to the left moving all the storage block cams 404, 405, 406, and 407 with it. Then the decimal point key 223 is depressed, locking the D cams to the storage block gear train. Next, the 3 digit key is depressed, entering a 3 into the storage block and moving the storage block another place to the left and, in addition, turning the D cams 408, 410, 411, and 412 the equivalent of one space. Then the times (×) key 224 is depressed, closing contacts 582 (FIGS. 76 and 45). As described above, the depression of this key also locks the column selector block 501 to the storage block 155. The operation of the times (×) key unlatches the decimal point key and disengages clutch 417 so that the next whole number entered does not turn the D cams.

Now the multiplier is entered into the storage block by first depressing the 4 digit key, then the decimal point key, and then the 5 digit key. At this point the storage block cams have been rotated an amount equivalent to four spaces and the D cams an amount equivalent of two spaces.

The problem has now been set up and all that is necessary for the operator to do is to depress the start and enter key 187 and the multiplication will be done automatically. When the start and enter key is depressed, a circuit is completed from the rectifier line 270 through dividend contacts 271, decimal contacts 272 and 273, dividend contacts 274, contacts 275 on D cam 408, start contacts 276, contacts 277 on storage block cam 404, to the escapement coil 180, and ground. This action closes contacts 264 by actuating armature 182 and an escapement circuit is closed from the positive line 270, through contacts 264, through contacts 278 to the storage block clutch coil-left 265, to ground. The bail 282 on armature 182 prevents the start bar 281 from closing contacts 279. These contacts control the actuation of relay 524. As the circuit is now set up, contacts 275 on the D cam 408 are in series with the escapement coil 180. The D-1 cam now has six spaces to turn before the contacts will fall into the depression on the D cam and open. This means that the storage block is moved so that the 2 is in the 10th order and the 4 is in the 8th order. When the D contacts 275 are opened, the escapement armature 182 is released, one part moving into the storage block depression and the other part moving so as to release the start bar 281 and permit the machine to start multiplying.

The process of multiplying 2.3 by 4.5 is similar to the multiplication process already described and is indicated graphically in FIG. 84. The tens value of the product of 4×2 is zero and no action occurs in the 10th order. The tens value of the product of 4×3 is a 1 and this is entered into the 9th order. Then an escapement of one place is made and the units values of 4×2 and 4×3 are entered into the 9th and 8th orders. At this point the total is 9.2 and no carry operation is necessary. Next, the tens values of the products of 5×2 and 5×3 are entered into the 9th and 8th orders, resulting at this time in a carry operation. A storage block escapement of one space again occurs and the units values 0 and 5 are entered into the 8th and 7th orders making a total of 10.35 for the product. A third machine cycle returns the storage block to its home position.

The storage block escapement at the end of each first half cycle is controlled by the A–24 commutator 623 since contacts 279 are closed and contacts 641 are open. The final escapement movement which sends the storage block to its home position occurs at the start of the third cycle due to contacts 285 which were closed at the middle of the second cycle when the column selector block 501 is moved to its normal position. The escapement action does not start until the third cycle when the A–2 commutator 286 makes contact and completes a circuit through contacts 279, contacts 285 (FIG. 77), contacts 286 on the A–2 commutator, to coil 288 of the storage block return relay, and ground. When this relay is operated, the relay contacts 290 are closed which provides a circuit from conductor 514 through these contacts, contacts 291, contacts 295, to the escapement coil 180 and ground. This closes contacts 264 and sends current through contacts 537, over conductor 538, through the storage block clutch coil-right 292 and takes the storage block to its home position. At one-half space away from the home position, the storage block normal contacts 295 are opened, thereby releasing the escapement coil.

The number 1035 is now in the accumulator in the 10th, 9th, 8th and 7th denominational orders. Depressing the total key will print this number with the 10 to the left of the red line and the 35 to the right of the red line on the paper.

If more than eight decimal digits are entered into the storage block, the cut-out cam portion on cam face 408 will have moved past the contact finger which holds contacts 275. Then, when the storage block clutch is actuated, it will be driven all the way to the left side of the machine. This action opens contacts 277 and a circuit is completed through contacts 583 (FIG. 72) and the storage block is returned to its home position and cleared without having transferred its value to the accumulator.

Let it now be assumed that 6.5 is to be divided by 2.7. First, the dividend key is depressed. This action closes contacts 271, 274, 583, and 375 and completes a circuit which may be traced from conductor 270 through contacts 271, decimal contacts 584, divisor contacts 585, start key contacts 516, start released relay contacts 586, to the D clutch coil 417 and ground. Then the number 6 key in the keyboard is depressed which enters a 6 in the storage block and operates the escapement circuit to move the storage block one space to the left. When the storage block moves one space to the left, the "D" cams are moved the equivalent of one space in a counter clockwise direction. Then the decimal key is depressed and the above described circuit is broken by the transfer of contacts 584. The decimal key also closes contacts 612 to set up a circuit which will be completed when the start key is depressed. Next the 5 digit key is depressed, entering a 5 in the storage block and causing the storage block to be moved one space to the left. The storage block cams are now two space positions from normal and the D cams one space from normal. Now the enter and start key 187 is depressed to enter the 65 in the accumulator in the 9th and 8th orders. This action closes contacts 276 and completes a circuit from contacts 587 through the escapement coil as before to move the storage block the seven remaining spaces to the left until the cam 405 opens contacts 587. This records the 6 value in the 9th accumulator position. The storage block is now returned to its home position by a circuit which may be traced through contacts 588, 590, contacts 591 on the B–2 commutator, over conductor 287, to the storage block return relay 288, and ground.

The divisor key 161 is now depressed. Since the number to be entered as the divisor is 2.7 the 2 digit key is next depressed and the 2 value is entered into the storage block with the usual escapement. Next, the decimal key is depressed which closes a circuit which may be traced from the positive supply conductor 270 through contacts 271 which have been transferred to their lower position, contacts 584, contacts 585, start contacts 516, start contacts 586, to the D clutch coil 417. The number 7 digit key is now depressed. This moves the storage block one space and moves the D cams with it one space for a total of two spaces. Now the start and enter key is depressed a second time to start the problem of division. This action completes a circuit through the contacts 366 on the "E" cam 368, then through contacts 592, start contacts 276, cam contacts 277, to the escapement coil 180, and ground. At this time, another circuit is established through the "E" clutch coil 593, through the divisor contacts 594, divisor contacts 595, through start contacts 596, and coil 593. The storage block now moves to the 9th position controlled by the "E" cam 368 and contacts 366.

The digits 2.7 are in the storage block in the 10th and 9th positions and the Start Released bar moves to the right when the Start and Enter key is released. This action starts the problems in division. The 27 is subtracted from the 06 once and the over-subtraction relay is actuated as described above and the carry latch 307–9 is tripped, thereby establishing a circuit from conductor 553 to contacts 307–9, over the simultaneous carry system 332–14 to contacts 573, conductor 574 and the over-subtraction relay coil 575. As previously described under the division chapter, the accumulator idler wheels 135 remain in mesh when the drive gears 130 are returned to their normal or zero position, thereby running back into the accumulator the value which has been subtracted during the first subtraction.

When the divisor key 161 is depressed, divisor contacts 580 (FIG. 77) are shifted so that the sixteenth wheel and its clutch are alive and are disconnected from the other accumulator wheels. Each subtraction pulse travels from conductor 534 through contacts 578, 580, and 581 to move the sixteenth wheel one digit position for each of the three subtractions. The pulses which actuate the sixteenth wheel come through contacts 578 of commutator A–26 and arrive later than the usual action.

At the end of the above described action, commutator B–13 closes a circuit which may be traced from conductor 514 through contacts 386 (FIG. 79), over conductor 525, through the B–13 contacts, then through contacts 597, through contacts 598, to the C shaft release coil 402 to start the C shaft and print the result. The storage block is now moved one space to the right under control of the A–25 commutator. During this motion, the D cams are also moved the equivalent of one space to the right and are now one space from their normal position.

The 2 digit is now at the 8th accumulator position and the subtraction cycle is again started but an over-subtraction is at once sensed and the value in the accumulator (which is now 0) is not changed. The escapement mechanism again moves the storage block and D cams one place to the right and the D cams are now in their normal position and the D-3 cam 411 has made a momentary closure of contacts 615. Contacts 615 make a circuit through the Quotient Decimal Relay Coil 616 which actuates it and causes it to be locked in its operated condition, timed by the A-3 cam. The contacts operated by the relay open the line to the counting circuits by opening contacts 533, thereby preventing counting while the decimal point is being printed. Contacts 617 are closed and complete a circuit through the B-14 commutator to the decimal magnet 618, rotating it an amount which will unlock the arm and prepare it for printing. Contacts 620 (FIG. 79) are also closed which starts the "C" shaft on another cycle and a decimal point arm controlled by bail 430 is actuated and a decimal point is printed on the paper in approximate alignment with the 3 and the 0.

The machine continues to go through its division cycles because there might be some digits in the accumulator in the lower orders. However, since the third subtraction of the 2 reduced the accumulator value to zero, the result of the remaining cycles will be a line of zeros. If the operator realizes that nothing but zeros will be printed or if the operator is not interested in all the decimal values beyond a certain point, the machine may be stopped by depressing the clear keyboard key 188. This action completes a circuit, with the next escapement pulse, which may be traced from conductor 514 through contacts 621, either of contacts 622 or 623, Divisor contacts 624, Clear Keyboard 625, over conductor 287, to coil 288, and ground. This returns the storage block to its normal position and clears the accumulator, printing the remainder, if any. Chart shown in FIG. 86 illustrates the above described action.

*Upper to Lower and Lower to Upper*

When a number in the upper accumulator is to be transferred to the lower accumulator key UPPER to LOWER 193 is depressed. This action closes a total contact 620 and contact 627 (FIG. 79) which actuates the upper to lower relay 616, which in turn operates a number of relay contacts including contacts 621 and 622 in FIG. 74, contacts 623, 624, 618, and 625 in FIG. 75, and contacts 626 in FIG. 79. The same action opens contacts 628 and 545 in FIG. 74 and contacts 630 in FIG. 75.

The result of this switching action completes a circuit from conductor 514 (FIGS. 76 and 74), through the T-3 contacts 620, to the total relay coil 617, firing the relay and locking it into its actuated condition through T-4 contacts 631. The T-6 contacts 632 are operated and a circuit is completed from conductor 514 through closed contacts 565, 566, commutator A-15, contacts 550, 632 (right), 567, 633, 624 (left), commutator A-29, to the upper minus shuttle coil 152. A second circuit is completed from contacts 624 (left), commutator A-17, contacts 551 and 625 to the lower plus shuttle coil 151. The actuation of these shuttle coils places the accumulators in a condition to clear the number from the upper accumulator and enter it into the lower accumulator. If there is no number in the lower set of wheels at the start of the operation the result is a simple transfer. However, if a number is in the lower accumulator, the transfer will add a set of digit values which may result in a carry operation. The carry operation is automatic for the lower accumulator but if a carry is made there and the upper accumulator wheels are still in mesh, the carry will be made there also. For this reason, commutator A-34 (FIG. 79) makes contact (at 40°) to actuate the upper minus shuttle coil and disengage the upper accumulator wheels just prior to the carry operation.

After the carry operation in the lower accumulator, the lower plus shuttle coil 151 is energized to release shaft 145 and disengage idler gear 137. The circuit which causes this action may be traced from conductor 514 (FIGS. 79 and 75) through contacts 565, 566, and 640, through the A-16 commutator, contacts 550, 632 (right), 567, 633, 624 (left), commutator A-17, contacts 551, 625, and the lower plus shuttle coil 151, and ground.

*Protective Circuits*

The calculator above described contains a motor which is started by the first actuation of any of the start keys 109 and thereafter the motor runs continuously as long as the machine is in constant use. In order to insure that the operator will not leave the machine and permit the motor to run indefinitely, a timing system has been built into the machine to turn off the motor after a predetermined time interval. The time interval may be set at five minutes and the arrangement is such that each time the start release bar is depressed the timing mechanism is restarted from its zero position. The details of this mechanism are illustrated in FIGS. 40 to 45, inclusive, and comprise two ratchet wheels 600 and 601, each ratchet wheel being engaged by two pawls, a stationary pawl 602 and a movable pawl 603 actuating wheel 601. Ratchet wheel 600 is actuated by movable pawl 604 and held by a stationary pawl 605. It should be remembered that gear wheel 113 is turning whenever the motor shaft is turning. Secured to the face of wheel 113 is a snail cam 606 which is engaged by an arm 607 which moves the movable pawl 604. The ratchet wheel 600 is thereby turned one notch for each revolution of the snail cam 606 and completes a full revolution in about one minute. Wheel 600 also contains a snail cam 608 and this snail cam actuates lever 610 to move the movable pawl 603. Wheel 601 contains a bent-over portion 611 and when the wheel has moved through an arc of about 30 degrees this portion will make contact with an insulator secured to two switch contacts (see 507, FIG. 72) thereby breaking the contacts and stopping the machine. The start bail 195 actuates a shaft 197 on which is secured an arm 613. This arm moves on each actuation to make contact with parts of pawls 603 and 602, lifting the pawls from the teeth and permitting wheel 601 to be returned to its original position by means of spring 614.

Another protective feature includes a circuit interrupt bar 202 shown in FIGS. 20 and 21 (also in FIG. 75). When the machine is started by any of the start keys 109 bail 195 is depressed and bail 198 is moved to the right by bell crank 196. This forces bars 201 and 202 to the right causing a flat armature portion 643 to make contact with magnet 521. Current for winding 521 is supplied by a circuit from the main line 514, over conductor 520, coil 521, to ground and as long as this circuit carries current the arm 202 will remain in its operated condition and contacts 522 will be open.

If a current interruption occurs during a machine operation, the magnet 521 releases the arm 202 which moves to the left of the machine and closes contacts 522 thereby sending current through a circuit which runs from conductor 514, over conductor 644 (FIGS. 79 and 75) to the A-30 commutator, contacts 522, and automatic clearing relay 523. The energizing of this relay completes a holding circuit from line 514, through T-8 automatic holding contacts 645, to the relay winding 523. This holding circuit remains until the start of the next machine cycle at which time contacts 646, through A-31, energize the total relay 617. This causes a total operation, clearing the accumulator without printing (because of open contacts 598) and returning the storage block to its home position.

A third protective circuit includes a coil 513 and its armature 647. When the bars 201 and 202 are first moved to the right, current is supplied to winding 513 and armature 647 is pulled out of the path of the bars. This supply circuit may be traced from conductor 270, through contacts on the A-33 commutator, contacts 546, 511, 547, 548, through winding 513 to ground. After 3 degrees of rotation of the A shaft, the above circuit is broken and armature 647 is released, blocking the return of the set-up bar 201. As long as bar 201 is in its actuated position, the keys 112 are locked because a portion 648 enters the ball lock.

Armature 647 will remain in its latching position until the end of a machine cycle (at 177 degrees of A shaft rotation) and until the storage block has returned to its home position closing contacts 511. A current interruption which occurs before this time will not release bar 201 and free the keyboard.

While there have been described and illustrated specific embodiments of the invention, it will be obvious that various changes and modifications can be made therein without departing from the field of the invention which should be limited only by the scope of the appended claims.

I claim:

1. A mechanism for determining the position of a decimal point in a product during a multiplication operation comprising; a movable storage block including a plurality of switches for actuation by a digit keyboard, said storage block adapted to shift one space to denote one digit position; means, including a decimal point key and a multiplication key for entering both the multiplicand and the multiplier into said storage block; means for multiplying the multiplicand by the multiplier and entering the product in an accumulator; counting means, including said decimal key and a counter wheel for counting the number of digits in the multiplicand to the right of the decimal point; coupling means for engaging said counter wheel to the storage block when the decimal key is depressed so that the sum of the multiplicand and multiplier digits to the right of the decimal key are counted by the wheel; and positioning means controlled by said wheel for aligning the decimal point in the product with a predetermined position in the accumulator.

2. A decimal point mechanism as claimed in claim 1 wherein said coupling means includes an electromagnetic clutch with contact means and a source of potential for actuating the clutch when the decimal key is depressed.

3. A decimal point mechanism as claimed in claim 2 wherein said clutch operates a cam wheel controlling a pair of contacts, said contacts connected in series with an escapement means coupled to the storage block and arranged to move the storage block prior to said multiplying operation so that the lowest order digit in the product is spaced to the right of a predetermined decimal point position by the number of digit spaces recorded by the counter wheel.

4. A decimal point mechanism as claimed in claim 3 wherein printing means is provided for printing the value of the product in the accumulator onto a paper, said paper marked with a decimal denoting line corresponding to the predetermined decimal position in the accumulator.

5. A mechanism for determining the position of a decimal point in a product during a multiplication operation in a calculator comprising; digit key means for entering multiplicand digits into a movable storage block, said storage block containing a plurality of settable switches actuated by said key means, a decimal key operable during the entering of the multiplicand digits into said block to denote the position of the decimal point; said decimal key including contact means for closing a circuit which activates an electromagnetic clutch to turn a cam and thereby determine the number of digits in the multiplicand to the right of the decimal point; a multiplication key for designating a multiplication operation, said multiplication key having contact means for engaging a column selector block with said storage block to cause them to move together; digit key means for entering the multiplier digit values into the switches in the movable storage block; said decimal key also operable during the entering of the multiplier digits into said block to denote the position of the decimal point in the multiplier; said decimal key operating to again activate said clutch to turn said cam and thereby move the cam an additional amount to indicate the sum of the digits to the right of the decimal point in both multiplier and multiplicand; and electrical contact means operable by said cam to position said movable storage block prior to a multiplication operation so that the decimal point in the product is positioned between predetermined denominational orders in an accumulator.

6. A mechanism as claimed in claim 5 wherein said multiplication key includes means for disengaging said decimal key and restoring it to its normal position.

7. A mechanism as claimed in claim 6 wherein said column selector block includes contact means for connecting selected digit switches in the storage block to corresponding accumulator drive coils for turning the accumulator wheels to register a product.

8. A mechanism for determining the position of a decimal point in a quotient during a division operation comprising; transfer means for entering the digits of a dividend into an accumulator; key operated means for entering the digits of a dividend into a movable storage block, said storage block including a plurality of settable switches for representing a number; a counting wheel controlled by an electromagnetic clutch which moves with the storage block for storing the number of digit places in the dividend to the left of the decimal point; key operated means for entering the divisor into the storage block after the dividend has been transferred to an accumulator, said means including a decimal key for denoting the position of the decimal point in the divisor; means for energizing said clutch to move the counting wheel an additional amount to store the number of digit places in the divisor to the right of the decimal point; transfer means for shifting the storage block to align the divisor digits with the dividend digits so that the lowest in the divisor is in the same denominational order as the highest digit in the dividend; repeated subtraction means for dividing the dividend by the divisor; recording means for deriving the number of times the divisor is subtracted from the dividend, said recording means producing the quotient; means for energizing the clutch to engage the counting wheel during the division process to count, in a negative direction, the denominational order shifts of the storage block; and additional recording means for establishing a decimal point between digits in the quotient when the digit counting wheel has been turned to its normal starting position.

9. A mechanism as claimed in claim 8 wherein said recording means includes a paper tape, print wheels, and print actuating means.

References Cited in the file of this patent

UNITED STATES PATENTS 2,185,681    Paris  ---------------- Jan. 2, 1940
2,467,419    Avery  ---------------- Apr. 19, 1949